(12) United States Patent
Kleimeyer et al.

(10) Patent No.: US 6,746,335 B2
(45) Date of Patent: *Jun. 8, 2004

(54) RAPID-WINDING WINCH POWER PLANT AND ASSOCIATED AMUSEMENT RIDES

(75) Inventors: Mark Kleimeyer, P.O. Box 27540, 120 Dragon Cir., Panama City Beach, FL (US) 32411; Michael J. Mehrman, Atlanta, GA (US)

(73) Assignee: Mark Kleimeyer, Panama City Beach, FL (US)

( * ) Notice: Subject to any disclaimer, the term of this patent is extended or adjusted under 35 U.S.C. 154(b) by 188 days.

This patent is subject to a terminal disclaimer.

(21) Appl. No.: 10/061,834

(22) Filed: Feb. 1, 2002

(65) Prior Publication Data

US 2002/0128083 A1 Sep. 12, 2002

Related U.S. Application Data

(63) Continuation-in-part of application No. 09/848,641, filed on May 3, 2001, now Pat. No. 6,561,916.
(60) Provisional application No. 60/338,240, filed on Nov. 2, 2001, provisional application No. 60/323,785, filed on Sep. 20, 2001, and provisional application No. 60/265,823, filed on Feb. 1, 2001.

(51) Int. Cl.[7] .............................................. A63G 31/10
(52) U.S. Cl. ...................................................... 472/131
(58) Field of Search ............................. 472/43, 44, 45, 472/46, 47, 131, 133; 254/266

(56) References Cited

U.S. PATENT DOCUMENTS

| | | | |
|---|---|---|---|
| 1,151,476 A | 8/1915 | Klette |
| 2,221,215 A | 11/1940 | Eyerly |
| 3,039,758 A | 6/1962 | Gratzmuller et al. |
| 3,498,472 A | 3/1970 | Rodgers et al. |
| 4,201,113 A | 5/1980 | Seecamp |
| 5,115,744 A | 5/1992 | Barber |
| 5,421,783 A | 6/1995 | Kockelman et al. |
| 5,649,866 A | 7/1997 | Balwanz |
| 5,810,671 A | 9/1998 | Balwanz et al. |
| 5,893,802 A | 4/1999 | Bohme |
| 6,319,140 B1 | 11/2001 | Mirfin et al. |

FOREIGN PATENT DOCUMENTS

| | | |
|---|---|---|
| DE | 19724273 | 12/1998 |
| WO | WO 9947221 | 9/1999 |

Primary Examiner—Kien Nguyen
(74) Attorney, Agent, or Firm—Michael J. Mehrman; Mehrman Law Offices PC

(57) ABSTRACT

A winch 10 has a drum 26 that winds and unwinds a cable 28 in response to winding and unwinding of tethers 30 about an axle 24. The tethers 30 are connected to telescopic spring devices 46 with staged concentric springs 48 that store energy, and a brake 45 is releasable to permit the drum 26 to rotate under the force of the stored energy. The drum 26 has a diameter that is greater than a diameter of the axle 24, thereby producing a mechanical advantage. The cable 28 is also connected to a passenger carriage 201 of an amusement ride 200 that travels under the force of the stored energy.

29 Claims, 68 Drawing Sheets

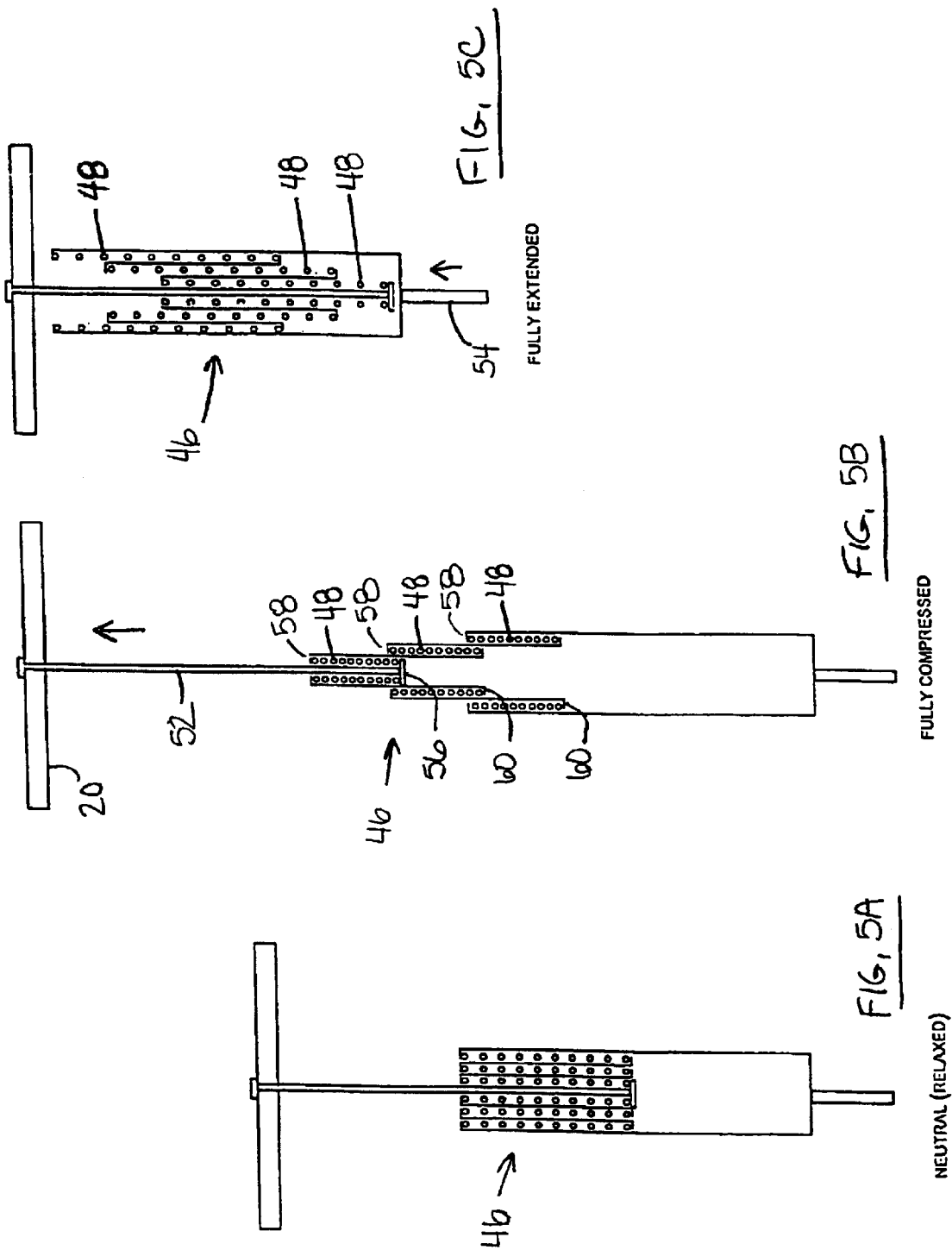

RELEASED

FULLY COMPRESSED

NEUTRAL (RELAXED)

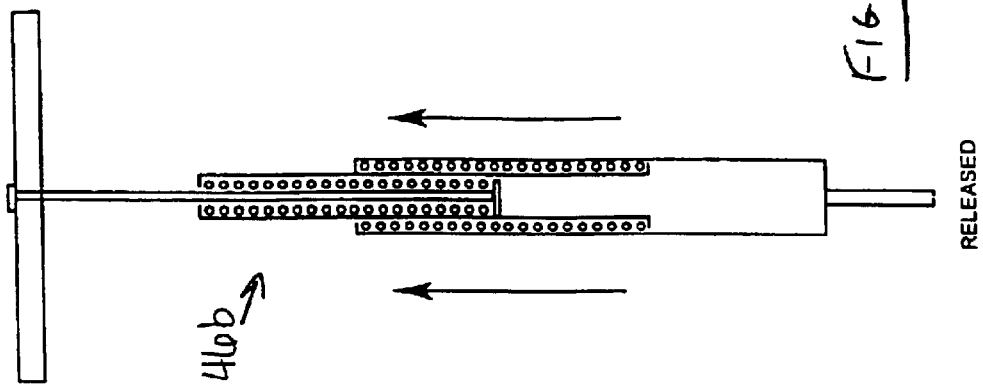
FIG. 7C RELEASED
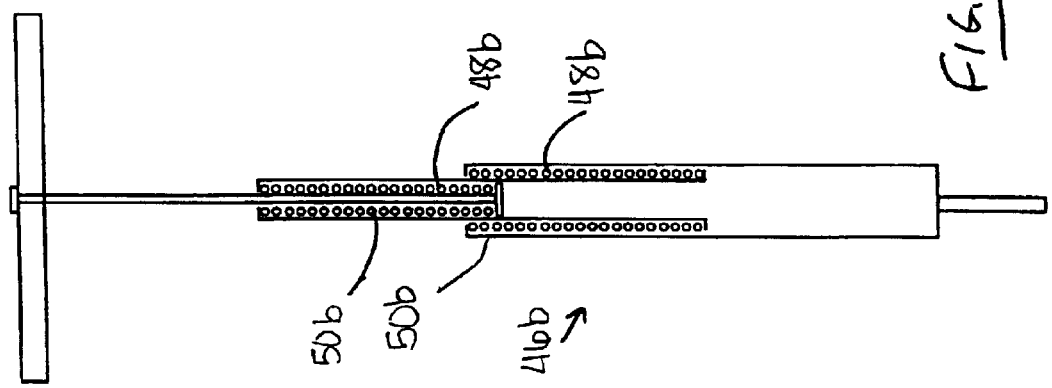
FIG. 7B FULLY COMPRESSED
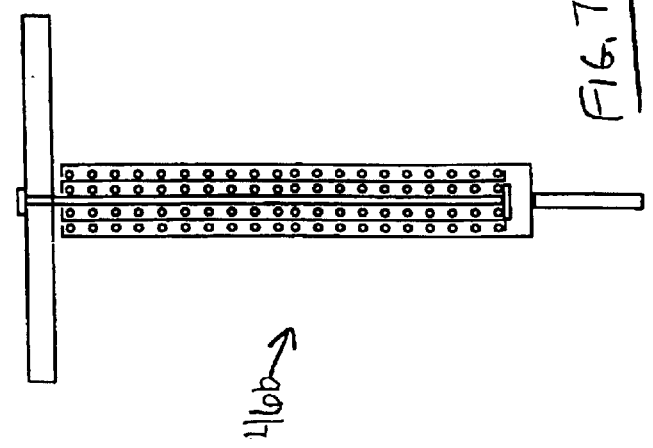
FIG. 7A NEUTRAL (RELAXED)

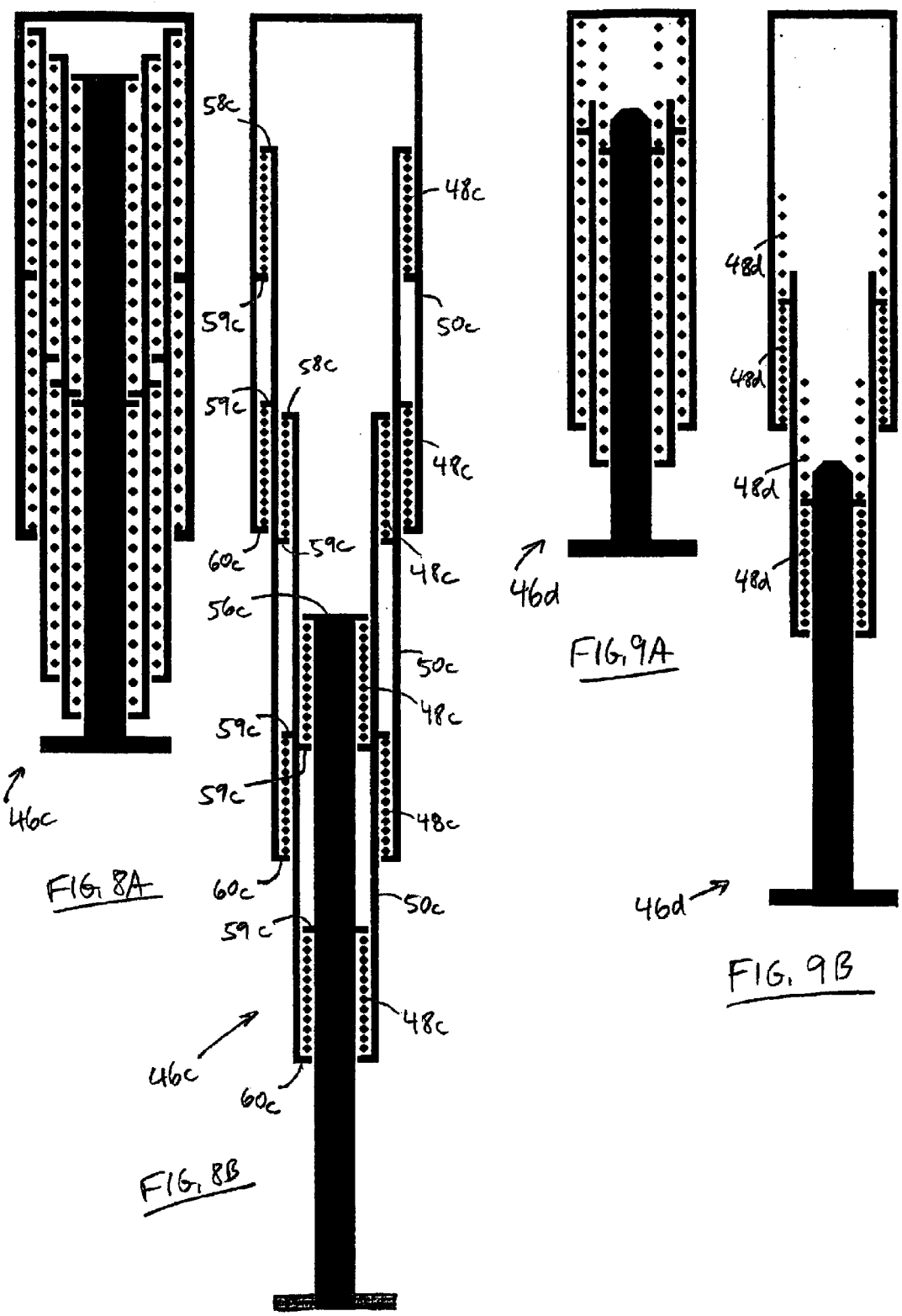

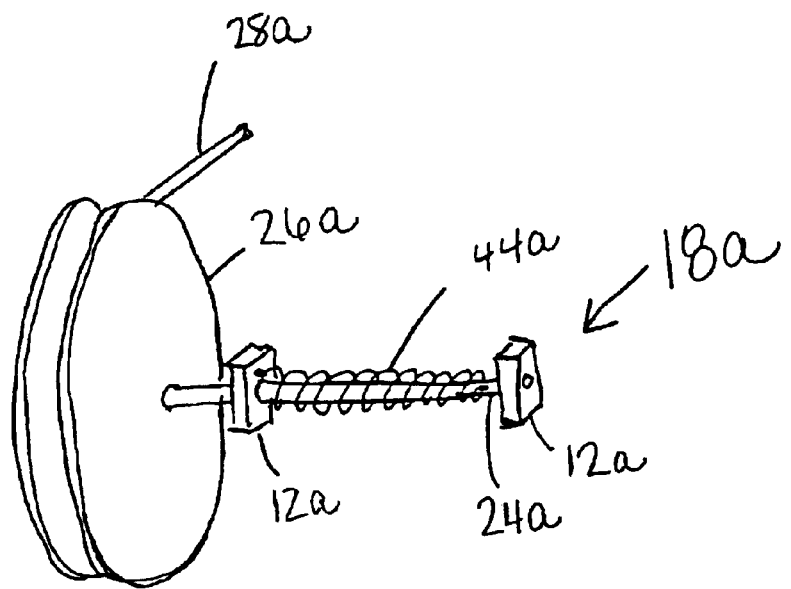
FIG. 10
FIG. 11B
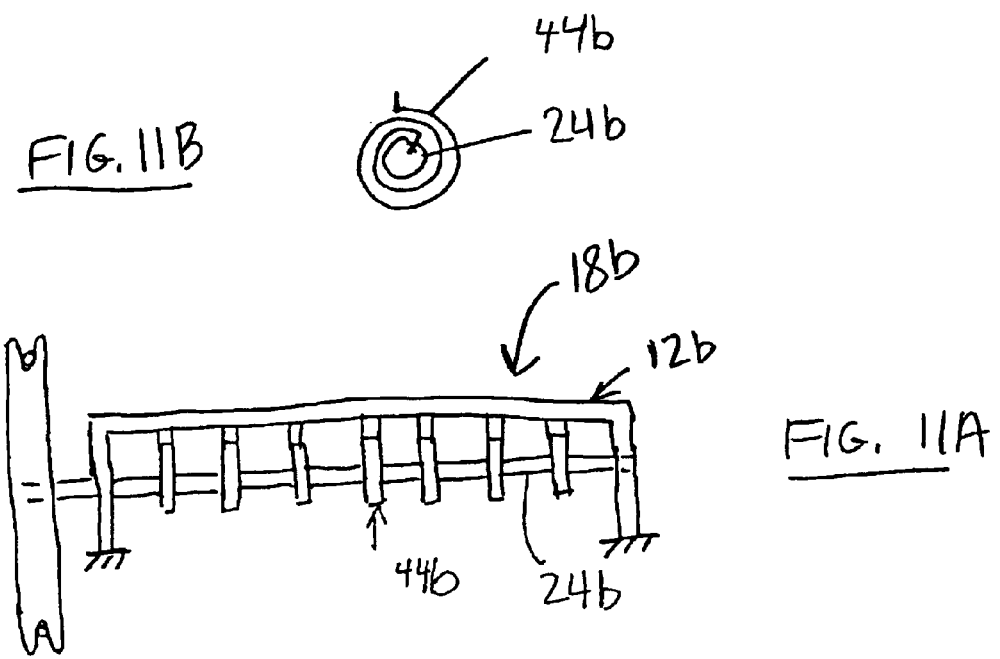
FIG. 11A

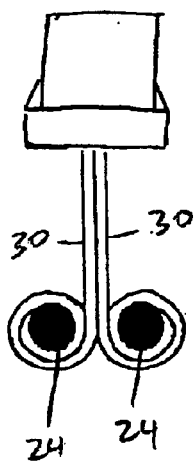
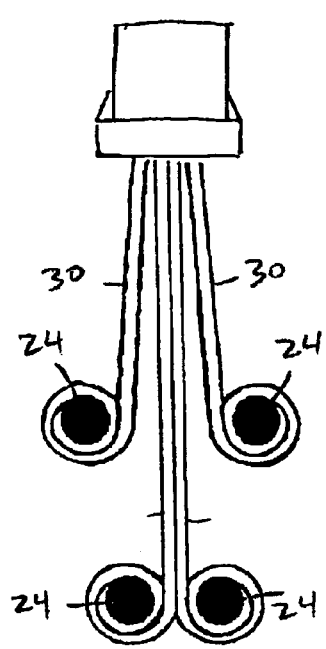
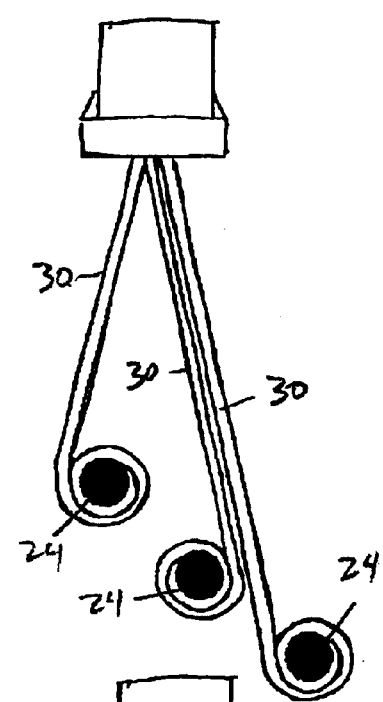
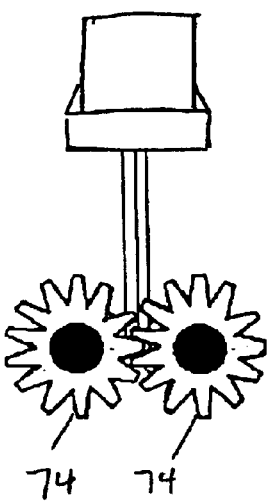
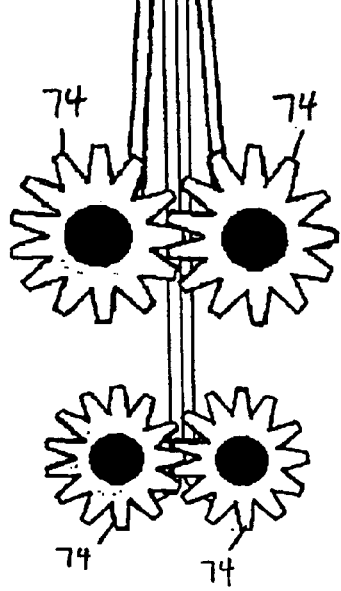
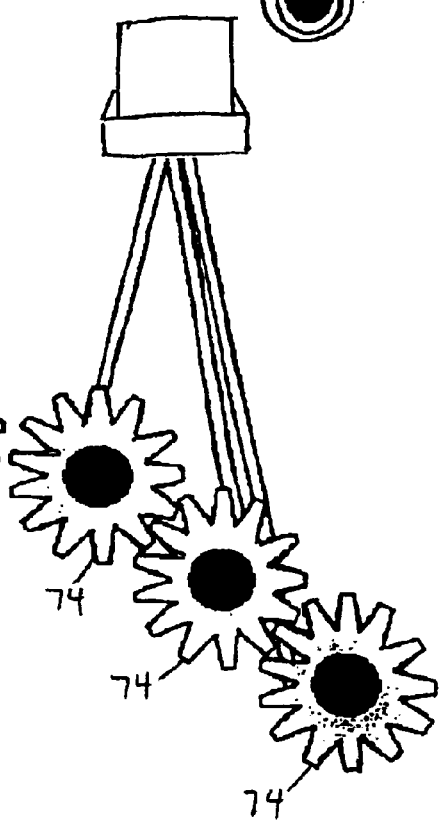

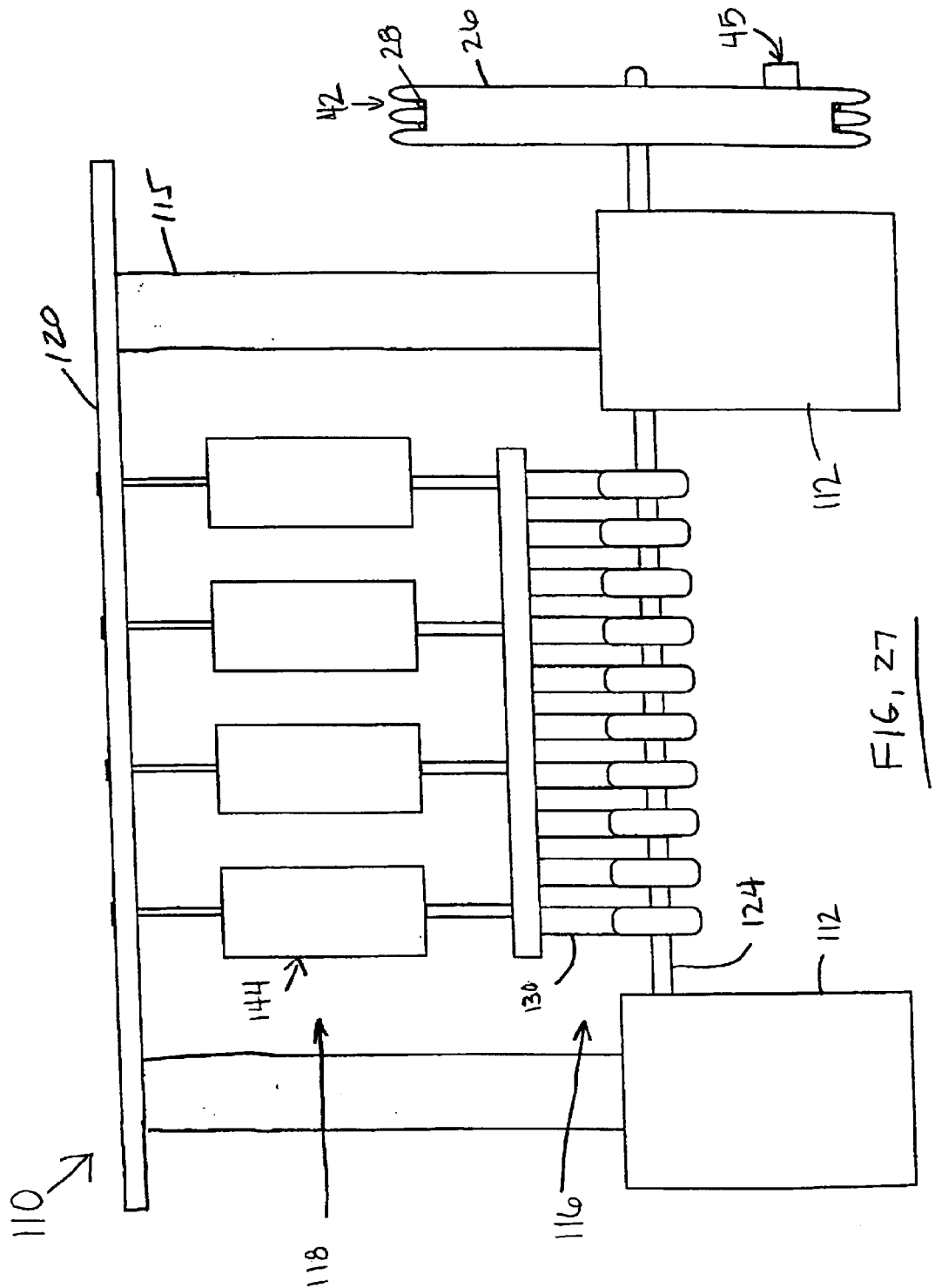

FIRST STAGE

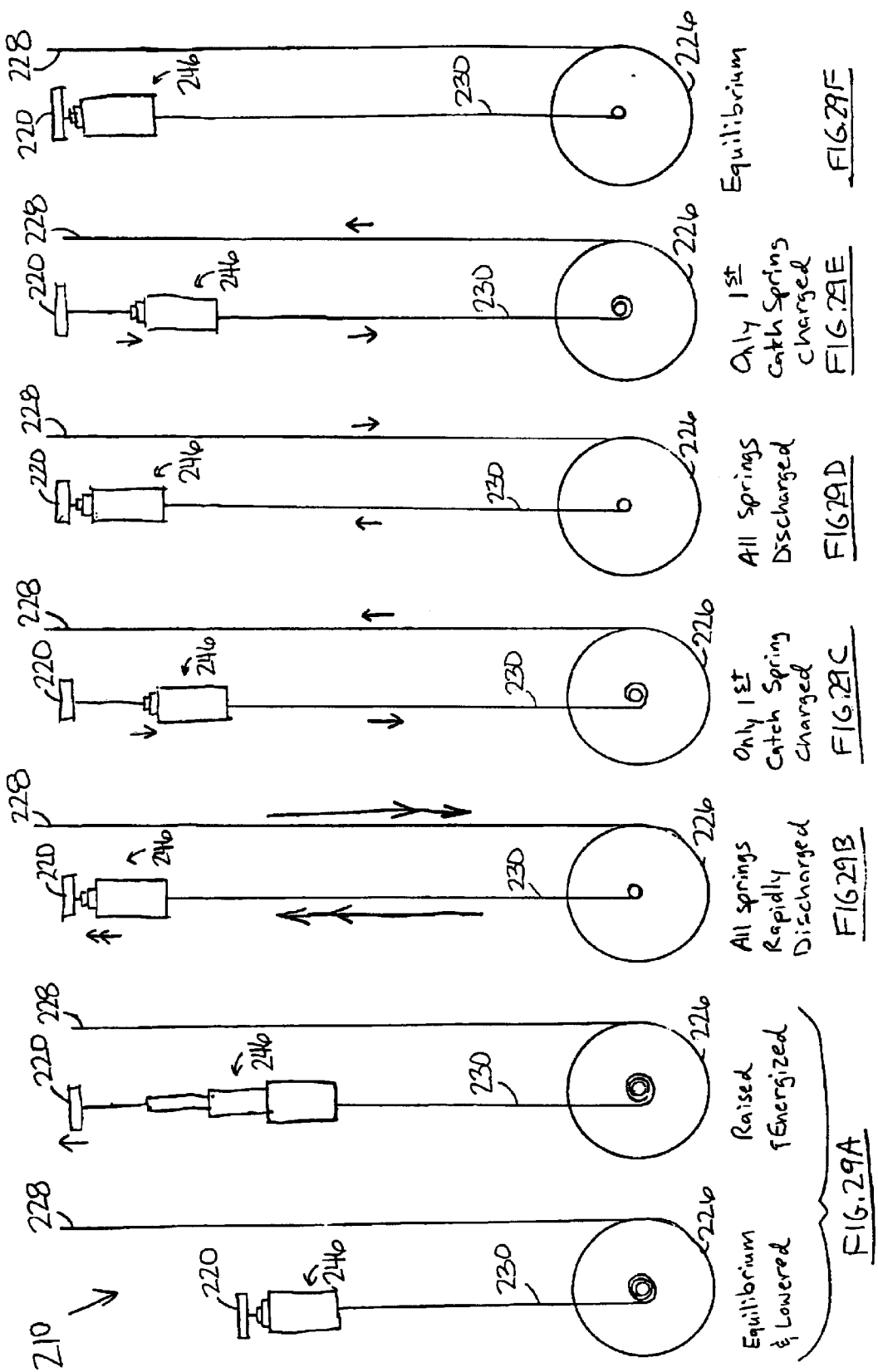

SECOND STAGE

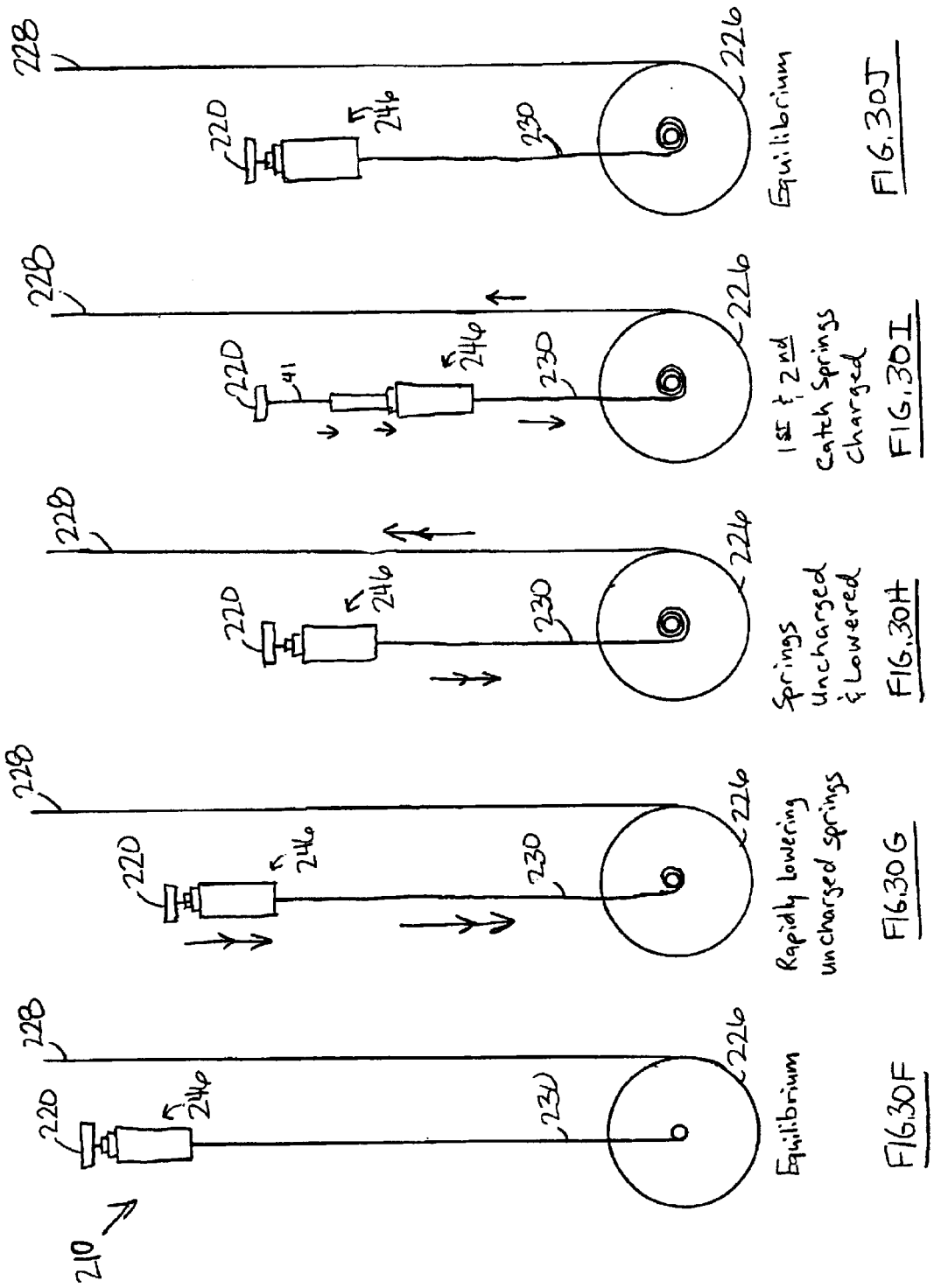

FOURTH STAGE

THIRD STAGE

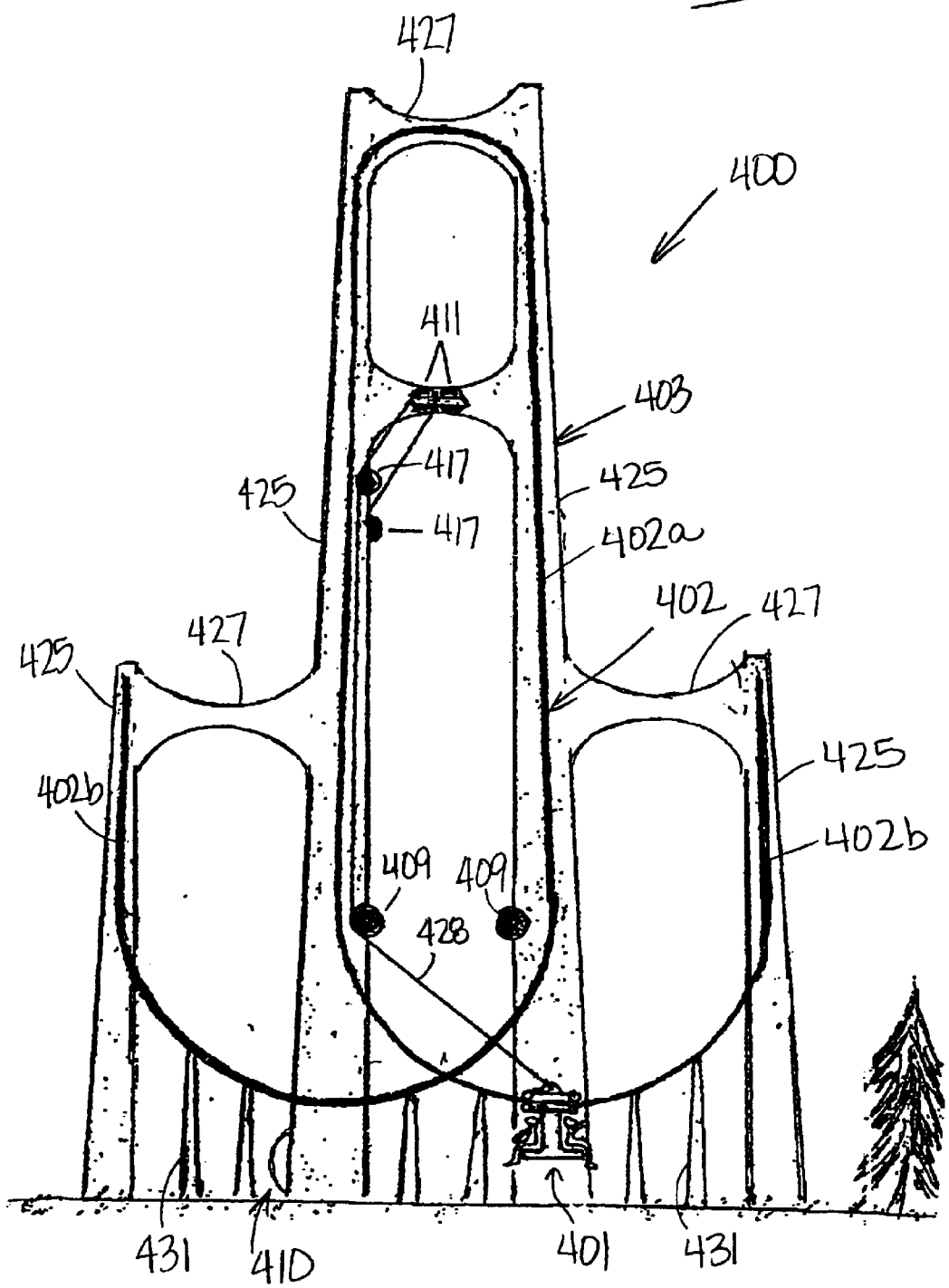

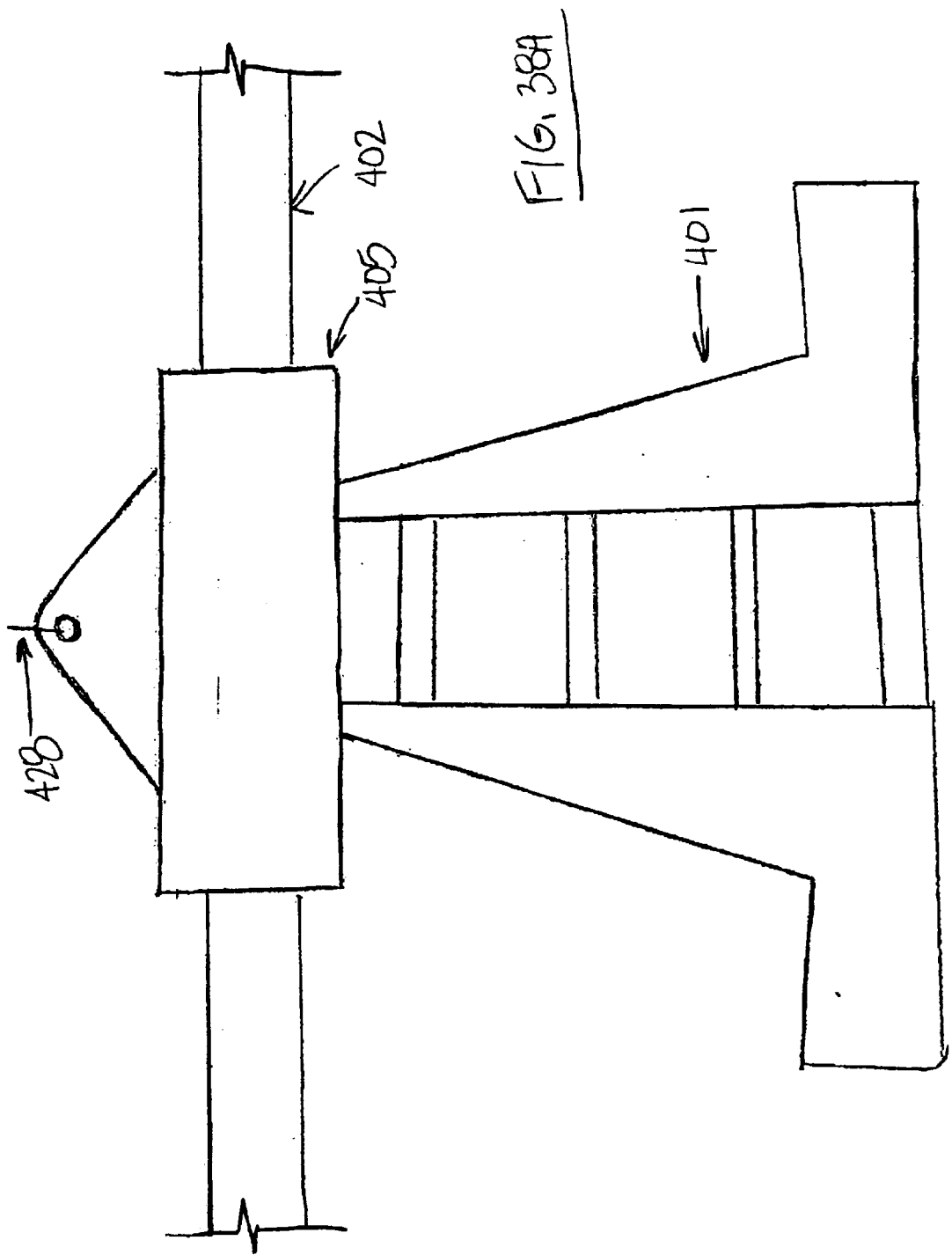

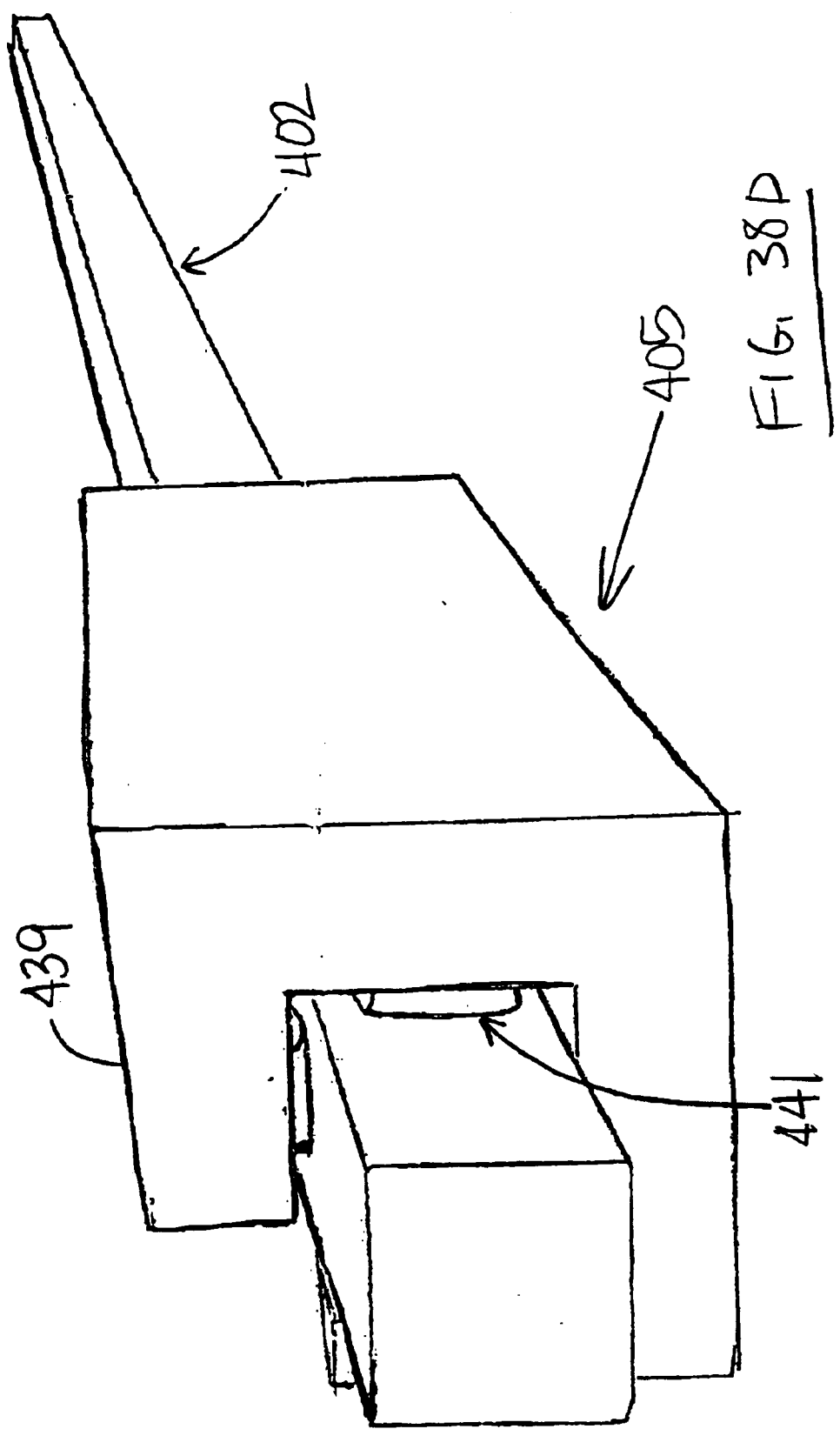

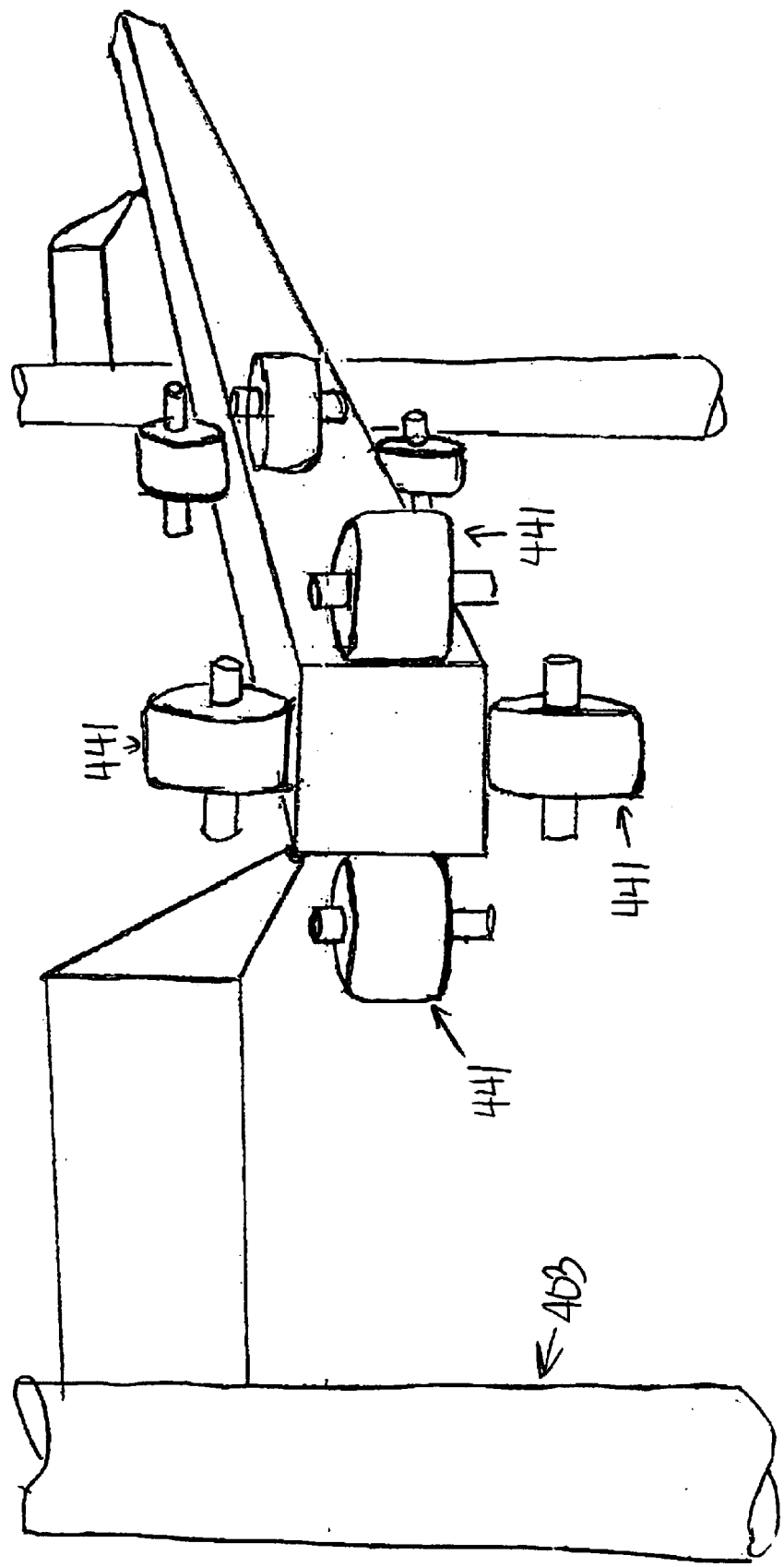

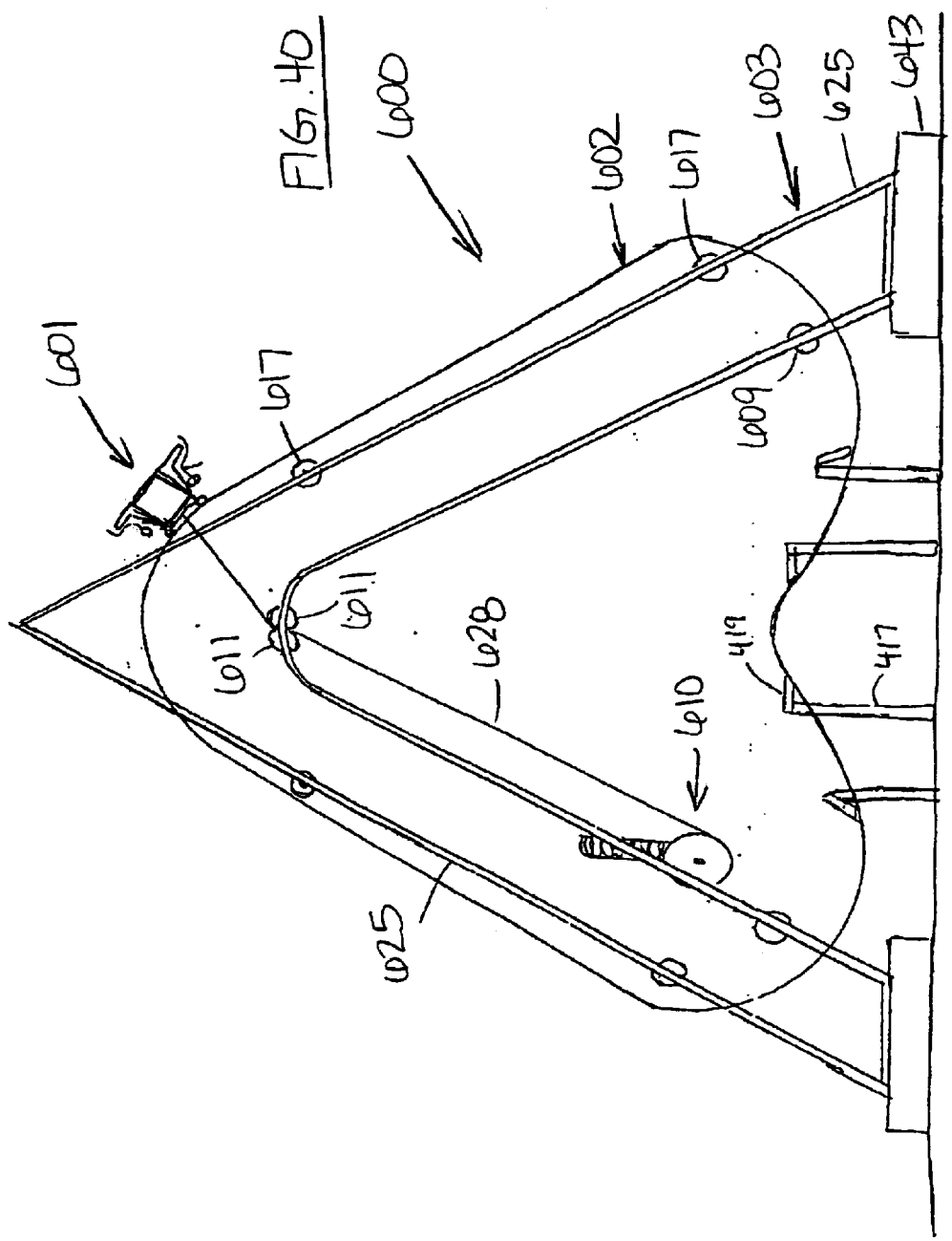

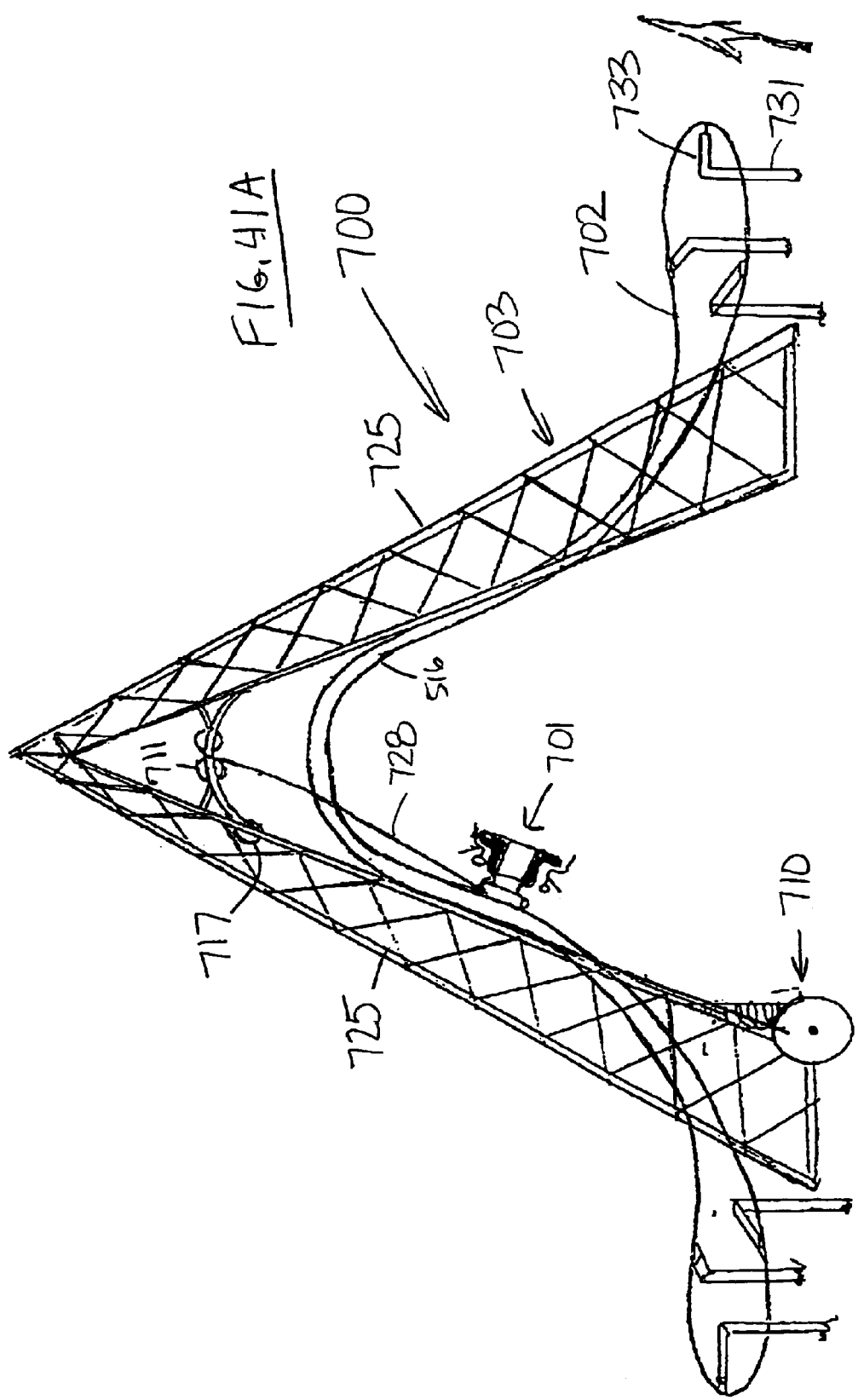

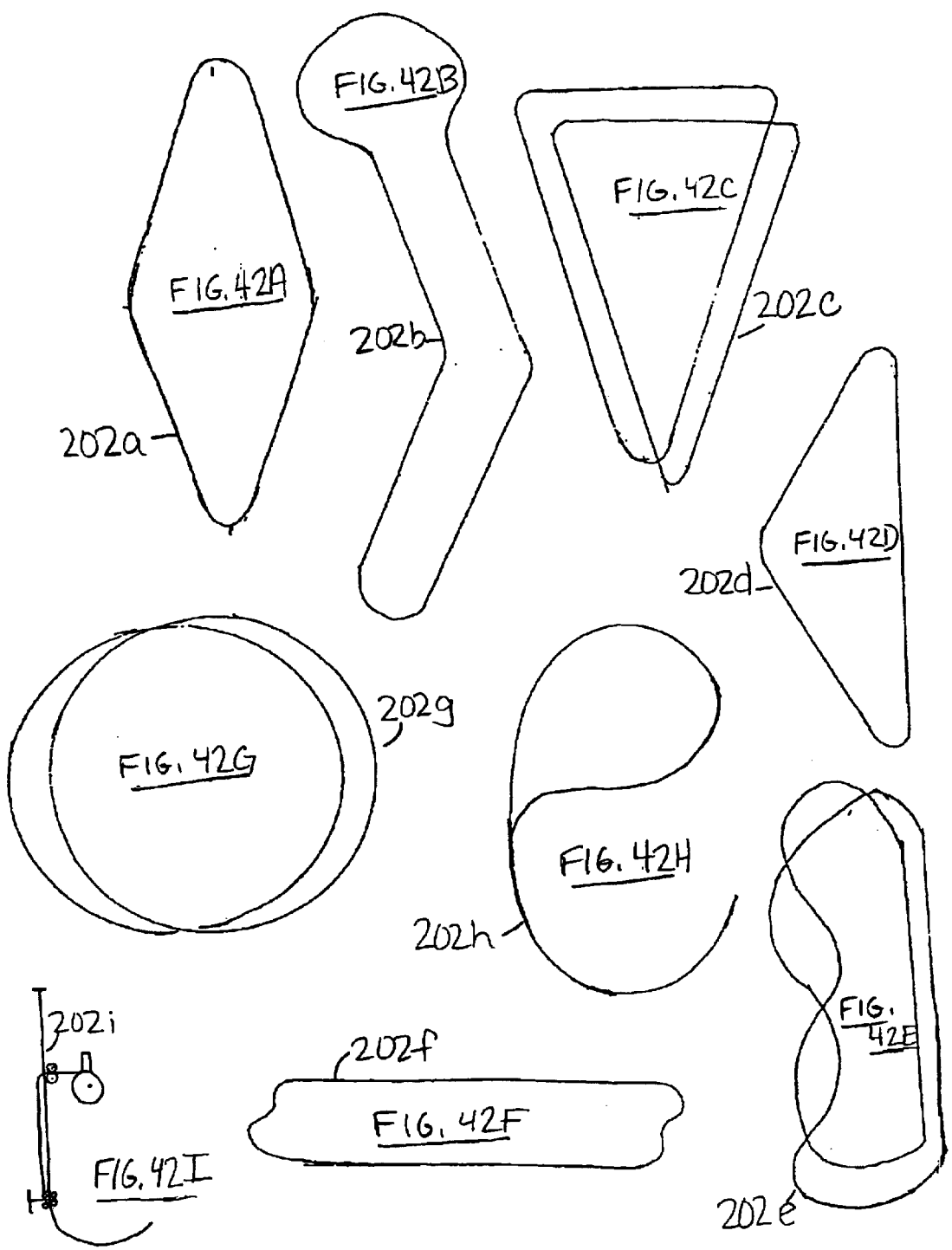

202j

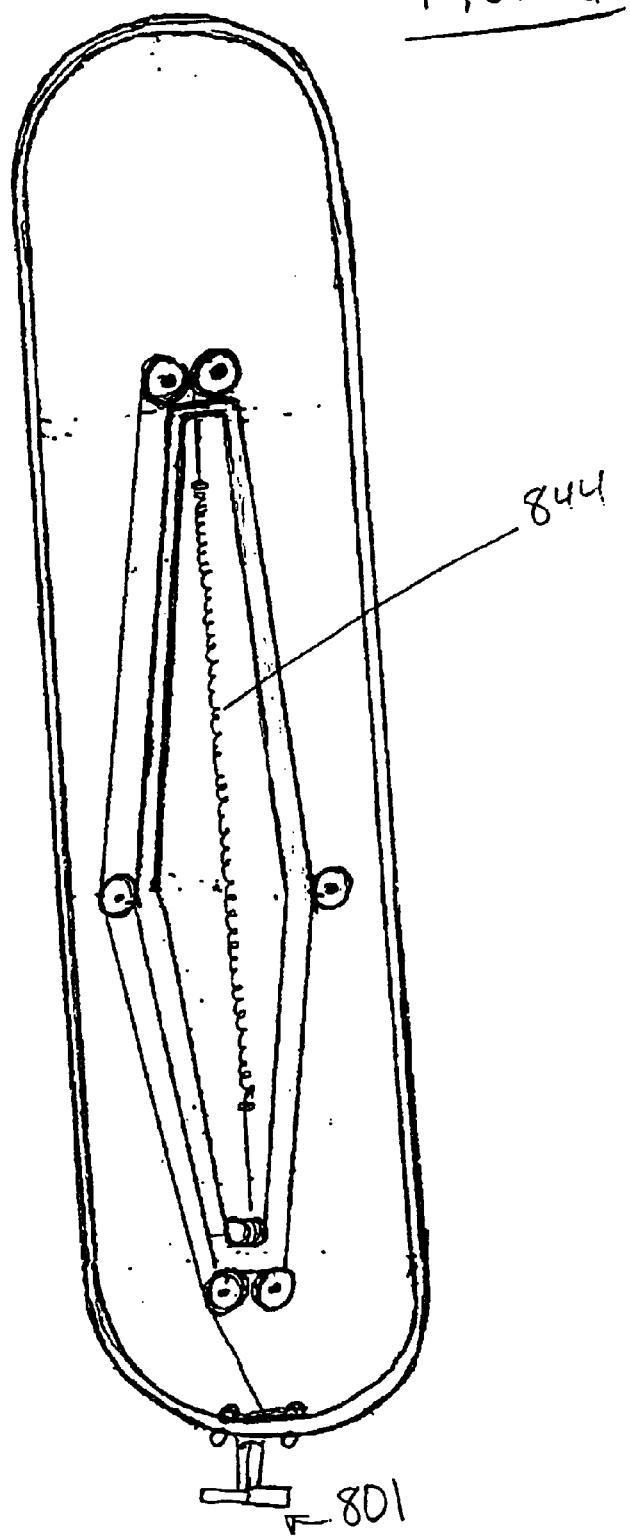

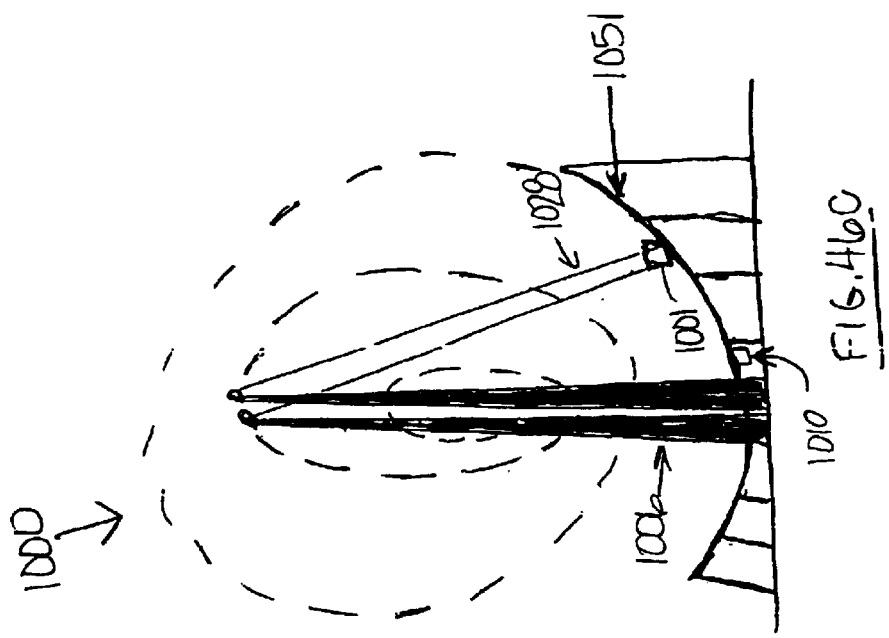
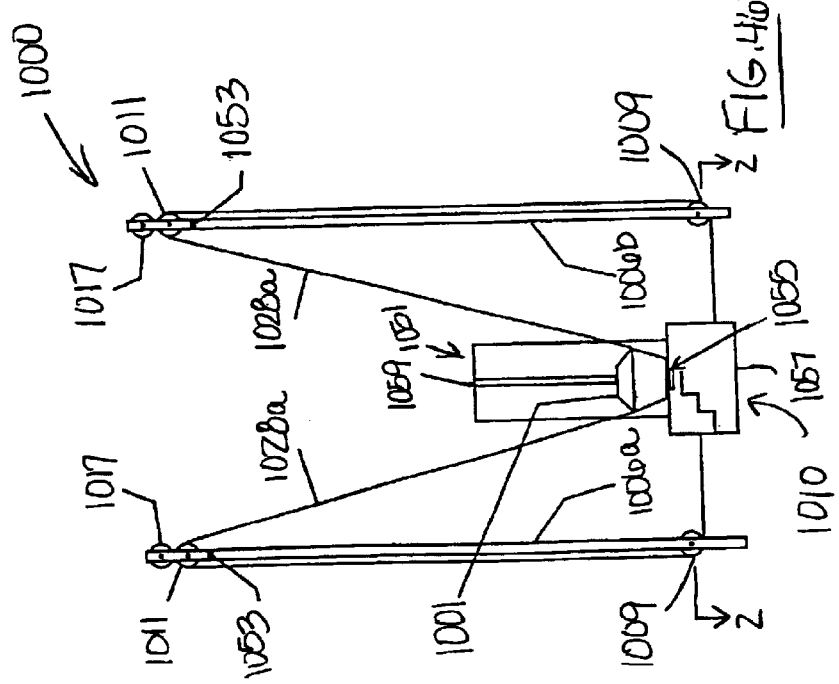

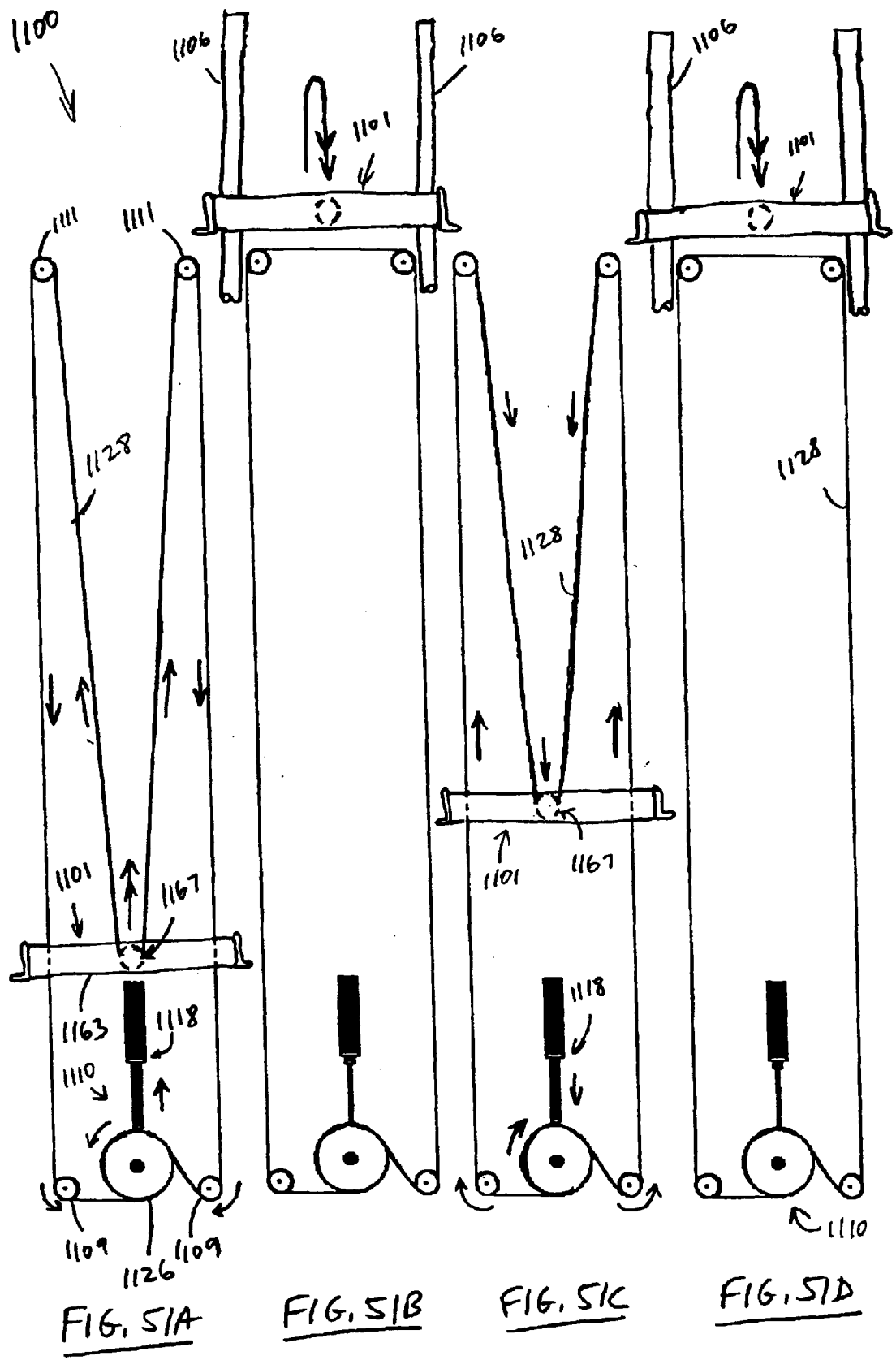

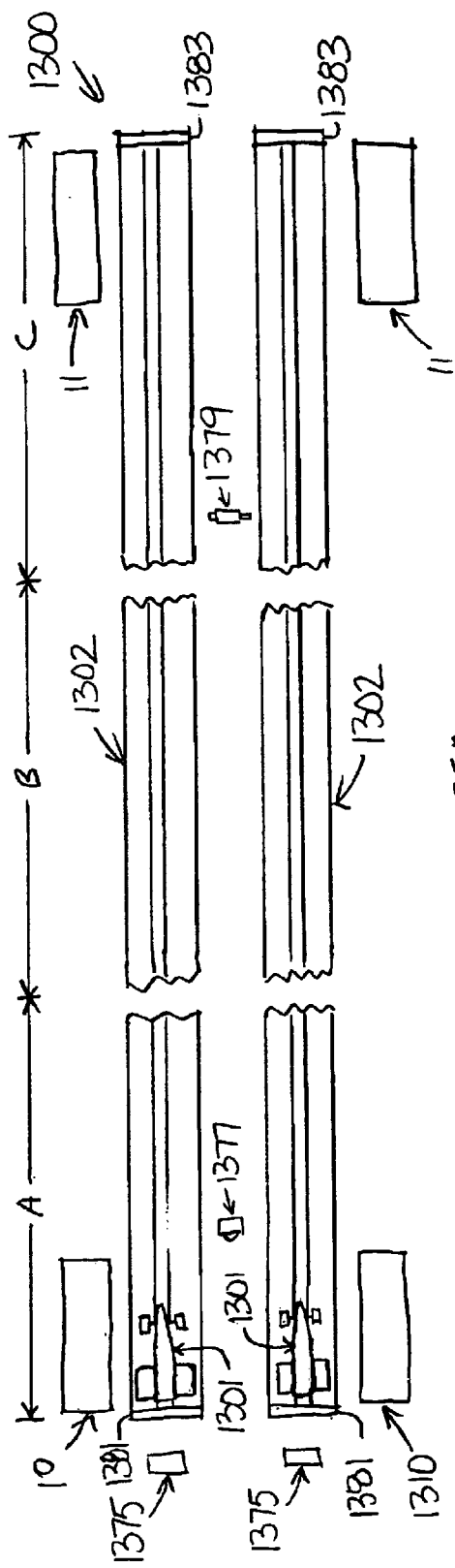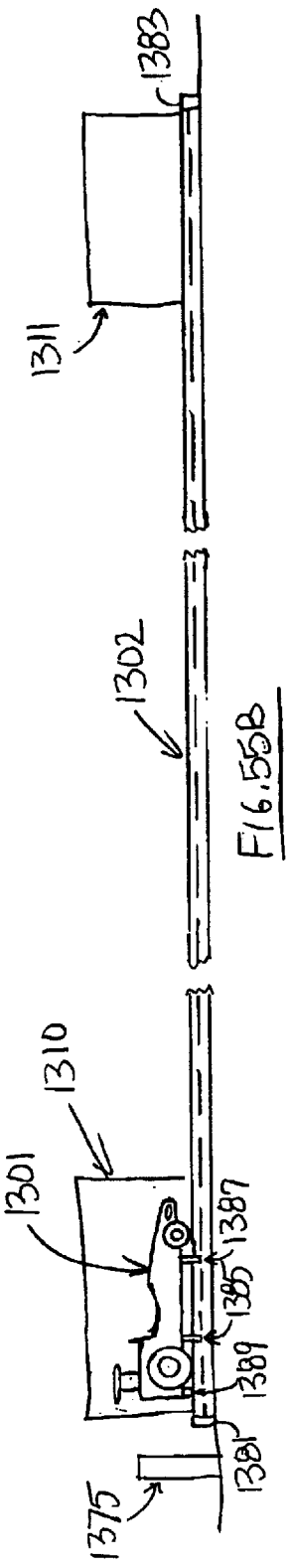
FIG. 55A
FIG. 55B

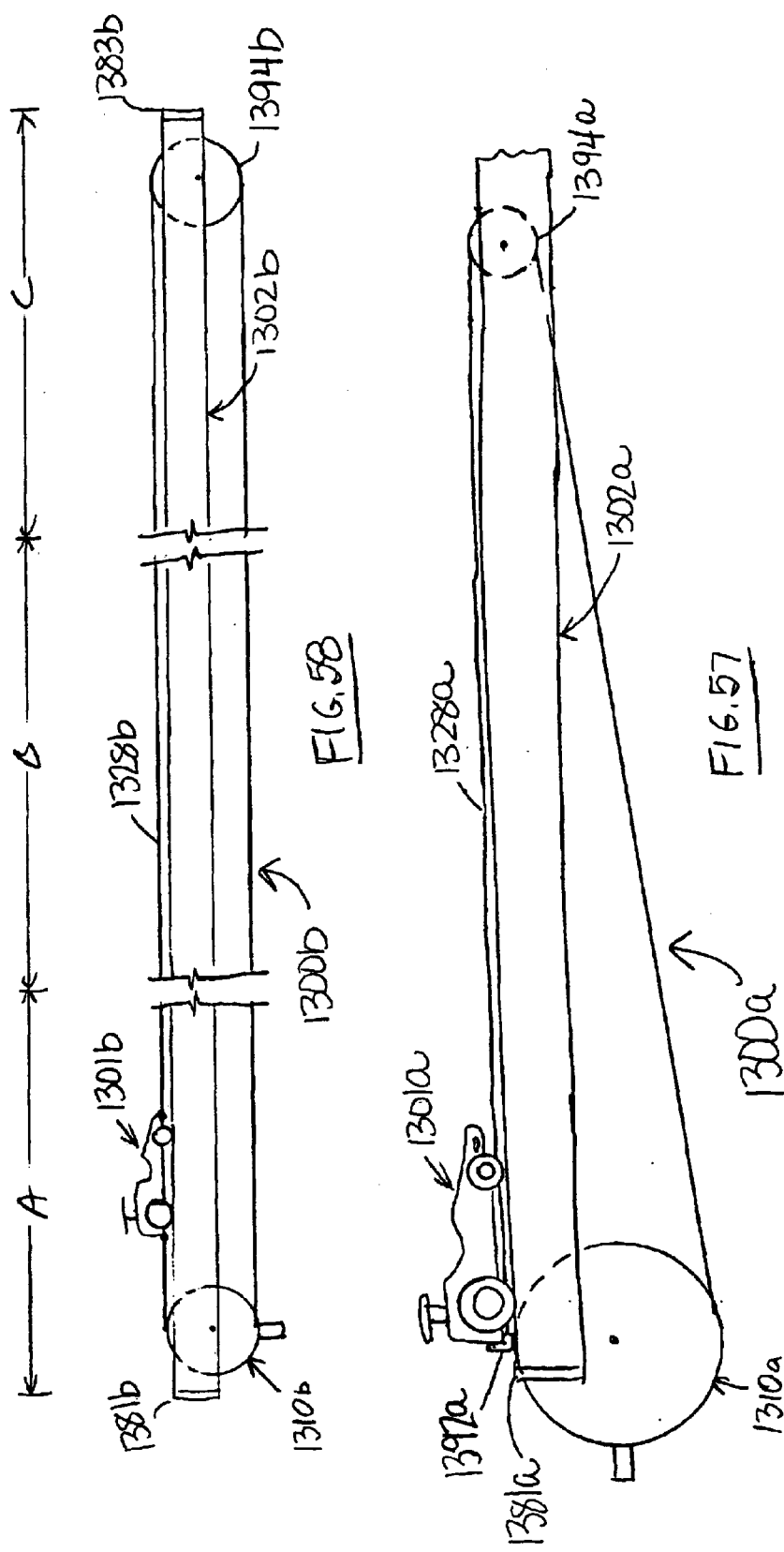

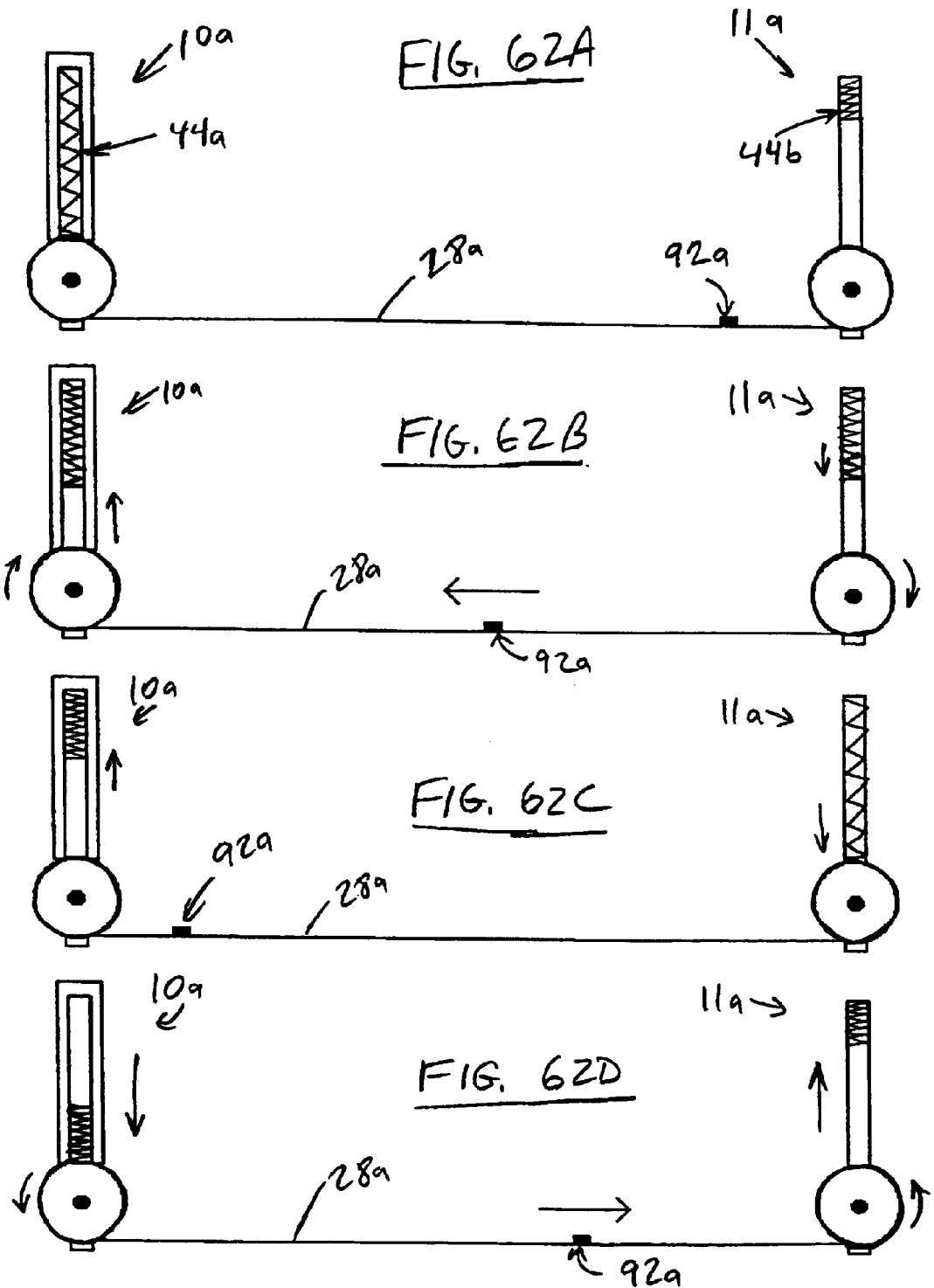

RAPID-WINDING WINCH POWER PLANT AND ASSOCIATED AMUSEMENT RIDES

CROSS REFERENCE TO RELATED APPLICATIONS

This continuation-in-part application claims the priority benefit of U.S. Provisional Application Serial No. 60/338,240 filed on Nov. 2, 2001, U.S. Provisional Application Serial No. 60/323,785 filed on Sep. 20, 2001, U.S. patent application Ser. No. 09/848,641 filed on May 3, 2001 now U.S. Pat. No. 6,561,916, and U.S. Provisional Application Serial No. 60/265,823 filed on Feb. 1, 2001, all of which are hereby incorporated by reference in their entirety.

TECHNICAL FIELD

The present invention relates to amusement rides and, more particularly, to a rapid-winding winch for launching and/or braking a passenger carriage of an amusement ride.

BACKGROUND OF THE INVENTION

Amusement rides of a variety of types have provided great thrills to many people over the years. Well known rides include roller coasters, parachute and elevator drops, bungee jumps and free fall rides, vertical accelerator rides, dragster rides, and so forth. Many of these amusement rides include energy storage mechanisms for launching a carriage carrying one or more passengers along a track or through the air. Many of these energy storage mechanisms include bungee cords for storing a charge and then discharging to launch the carriage.

In the use of such energy storage mechanisms, however, the connections at the ends of the bungee cords weaken due to the mechanical stresses and strains caused by the frequent stretching of the bungee cords. If left unchecked, these connections and/or the bungee cords themselves will eventually fail. If there were such a failure while the ride was in use, the result could be serious injury to the passengers in the carriage. In order to maintain the safety of the ride, the operator of the ride must regularly change out the bungee cords and/or the end connections of the bungee cords. This can be a costly and time-consuming procedure in materials and labor. Furthermore, because of the potential for injury or even death to passengers, some people consider all amusement rides with bungee cords to be inherently unsafe, even though a particular ride may be properly maintained.

Accordingly, what is needed but not found in the prior art is an energy storage mechanism that launches a carriage of an amusement ride to a high velocity in a short period of time, but that does not use bungee cords. There is also a need for an energy storage mechanism that provides an automatic braking action on the carriage, without using bungee cords. Additionally, there is a need for new amusement rides that utilize the benefits of such an energy storage mechanism. Furthermore, there is a need for such an energy storage mechanism that is safe, reliable, and cost-effective to make and use.

SUMMARY OF THE INVENTION

In view of the foregoing, it will be appreciated that the present invention provides a rapid-winding winch for an amusement ride that launches a carriage of the amusement ride to a high velocity in a short period of time, without the deficiencies of the prior art. The winch can be used in conjunction with a variety of types of amusement rides, including roller coasters, dragster rides, vertical accelerator rides, parachute and elevator drops, bungee jumps and free fall rides, merry-go-rounds, rocket launcher rides, and so forth.

Generally described, the winch comprises an energy storage mechanism having one or more elastic members such as springs, one or more tethers coupled to the elastic members, an axle with the tethers windable and unwindable about the surface of the axle, and drums coupled to the axle with the cables windable and unwindable about the surface of the drums. One or more actuators such as hydraulic cylinders operate to compress, tension, torque, or otherwise deform and thereby charge and store energy in the elastic members. A releasable brake such as a hydraulic, pneumatic, or mechanical friction brake secures the carriage in place while the carriage is loaded with passengers and while the elastic members are charged. Also, the elastic members can be connected between attachment members, with the tethers coupled to one attachment member and the actuators coupled to another one.

In one aspect of the invention, the drum has a diameter that is greater than a diameter of the axle, thereby providing a mechanical advantage when winding and unwinding the cables to move the carriage. When the brake is released, the tethers are pulled rapidly upward with great force by the charged elastic members, thereby unwinding the tethers from the axle and causing the axle to rotate. When the axle rotates, the drums also rotate because they are connected together. As the drums rotate, they wind in the cables from around the pulleys, thereby launching the carriage. Because of the fractional ratio of the axle diameter to the drum diameters, one revolution of the drums winds in a much greater length of cable than the length of tether that is wound out in one revolution of the axle. In this manner, the carriage can be launched with great acceleration in response to the winch axle rotating only a few revolutions, or only a part of one revolution.

In another aspect of the invention, the winch may be used as a dampening apparatus, with the force of the carriage pulling and unwinding the cables from the drum which in turn winds in the tethers onto the axle and charges the energy storage mechanism. In this embodiment, the winch may be provided without the actuators and the bark/lock. Accordingly, the winch may be provided as a launching apparatus, a dampening apparatus, or both a launching apparatus and a dampening apparatus.

In a further aspect of the invention, the energy storage mechanism includes telescopic spring devices with the elastic members provided by concentric coil springs. The coil springs are positioned within concentric sleeves having flanges that engage the ends of the coil springs to compress the springs when the actuators are operated. In this manner, the energy storage mechanism is charged by the compression of the springs and, therefore, even if a spring were to fail, the cable would not be able to rapidly and uncontrollably unwind. This provides for enhanced safety and eliminates the possibility of catastrophic failure of the ride.

The springs can be provided by a first catch spring, a second catch spring, and a launch spring, with the launch spring stronger than the second catch spring which is stronger than the first catch spring. The size and strength of the springs can be selected so that the launch spring is used to launch the carriage and the catch springs are used to dampen the motion of the carriage so it is gently slowed without jerking about the passengers more than is desired.

In another form of the invention, the elastic member is provided by a spring that is spiraled and mounted onto the axle. The spring can be provided by a torsion, flat spiral, power, clock, or main spring. In this way, the springs are charged and discharged as the axle is rotated, so that the tethers are not needed.

As mentioned, the winch may be used with a wide variety of amusement rides. For example, the winch can be used with a roller coaster ride that has a support structure having one or more towers with pulleys mounted on them, a track such as an open or closed loop mounted to the support structure, a passenger carriage supported and guided by the track, and a cable routed around the pulleys and connected between the carriage and the winch. The winch has a rapid-winding capability for launching the carriage with great acceleration to achieve the desired thrill of the ride. Because of the rapid-winding capability of the winch, the cables can be connected directly to and between the carriage and the winch, without intermediate cord sections having bungee cords or springs. Because the launching force is provided by the winch and because there are no cable sections or connections requiring frequent replacement, the stigma of unsafety is avoided.

In another aspect of the invention, the height, shape, and position of the towers, the number, length, and strength of the elastic members, and the travel and power of the actuators are selected to provide a wide variety of roller coaster rides. For example, the track shapes can include open or closed loops with configurations such as generally oval-shaped, diamond-shaped, oval with a larger radius at the top than at the bottom and with an angled midsection, an inverted triangle-shape, triangle-shaped standing on one of its corners, asymmetrically twisting to produce lateral carriage motion as well as vertical carriage motion during the carriage launching, horizontally-arranged, and/or circular-shaped. Also, the track can be provided with a larger radius at the top, a single intermediate section, and a curved deceleration ramp, or with a single vertical section for the carriage's ascent and descent and a curved deceleration ramp.

As another example, two accelerator winches and two decelerator winches can be used with a dragster ride that has two dragster vehicles or other passenger carriages, two side-by-side track assemblies upon which the dragsters ride, retracting assemblies (such as winches) for forcing the dragsters back to a "start" position, retaining assemblies (such as latches) for holding the carriages in place and selectively releasing them, "Christmas tree" starting light assemblies, and electric eye sensors for terminating operation of a timing mechanism. The accelerator winches launch the carriages along the track through an acceleration zone, then the carriages's momentum carries them through a cruising zone, then the carriages enter a deceleration zone. The carriages are engaged by the decelerator winches which effects a braking action to stop the carriages, and then accelerates them back along the track toward the acceleration winch for the process to be repeated. The acceleration winches brake the carriages, similar to the braking action described above.

The winches have a rapid-winding capability for launching the carriage with great acceleration to achieve the desired thrill of the ride. Because of the rapid-winding capability of the winch when used as an acceleration winch, the cables can be connected (fixedly or removably) between the carriage and the winch, without using any bungee cords. Because the accelerating (and decelerating) forces are provided by the winches without bungee cords, and because there are no bungee cord connections requiring frequent replacement, the stigma of unsafety is avoided.

In another aspect of the invention, when the winch is used as a deceleration winch, it provides for decelerating the carriage, without using any bungee cords. When the carriage approaches the deceleration winch, it engages the guide follower and urges it down the track, thereby winding out the cable from the drum and winding in the tethers to charge the energy storage mechanism. This produces a braking effect on the carriage, causing the carriage to momentarily stop before being returned back toward the acceleration winch by the discharging deceleration winch.

In an alternative form of the invention, each track of the dragster ride has two winches, two pulleys, and two cables, with each cable routed around one pulley and back to one winch in a closed loop configuration. In this way, the carriages can be retracted by operation of the winches, instead of by additional means.

In another alternative form of the invention, the dragster ride has only one winch, a pulley positioned at the finish end of the track, and a cable that is routed all the way from the winch to and around the pulley and back to the winch. In this way, only one winch is needed.

In a further aspect of the invention, the dragster or roller coaster track can have a shape that is circular or oval, and/or have sections that are linear, curved, sinusoidal, corkscrew, or of another shape. Also, the track can have an acceleration section, a coasting section, and a deceleration section, with a winch at each end for propelling the carriage back-and-forth along the track. The carriage can be movably attached to the ramp by a guide mechanism. In this manner, the carriage can be launched by the winch along the track into an oscillating, looping, spiral, linear, or other motion.

As yet another example, the winch can be used with a vertical accelerator ride that has two towers, a passenger carriage, and cables that are routed around pulleys on the towers and connected between the carriage and the winch. The winch has a rapid-winding capability for launching the carriage with great acceleration to achieve the desired thrill of the ride. Because of the rapid-winding capability of the winch, the cables can be connected directly to and between the carriage and the winch, without intermediate cord sections having bungee cords or springs. Because the launching force is provided by the winch and because there are no cable sections or connections requiring frequent replacement, the stigma of unsafety is avoided.

In another aspect of the invention, the number, length, and strength of the elastic members, the travel and power of the actuators, and the height of the towers are selected so that the elastic members are discharged before the carriage reaches the tops of the towers. After the carriages passes the tops of the towers, its momentum will then recharge the elastic members until the carriage reaches the apex of its oscillatory trajectory, then the elastic members will again discharge to thrust the carriage back downward. In this manner, the carriage will continue this cycle until the elastic members are completely discharged, at which time the ride is completed and/or relaunched.

In a further aspect of the invention, a ramp may be provided for guiding the path of the carriage when launched by the winch. The ramp can have a shape that is circular or oval, and/or have sections that are linear, curved, sinusoidal, corkscrew, or of another shape. The carriage can be movably attached to the ramp by a race member, roller mechanism, wheels, or another mechanism, and the ramp can have one of more release ramps. In this manner, the carriage can be launched by the winch along the ramp and directed by a release ramp into an oscillating, looping, spiral, linear, or other motion.

In still a further aspect of the invention, there is provided a method for propelling a carriage of an amusement ride. The method can include locking the carriage in a fixed position, charging and storing energy in one or more elastic members, and unlocking the carriage so that it is free to move. The method can further include winding out one or more tethers from a surface of an axle, wherein the tethers are coupled to the elastic members and are wound out under the force of the energy stored in the elastic members; winding in one or more cables about a surface of one or more drums connected to the axle, wherein the cables are wound in responsive to the winding out of the tethers about the axle, the drum surfaces diameter being greater than the axle surface diameter to provide a mechanical advantage; and propelling the carriage in response to the winding in of the cables about the drums, wherein the cables are connected to the carriage. Additionally, the method can comprise winding out the cable from the drums to store a charge in the elastic members, and returning the carriage to locked position.

In still a further aspect of the invention, there is provided another method for propelling a carriage of an amusement ride in a stage fashion. This method can include retaining the carriage in a start position by a brake, charging and storing energy in one or more elastic members by operating the actuators to raise the first attachment member, and releasing the brake so that the carriage is free to move. The method can further include winding out one or more tethers from a surface of an axle, wherein the tethers are coupled to the elastic members and are wound out under the force of the energy stored in the elastic members; winding in one or more cables about a surface of one or more drums connected to the axle, wherein the cables are wound in responsive to the winding out of the tethers about the axle, the drum surfaces diameter being greater than the axle surface diameter to provide a mechanical advantage; and propelling the carriage in response to the winding in of the cables about the drums, wherein the cables are connected to the carriage. In this way, the carriage is launched up the track at a great velocity and over the top of the track.

After the carriages passes the top of the track, it descends down the track and is slowed by the recharging of the elastic members caused by the weight of the carriage pulling and unwinding the cables and thereby winding in the tethers. Thus, the carriage oscillates up and down as the elastic members are recharged and discharged, until the carriage reaches a first equilibrium position to complete the first stage of the ride.

Then the carriage is dropped into a free fall down the track. For example, the carriage can be retained in position by the brake, the actuators operated to lower the first attachment member, and the brake released so that the carriage is free to fall under its own weight. Once the carriage reaches the bottom of the track, its momentum will again pull and wind out the cable thereby winding in the tethers to recharge the elastic members and slow the carriage. Thus, the carriage will oscillate back and forth as the elastic members are recharged and discharged, until the carriage reaches a second equilibrium position to complete the second stage of the ride.

Similar to the first and second stages, the winch then is operated to launch the carriage in the reverse direction from which it came, stop it at a third equilibrium position, drop it into a free fall, and stop it at a fourth equilibrium position, completing a third and fourth stage of the ride. At this point the process can be repeated, if so desired.

Another method of propelling the carriage is similar to that just described, except that the first attachment member is moved from the second position back to the first position while the carriage is still in motion. In this way, the carriage can oscillate for a cycle or two (or more) and, while the carriage is on the upswing, the attachment member can be moved so that when the carriage next oscillates downward it will proceed to free fall without the braking effect of the winch. Thus, the carriage does not come to a stop at the aforementioned first equilibrium position, but instead proceeds to freefall down the track.

The specific techniques and structures employed by the invention to improve over the drawbacks of the prior systems and accomplish the advantages described above will become apparent from the following detailed description of the embodiments of the invention and the appended drawings and claims.

BRIEF DESCRIPTION OF THE DRAWINGS

FIG. 5A is a side elevation view of the telescopic spring device of FIG. 4 in operation, showing the coil springs in a neutral, uncharged position.

FIG. 5B is a side elevation view of the telescopic spring device of FIG. 4 in operation, showing the coil springs in a compressed, charged position.

FIG. 5C is a side elevation view of the telescopic spring device of FIG. 4 in operation, showing the coil springs discharged of compression and now extending to be recharged under tension.

FIG. 7A is a side elevation view of a second alternative telescopic spring device, showing two sets of concentric springs and sleeves with the coil springs in a neutral, uncharged position.

FIG. 7B is a side elevation view of the telescopic spring device of FIG. 7A in operation, showing the coil springs in a compressed, charged position.

FIG. 7C is a side elevation view of the telescopic spring device of FIG. 7A in operation, showing the compressed coil springs discharging.

FIG. 8A is a side elevation view of a third alternative telescopic spring device, showing three concentric sets of two coil springs in series engaged by intermediate flanges, with the springs in a neutral, uncharged position.

FIG. 8B is a side elevation view of the telescopic spring device of FIG. 8A in operation, showing the coil springs in a compressed, charged position.

FIG. 9A is a side elevation view of a fourth alternative telescopic spring device, showing two concentric sets of two coil springs in series, the lower springs for launching and the upper springs for dampening, with the springs in a neutral, uncharged position.

FIG. 9B is a side elevation view of the telescopic spring device of FIG. 9A in operation, showing the launch springs in a compressed, charged position.

FIG. 10 is a perspective view of a first alternative energy storage mechanism, showing the elastic device provided by a torsion spring.

FIG. 11A is a front elevation view of a second alternative energy storage mechanism, showing the elastic members provided by flat spiral, power, clock, or main springs.

FIG. 11B is a cross section view of one of springs of the energy storage mechanism of FIG. 11A.

FIG. 20A is a side view of two axles of the winch of FIG. 1, showing two meshing gears for using two axles with one or more drums.

FIG. 21A is a side view of three axles of the winch of FIG. 1, showing three meshing gears for using three axles with one or more drums.

FIG. 21B is a side view of the axles of FIG. 21A, without the gears.

FIG. 22A is a side view of four axles of the winch of FIG. 1, showing four meshing gears for using four axles with one or more drums.

FIG. 22B is a side view of the axles of FIG. 22A, without the gears.

FIG. 26B is a side elevation view of the winch of FIG. 26A in operation, showing the telescopic spring devices being charged by operation of the actuators.

FIG. 27 is a side elevation view of a second exemplary winch, showing the energy storage mechanism and the winding mechanism without actuators.

FIG. 29A is a schematic diagram of the winch of the ride of FIG. 28A, showing the operation of the winch when the carriage is at position A of FIG. 29.

FIG. 29B is a schematic diagram of the winch of the ride of FIG. 28A, showing the operation of the winch when the carriage is at position B of FIG. 29.

FIG. 29C is a schematic diagram of the winch of the ride of FIG. 28A, showing the operation of the winch when the carriage is at position C of FIG. 29.

FIG. 29D is a schematic diagram of the winch of the ride of FIG. 28A, showing the operation of the winch when the carriage is at position D of FIG. 29.

FIG. 29E is a schematic diagram of the winch of the ride of FIG. 28A, showing the operation of the winch when the carriage is at position E of FIG. 29.

FIG. 29F is a schematic diagram of the winch of the ride of FIG. 28A, showing the operation of the winch when the carriage is at position F of FIG. 29.

FIG. 30F is a schematic diagram of the winch of the ride of FIG. 28A, showing the operation of the winch when the carriage is at position F of FIG. 30.

FIG. 30G is a schematic diagram of the winch of the ride of FIG. 28A, showing the operation of the winch when the carriage is at position G of FIG. 30.

FIG. 30H is a schematic diagram of the winch of the ride of FIG. 28A, showing the operation of the winch when the carriage is at position H of FIG. 30.

FIG. 30I is a schematic diagram of the winch of the ride of FIG. 28A, showing the operation of the winch when the carriage is at position I of FIG. 30.

FIG. 30J is a schematic diagram of the winch of the ride of FIG. 28A, showing the operation of the winch when the carriage is at position J of FIG. 30.

FIG. 37 is a side elevation view of a third exemplary amusement ride, showing a support structure with four towers and an open loop track with deceleration ramps.

FIG. 38A is a side elevation view of the carriage of the ride of FIG. 37, showing the roller assembly for guiding the carriage along the track.

FIG. 38D is a perspective view of the roller assembly and track of FIG. 38B, showing the wheel housing and the wheels.

FIG. 38E is a perspective view of the roller assembly and track of FIG. 38D, showing the wheels riding on the track supported by the support structure.

FIG. 40 is a side elevation view of a fifth exemplary amusement ride, showing a generally triangular support structure with a closed loop track in the general shape of an inverted heart.

FIG. 41A is a side elevation view of a sixth exemplary amusement ride, showing a generally triangular support structure with a closed loop track disposed around it.

FIG. 42A is a schematic diagram of an alternative track arrangement of the ride of FIG. 28A, showing a diamond-shaped track.

FIG. 42B is a schematic diagram of another alternative track arrangement of the ride of FIG. 28A, showing a track with a larger radius at the top than at the bottom and with an angled midsection.

FIG. 42C is a schematic diagram of another alternative track arrangement, showing an inverted triangle-shaped track.

FIG. 42D is a schematic diagram of another alternative track arrangement, showing a triangle-shaped track standing on one of its corners.

FIG. 42E is a schematic diagram of another alternative track arrangement, showing an asymmetrically twisting track that produces lateral carriage motion as well as vertical carriage motion during the carriage launching.

FIG. 42F is a schematic diagram of another alternative track arrangement, showing a horizontally-arranged track.

FIG. 42G is a schematic diagram of another alternative track arrangement, showing a circular-shaped track.

FIG. 42H is a schematic diagram of another alternative track arrangement, showing a track with a larger radius at its top, a single intermediate section used when the carriage moves upward and downward, and a curved deceleration ramp.

FIG. 42I is a schematic diagram of another alternative track arrangement, showing a track with a single vertical track section for the carriage's ascent and descent, and a curved deceleration ramp.

FIG. 43B is a side elevation view of the ride of FIG. 43A, showing the bungee cord in the charged position.

FIG. 46A is a front elevation view of an eighth exemplary amusement ride in the form of a vertical accelerator ride.

FIG. 46B is a cross sectional view of the winch and vertical accelerator ride taken at line 2—2 of FIG. 46A.

FIG. 46C is a side elevation view of the winch and vertical accelerator ride of FIG. 46A, showing the path of the carriage.

FIG. 51A is a schematic diagram of the operation of the ride of FIG. 50A, showing the carriage being launched upward at a high velocity FIG. 51B is a schematic diagram of the operation of the ride of FIG. 50A, showing a portion of the towers cutaway and the carriage beginning to fall downward after reaching a peak height.

FIG. 51C is a schematic diagram of the operation of the ride of FIG. 50A, showing the carriage just before it reaches the bottom of its oscillatory motion.

FIG. 51D is a schematic diagram of the operation of the ride of FIG. 50A, showing a portion of the towers cutaway and the carriage continuing its oscillatory motion.

FIG. 55A is a plan view of an eleventh exemplary amusement ride in the form of a dragster ride with acceleration and deceleration winches.

FIG. 55B is a side elevation view of the winches and the dragster ride of FIG. 55A.

FIG. 56A is a side elevation view of the acceleration winch of FIG. 55B, showing the dragster carriage in the start position of the acceleration zone.

FIG. 56B is a side elevation view of the acceleration winch of FIG. 55B, showing the dragster carriage being launched through the acceleration zone by the acceleration winch.

FIG. 56C is a side elevation view of the deceleration winch of FIG. 55B, showing the dragster carriage entering the deceleration zone and engaging the deceleration winch.

FIG. 56D is a side elevation view of the deceleration winch of FIG. 55B, showing the dragster carriage stopped by the deceleration winch.

FIG. 56E is a side elevation view of the deceleration winch of FIG. 55B, showing the dragster carriage being returned toward the start position by the deceleration winch.

FIG. 57 is a side elevation view of a first alternative track arrangement of the dragster ride with acceleration and deceleration winches and a cable in a closed loop arrangement.

FIG. 58 is a side elevation view of a second alternative track arrangement used with an amusement ride having a cable in a closed loop arrangement.

FIG. 59A is a side elevation view of a third alternative track arrangement in the form of a traditional roller coaster.

FIG. 59B is a side elevation detail view of the winch and roller coaster of FIG. 59A, showing the winch coupled to and driving the carriage.

FIG. 59C is a side elevation view of a fourth alternative track arrangement with a loop.

FIG. 59D is a side elevation view of a fifth alternative track arrangement with a corkscrew-shaped ramp.

FIG. 59E is a side elevation view of a sixth alternative track arrangement and a people-mover ride with an intermediate track portion that is elevated.

Figure 59A:
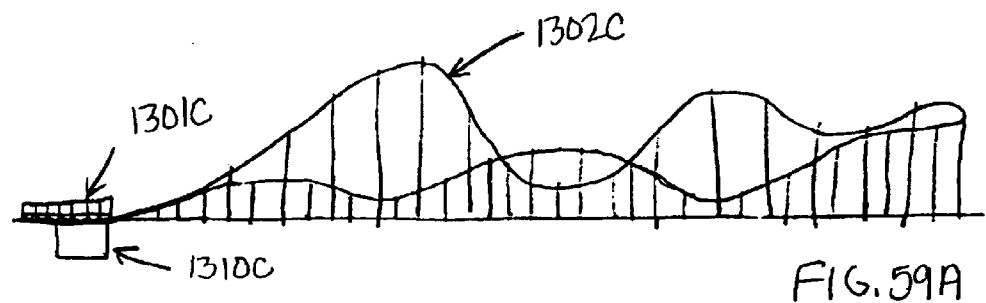
Figure 59B:
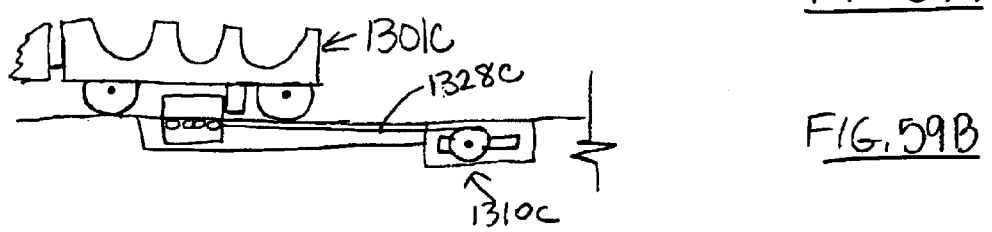
Figure 59C:
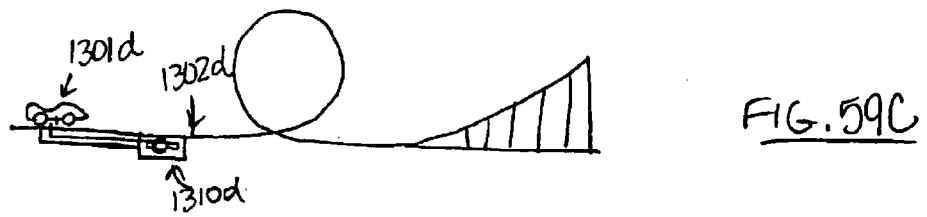
Figure 59D:
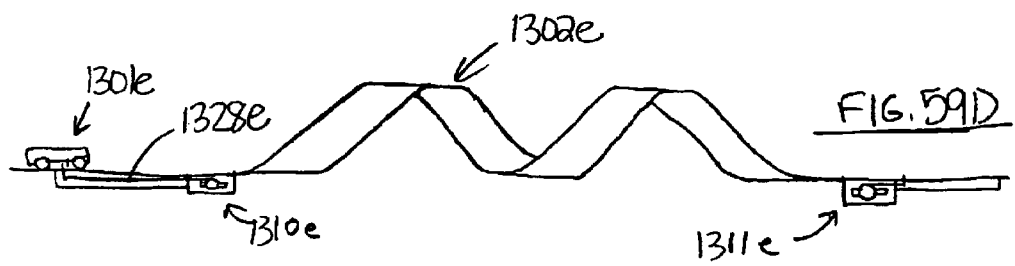
Figure 59E:
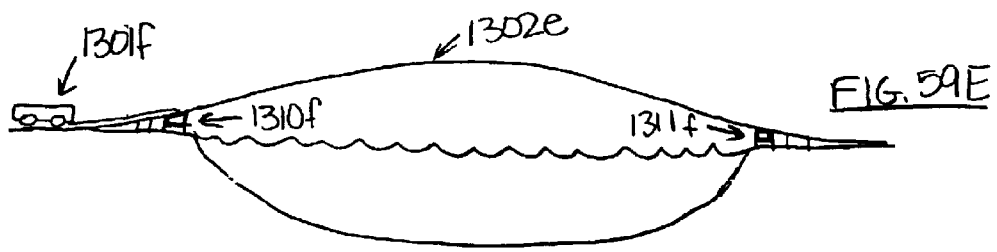
Figure 59F:
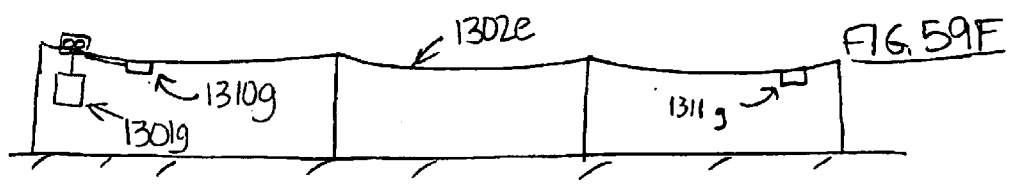

FIG. 59F is a side elevation view of a seventh alternative track arrangement and a people-mover ride with an elevated cable track and the carriage suspended from the cable.

Figure 60A:
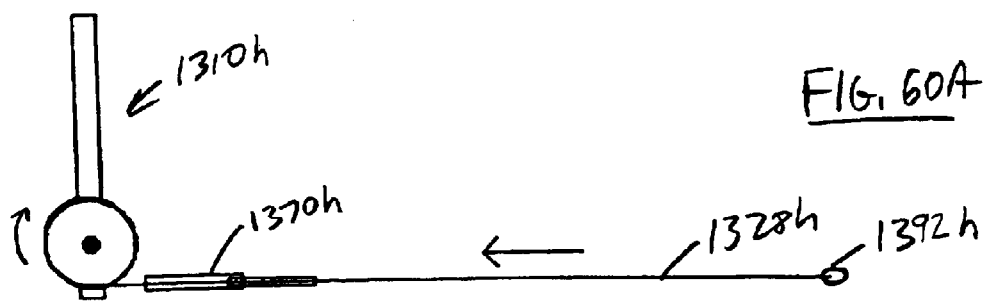

FIG. 60A is a schematic diagram of an eighth alternative cable arrangement of the amusement ride.

Figure 60B:
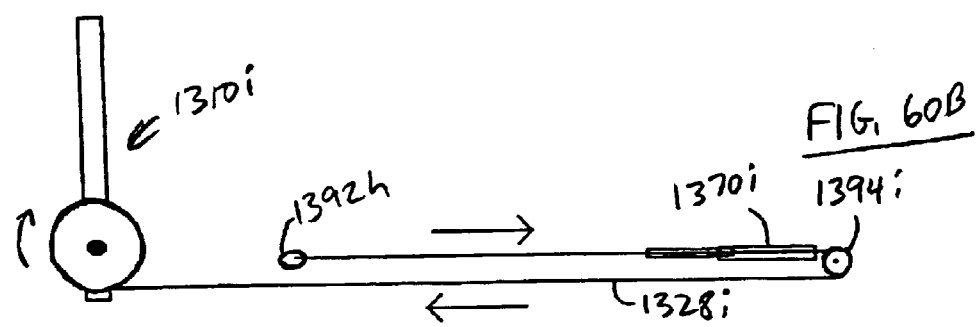

FIG. 60B is a schematic diagram of a ninth alternative cable arrangement, with the cable routed around a pulley.

Figure 60C:
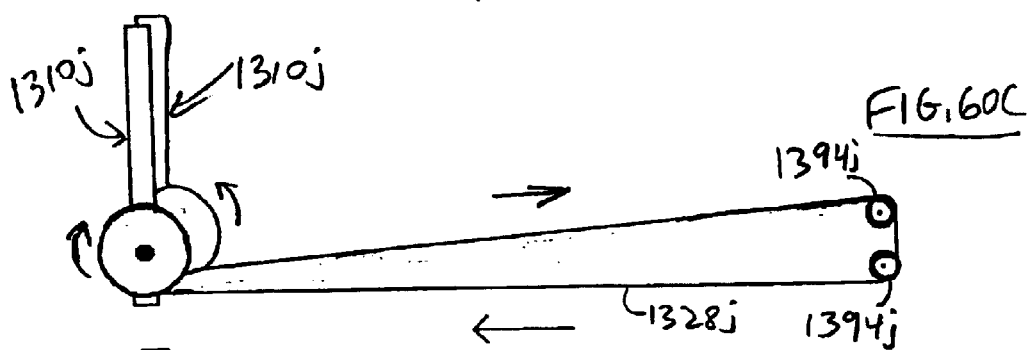

FIG. 60C is a schematic diagram of a tenth alternative cable arrangement, with the cable routed around two pulleys.

Figure 60D:
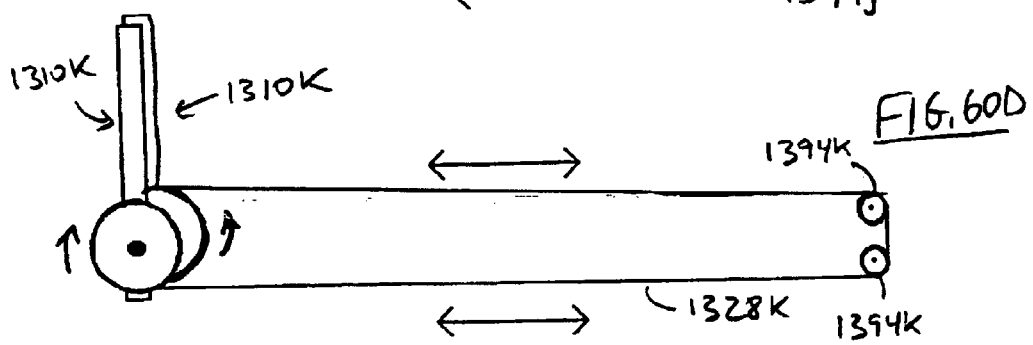

FIG. 60D is a schematic diagram of an eleventh alternative cable arrangement, with the cable connected between two winches.

Figure 60E:
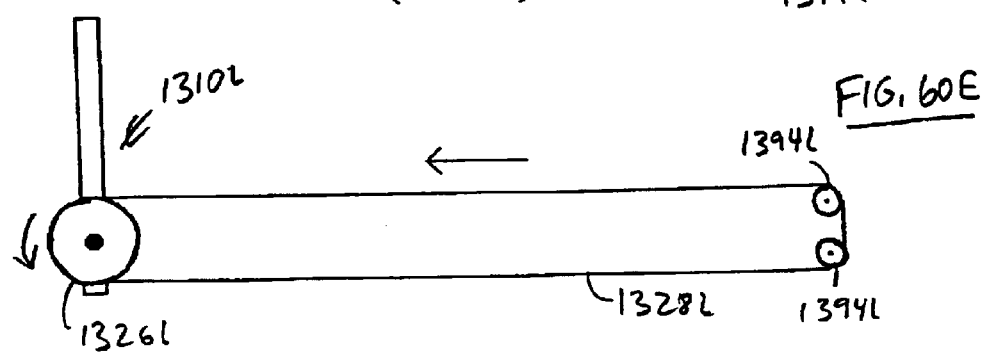

FIG. 60E is a schematic diagram of a twelfth alternative cable arrangement, with the cable routed around two pulleys and connected to one winch.

Figure 60F:
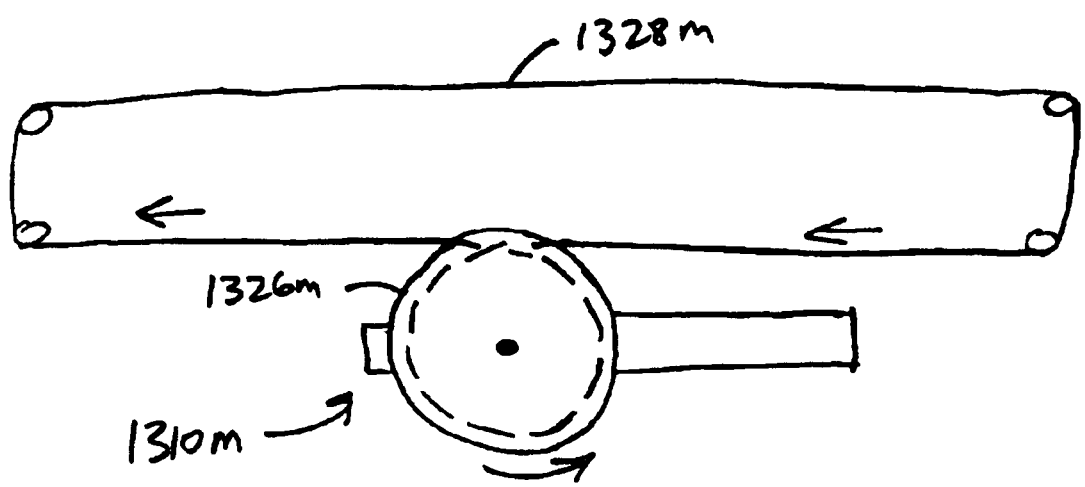

FIG. 60F is a schematic diagram of a thirteenth alternative cable arrangement, with the cable routed all the way around the winch drum.

Figures 61A, 61B, 61C:
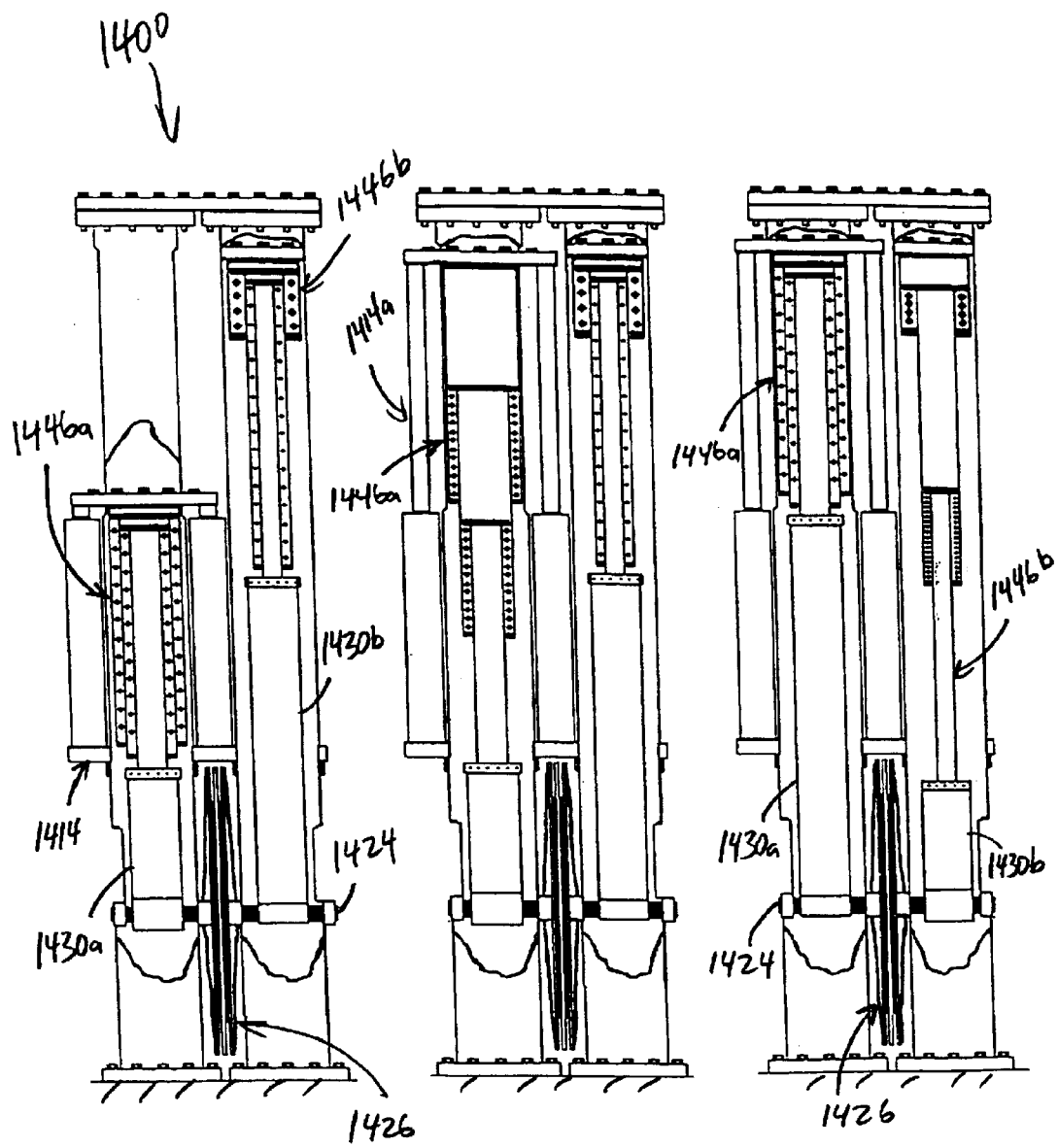

FIG. 61A is a front elevation view of a third exemplary winch, with a cutaway portion showing a launch spring device in the neutral, uncharged state.

FIG. 61B is a front elevation view of the winch of FIG. 61A, showing the actuator operated to charge the launch spring device.

FIG. 61C is a front elevation view of the winch of FIG. 61A, showing the launch spring device discharging and overpowering the dampening spring device.

FIG. 62A is a schematic diagram of an alternative arrangement of two of the winches of FIG. 1A cooperating to function similarly to the winch of FIG. 61A, showing a launch winch in a charged state.

FIG. 62B is a schematic diagram of the winch arrangement of FIG. 62A, showing the launch winch discharging and overpowering the dampening winch.

FIG. 62C is a schematic diagram of the winch arrangement of FIG. 62A, showing the launch winch fully discharged.

FIG. 62D is a schematic diagram of the winch arrangement of FIG. 62A, showing the winches being returned to the positions of FIG. 62A.

DETAILED DESCRIPTION OF THE
EXEMPLARY EMBODIMENTS

Figure 1:
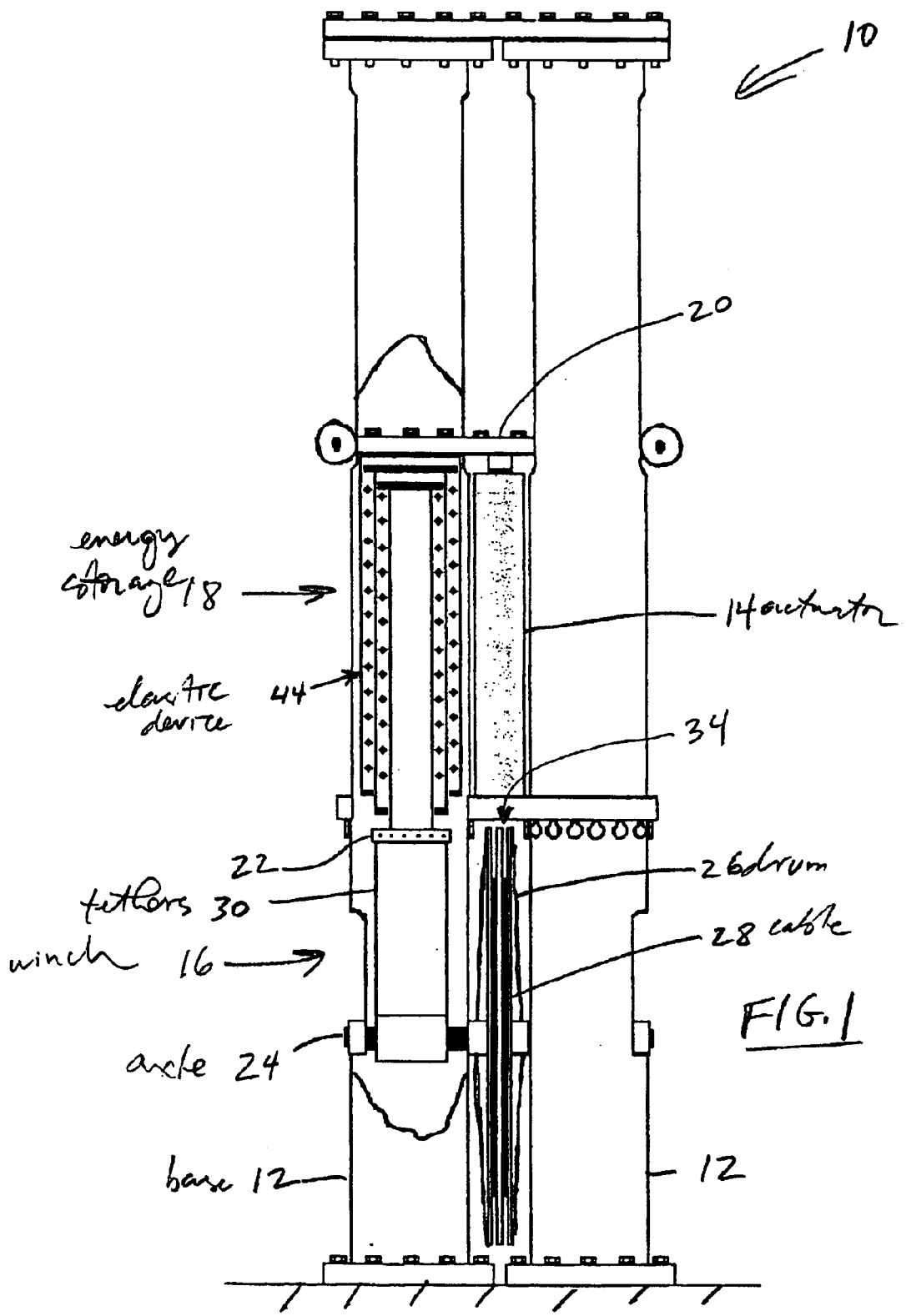
FIG. 1 is a front elevation view of a first exemplary winch, with a cutaway portion showing an energy storage mechanism and a winding mechanism.
Figure 2:
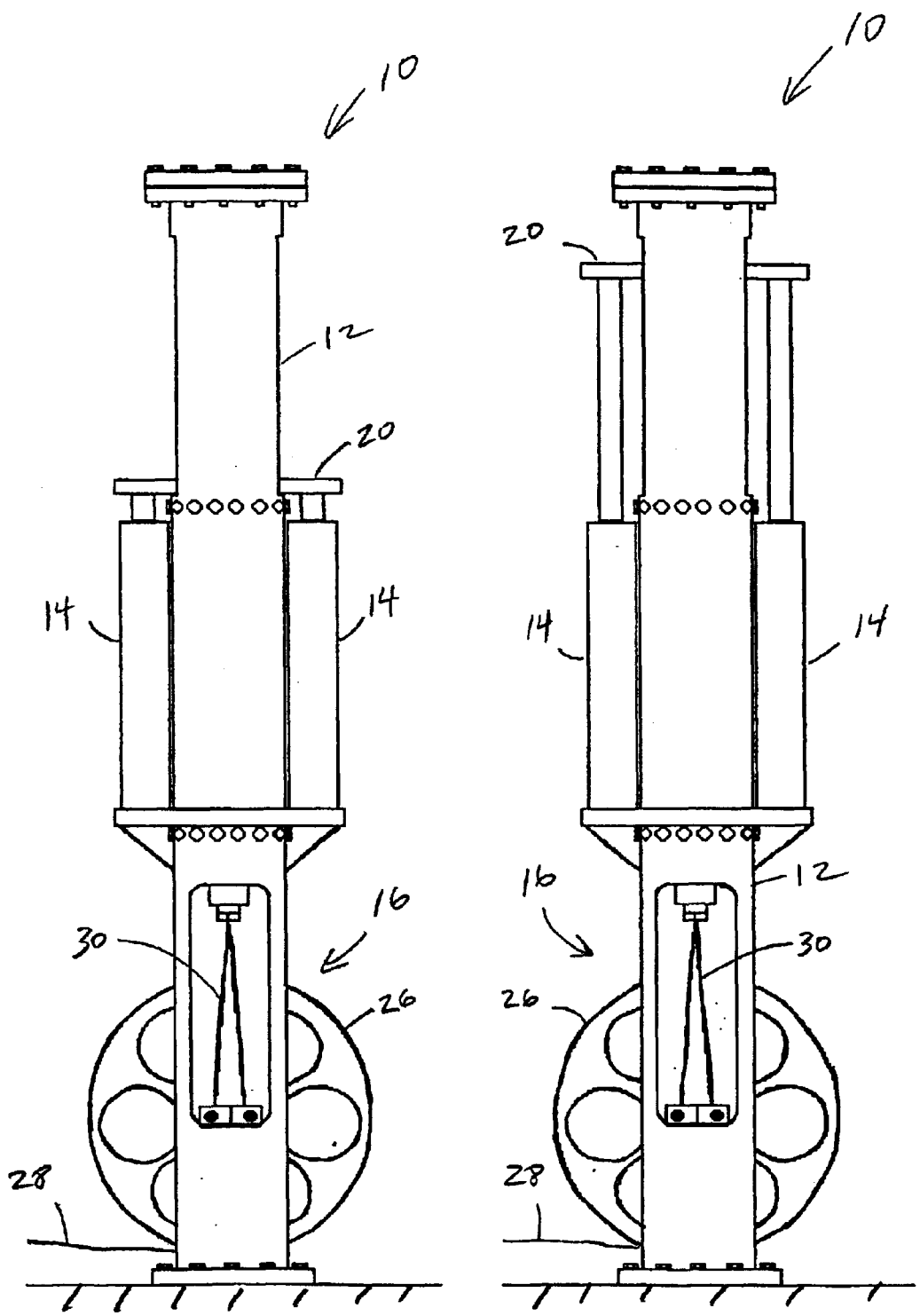
FIG. 2A is a side elevation view of the winch of FIG. 1, showing an actuator in a lowered position.
FIG. 2B is a side elevation view of the winch of FIG. 1, showing the actuator in a raised position.

Referring to FIGS. 1, 2A, and 2B, there is illustrated a winch 10 according to a first exemplary embodiment of the present invention. The winch 10 comprises a base 12, two actuators 14 coupled to the base, a rapid winding mechanism 16 coupled to the base, and an energy storage mechanism 18 coupled to the rapid winding mechanism and to the actuators. The base 12 may be provided by a steel frame, concrete blocks, or another structure made of another material. If desired, instead of being coupled to the base 12, the actuators 14 and the rapid winding mechanism 16 may be coupled to other components of the winch 10 or supported by other structures.

The actuators 14 may be linear actuators such as hydraulic rams of the type that are used on construction cranes to raise and lower their booms and that can be purchased from most hydraulic suppliers. The hydraulic rams may be selected with a travel of a specific distance, for example, about ten feet. Also, the rams may be selected with a specific lifting capability, for example, about 100,000 pounds or more. The rams can further include a safety check valves so that if a system failure occurred the rams would not suddenly collapse or contract. Also, a bleeder valve may be used to lower the rams. Such hydraulic rams can be obtained from the Bearendsen Fluid Power company.

Alternatively, the actuators 14 may be provided by other hydraulic cylinders, pneumatic cylinders, other lineally extendable mechanisms, rotary actuators, gear trains, conventional winches, pulleys, weights, counterweights, manual levers, ratchets, or other mechanisms operable to extend and charge the energy storage mechanism 18. Of course, only one or more than two actuators 14 can be suitably employed, and the energy storage mechanism 16 may be connected directly to the actuators and/or to the rapid winding mechanism 16, as may be desired. The number, length of travel, and power of the actuators 14 are selected based on the power desired to be transmitted to the energy storage mechanism 16. For example, the actuators 14 can be selected with longer travel and more power to launch a carriage of an amusement ride with greater acceleration and over a longer time or distance of acceleration.

The energy storage mechanism 18 may be coupled to the actuators 14 by a first attachment member 20 and to the rapid winding mechanism 16 by a second attachment member 22. The attachment members 20 and 22 may be provided by steel bars or other structures made of other materials. The first attachment member 20 is moved by the actuators 14 to charge and store energy in the energy storage mechanism 18. For example, the actuators 14 can be connected between the first attachment member 20 and the base 12 to push the first attachment member. Alternatively, the actuators 14 can be connected to the first attachment member 20 to pull, rotate, or otherwise move it.

The rapid winding mechanism 16 may be provided by an axle 24 rotatably coupled to the base 12, a drum 26 mounted to the axle and about which is wound and unwound a cable 28, and one or more tethers 30 that wind in and out about the axle and that are coupled to the energy storage mechanism 16. The cable 28 is also fixedly or detachably coupled to a carriage for carrying passengers, so that winding in the cable about the drum 26 propels the carriage.

The axle 24 is rotationally coupled to the base 12 by conventional bearings or the like. Such bearings can be obtained from Motion Industries, Inc. of Birmingham, Ala. The axle 24 may be provided by a heavy gauge pipe, tube, or solid member, that is made of steel or another metal, or by another structure and material selected for the strength that is desired in a given application.

The tethers 30 wind out from the axle 24 in response to the pull of the discharging energy storage mechanism 18 and/or wind in about the axle in response to the motion of the decelerating amusement ride carriage. The tethers 30 may be connected to the second attachment member 22 and the axle 24 by conventional fasteners such as welded-on cable clamps commonly used in the cable industry, by screw-in clamps, by being threaded into the axle or attachment member and screwed down tight, or by bolts, spelter sockets, welds, or by other fastening structures.

Only one or a plurality of the tethers 30 may be used, as desired. Where a plurality of tethers 30 are used, they can be arranged in a row, an array, or otherwise. The tethers 30 may be connected to elastic devices of the energy storage mechanism 18 in a one-to-one, two-to-one, or other ratio, with or without the second attachment member 22. Furthermore, the tethers 48 can be attached in groups to the second attachment member 22 so as not to exert too much force on any one tether, to provide the desired safety or dampening effect or to match the winding capabilities of the axle and drums.

The tethers 30 may be provided by belts of the type commonly used in the mining and lifting industries. Such belts can be made of nylon, KEVLAR, corded steel, or another material, with the number and material of the belts selected to provide the needed strength. Alternatively, the tethers 30 may be provided by wire rope, for example, ¼ inch cable, which can be obtained from the West Florida Wire and Rope company, or by other tether structures known in the art.

The tethers 30 wrap around the surface of the axle 24 and then on top of themselves in a spiral, layered configuration. The tethers 30 may wind into a groove in the axle 24 and/or guide plates can be provided on the axle at the sides of the tethers for ensuring that they wind in on top of themselves. Alternatively, the tethers 30 may wrap around the axle 24 in a coiled, side-by-side configuration along the length of the axle (see FIGS. 12A and 12B).

If the tethers 30 wrap around on top of themselves, the more wraps of the tether that are wound in, the larger the diameter of the then outer tether segment. Thus, when beginning to wind out the tethers 30, the then outer tether segment is easier to wind in because the tether is curved about a larger diameter and thereby unwinds with a greater moment arm. This arrangement also produces less stress on the tethers 30, thereby providing longer tether life. Also, the tethers 30 can be configured so that, when the energy storage mechanism 16 is fully discharged, the tethers are not fully wound out from the axle, so that at least a portion of the tether still overlaps with another portion thereof. This arrangement reduces the stress and strain on the connection of the tether 30 to the axle 24, for enhanced safety of the winch 10 and the amusement ride.

The drum 26 is coupled to the axle 24 so that the drum rotates with the axle. For example, the drum 26 may be attached to the middle of the axle 24 by bolts. Alternatively, two or more of the drums 26 can be provided, the drum 26 can be positioned at an end or other segment of the axle, and/or the drum can be attached to the axle by other fasteners or connectors.

One end (or other part) of the cable 28 may be attached to the drum 26 by conventional fasteners. For example, holes can be drilled in the drum and the cable ends inserted into the holes, and copper duplex ferrules can be clamped on for additional safety so that the cable will not pull loose from the drum. The drum 56 can be made of aluminum or another material selected for high strength and low weight so that a minimum energy loss occurs when it rotates. Such a drum can be obtained from the Keeler Ironworks company of Memphis, Tenn.

Figure 3:
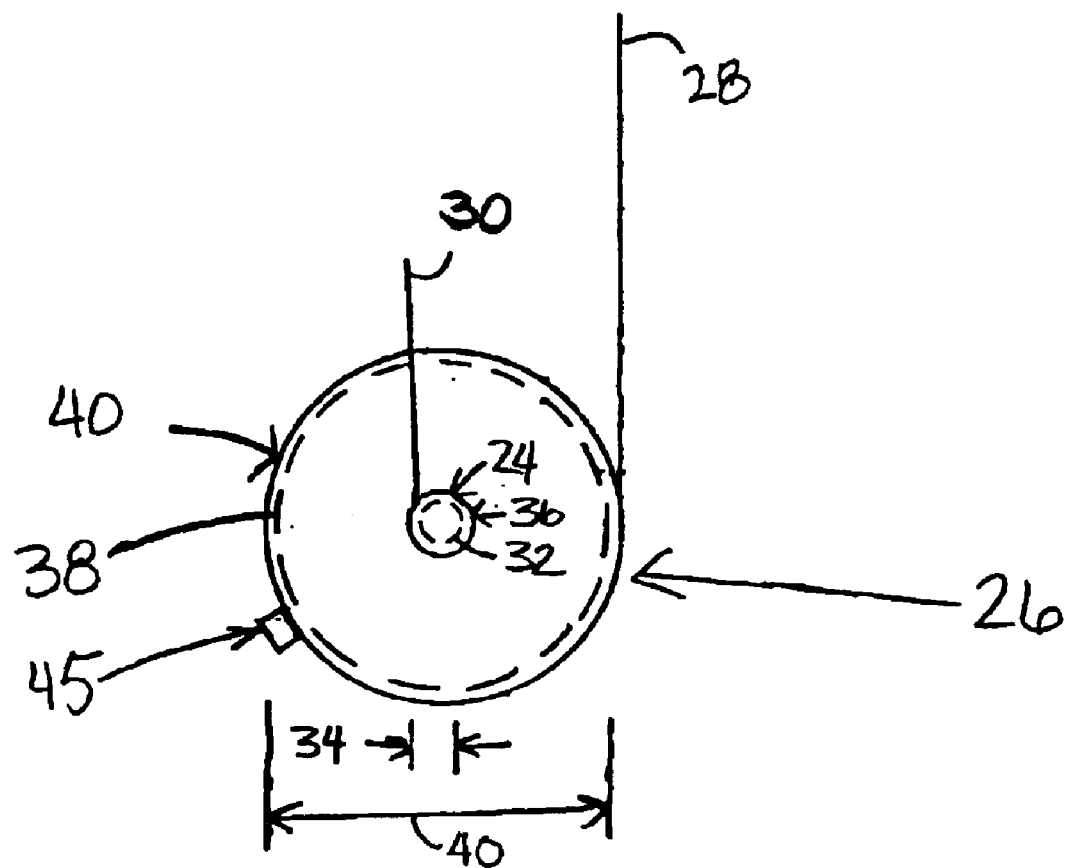
FIG. 3 is a cross sectional view of a portion of the winch of FIG. 1, showing a tether wound on an axle and a cable wound on a drum.

Referring to FIG. 3, the axle 24 has a winding surface 32 about which the tethers 30 are windable and unwindable. The axle winding surface 32 may have an outside diameter 34 of, for example, about six inches, so that the tethers 30 may be wound around it about ten times. Where desired, the axle winding surface 32 may be provided by one or more grooves 36 machined or otherwise formed therein. Each groove 36 may be formed for winding in and out each tether 30 in a spiral, layered arrangement for receiving and directing the winding in and out of the tether 30 on top of itself, formed in a coiled, side-by-side configuration for receiving and directing the winding in and out of the tether 30 along the axle (see FIGS. 12A and 12B), or formed in another arrangement.

The drum 26 has a winding surface 38 about which the cable 28 is windable and unwindable. The drum winding surface 38 may have an outside diameter 40 of, for example, about eight feet. Where desired, the drum winding surface 38 may be provided by one or more grooves 42 machined or otherwise formed therein. The drum 26 may have two grooves 42 for each cable 28 being used, with the cable in a loop configuration and each groove receiving one of the ends of the cable. Alternatively, the drum 26 may have one groove 42 for every cable 28, or other groove-to-cable ratios. Accordingly, each drum 26 may have only one or more than one groove 42, depending on the application. Each groove 42 may be formed in the corresponding drum 26 for receiving and directing the winding in and out of the cable 18 in a spiral, layered arrangement. In this manner, the cable 18 winds in on top of the section of cable wound in by the preceding turn of the drum 26. Alternatively, a plurality of grooves 42 can be formed in the drum 26 for winding in and out the cables 18 in a coiled, side-by-side configuration, or in another configuration (see FIGS. 12A and 12B).

The drum surface diameter 40 is greater than the axle surface diameter 34 to provide a mechanical advantage when winding and unwinding the cable 28 to move the carriage. Thus, the ratio of the diameters 34 and 40 is selected to provide a gear reduction ratio for producing a desired wind-in and wind-out speed of the cable 28 and thereby producing a desired acceleration of the carriage. For example, the drum surface diameter 40 can be about eight feet and the axle diameter 34 can be about six inches, so that for every foot of tether 30 wound out from the axle 24, the drum 26 winds in about sixteen feet of cable 18. Accordingly, the eight foot diameter drum 26 has about a twenty-five foot circumference, so about one hundred feet of cable 28 can be wound in by about four revolutions of the drum 26 and axle 24. By configuring the energy storage mechanism 18 to rotate the drum 26 through those four revolutions in about one second, the carriage can be launched to about seventy mph in that one second. In this arrangement, the winch 10 can operate to very rapidly wind the cable 28 in about the drum 26 to launch and accelerate the carriage to a very high velocity in a very short period of time, to produce the thrills expected by amusement ride passengers.

Additionally, a brake 45 can be provided for selectively preventing the drum 26 from rotating. For example, the brake 45 can be provided by a pin that is removably inserted into a hole in the drum, a pneumatic, hydraulic, or other friction brake assembly, a magnetic brake assembly, or another brake assembly known in the art. Remote or local controls can be provided for an operator to operate and monitor the brake and the actuators 14. Redundant braking systems can be provided as desired for safety. Alternatively, the brake 45 can be configured for selectively preventing the axle 24 from rotating, for selectively securing the cable 28 or the carriage in place, or for otherwise providing the braking desired for the operation of the winch and amusement ride (see also FIGS. 38B and 38C).

Figure 4:
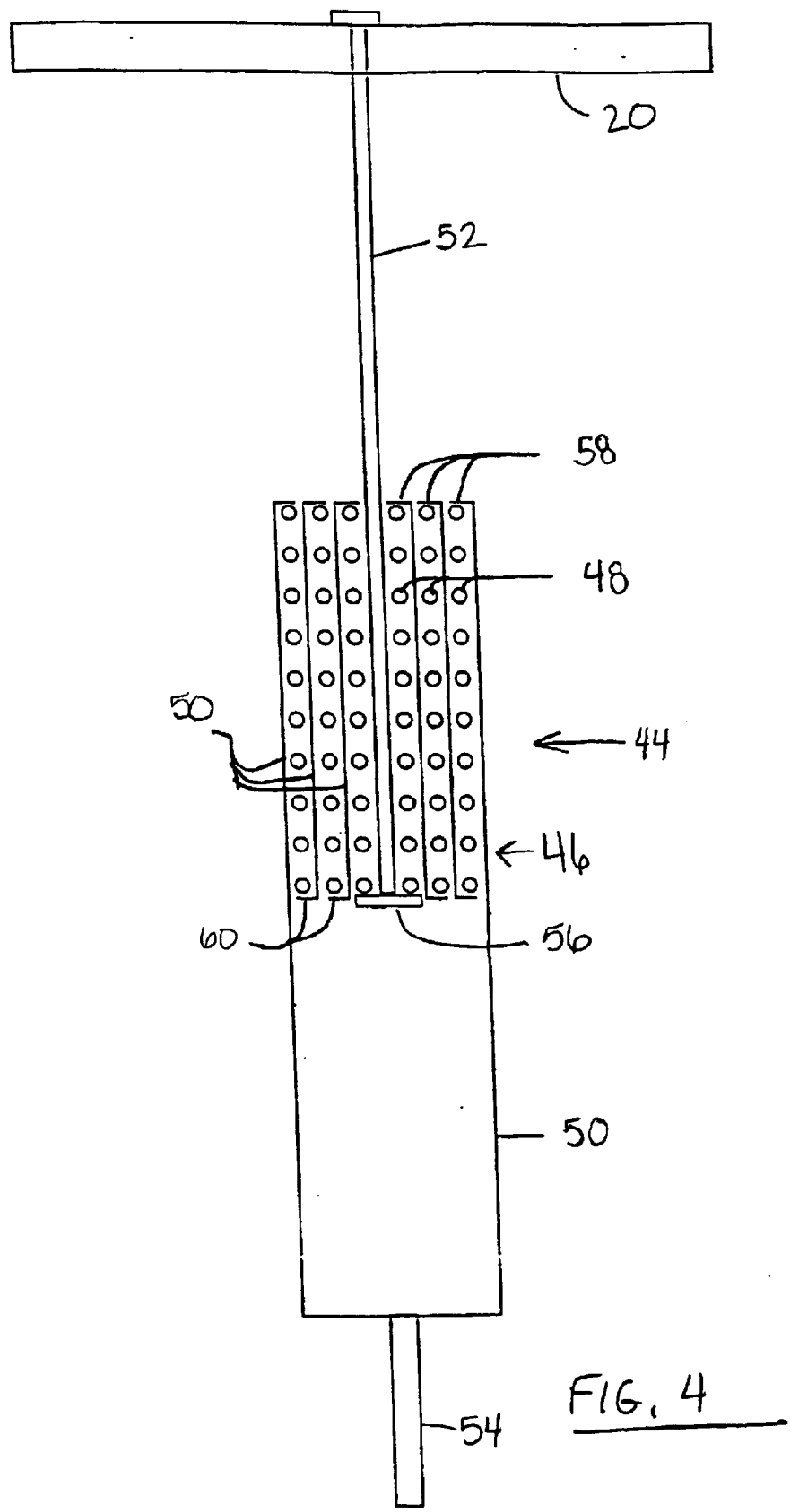
FIG. 4 is a side elevation view of one of the telescopic spring devices of the winch of FIG. 1, showing concentric coil springs disposed within concentric sleeves.

Referring to FIGS. 1 and 4, the energy storage mechanism 18 may have two elastic devices 44 each coupled between the actuators 14 and one (or more of) the tethers 30. For example, the elastic devices 44 may be connected to the attachment members 20 and 22. If desired, only one elastic device 44 can be used, or more than two can be arranged in a row or an array.

The elastic devices 44 can be provided by telescopic spring devices 46 having one or more coil springs 48. Alternatively, the elastic devices 44 can be provided by cords or belts made of an elastic material (such as bungee cords or rubber belts), extension springs, compression springs, leaf springs, a combination of these, or other elastic devices or members. It will be understood that the energy storage mechanism 18 may be provided by hydraulic or pneumatic cylinders, motors, or other mechanisms known in the art, in addition to or instead of the elastic devices 44.

FIG. 4 shows a detail of one of the telescopic spring devices 46 with the coil springs 48 concentrically arranged within concentric sleeves 50. Also, a plunger or first connection member 52 extends through the innermost spring 48 and is connected to the first attachment member 20 and, if desired, a second connection member 54 may be coupled between the outermost sleeve and the second attachment member 22. Of course, the telescopic spring devices 46 may be provided in an inverted orientation with the second connection member 54 extending through the innermost spring 48 and the first connection member 52 coupled to the second attachment member 22. And the outermost sleeve 50 may be connected directly to the second attachment member 22 (without the second connection member 54) or directly to the tethers 30 (without the second attachment member 22), as may be desired.

The connection members 52 and 54 and the attachment members 20 and 22 may be provided by bars, rods, pipes, plates, or the like, made of a metal or other suitably strong material. The connection members 52 and 54 can be secured to the attachment members 20 and 22 and to one end of the spring devices 46 by threaded nuts, bolts, welding, clamps, flanged ends, or other conventional high strength fasteners.

The plunger/first connection member 52 has one (or more) flange 56 connected to an end of the inner coil spring 48 by welding, clamps, bolts, or other connectors. Similarly, the concentric sleeves 50 have two (or more) oppositely directed flanges 58 and 60 (for example, inward and outward) that are spaced apart (for example, at opposite ends of the sleeve) and connected to the springs 48. Thus, the sleeves 50 and springs 48 are arranged in a series-coupled sleeve and spring configuration with one end of each spring 48 connected to the outward flange 60 of one of the sleeves 50 or to the plunger flange 56, and the other end of each spring connected to the inward flange 58 of another one of the sleeves. While the winch shown in FIG. 1 has two spring devices 46 each with two springs 48 and sleeves 50, it will be understood that any number of spring devices each having any number of springs and sleeves can be provided to produce the spring force desired for a given application.

The coil springs 48 may be compression springs of the type that are readily available from garage door manufacturers and spring suppliers. Alternatively, the coil springs 48 may be extension springs, other types of springs, or a combination of these. Such springs can be obtained from Coil Tech of Houston, Tex., or from the Wire Spring Company of Pittsburgh, Pa. The number, length, and strength (i.e., the spring factor) of the springs are selected based on the force desired to be transmitted to the carriage through the cable 28. For example, stronger springs can be selected to launch the amusement ride carriage with greater acceleration and over a longer time or distance of acceleration.

FIGS. 5A, 5B, and 5C show in more detail the operation of one the telescopic spring devices 46. In FIG. 5A, the telescopic spring device 46 is in the neutral, uncharged state. In FIG. 5B, when the actuators are operated to extend the first attachment member 20 (as shown by the arrow), the coil springs 48 are compressed by the plunger flange 56 and the flanges 58 and 60, thereby charging the springs. In FIG. 5C, when the drum 26 is released (for example, by releasing the brake 45), the springs 48 discharge, thereby very rapidly pulling the second connection member 54 (as shown by the arrow) and unwinding the tethers 30 from the axle 24. Accordingly, the rotating axle 24 rotates the drum 26 and winds in the cable 28 at an extremely rapid rate.

In this arrangement, the springs 48 are charged by compression thereof, so that even if one of the springs were to fail, the tether 30 would not be uncontrollably unwound and the spring wound not rapidly recoil, thereby avoiding the possibility of a catastrophic failure. This provides a significant safety advantage over the known energy storage mechanisms of the prior art.

Additionally, because the ends (or other part) of the springs 48 are connected to the plunger flange 56 and/or the flanges 58 and 60, after the springs have been discharged from their compression state, the flanges then extend the springs under tension, as shown in FIG. 5C. In this arrangement, the springs 48 are recharged under tension after the tethers 30 are wound out (and the cables 28 wound in), thereby providing a dampening action on the motion of the carriage.

When three (or any number more than one) concentric springs 48 are used per spring device 46, they can be selected with different spring factors each selected for a particular stage of the ride so that the load at different carriage positions is borne by a different spring. For example, the concentric springs 48 may be provided by a first catch spring, a second catch spring, and a launch spring, each with a different spring factor. The launch spring can be very stiff for launching the carriage, the first catch spring can be very soft for slowing the carriage to a stop, and the second catch spring can be stiffer than the first catch spring for assisting in slowing the carriage, as needed. The launch spring may be the outermost of the springs, since it will be the stiffest and therefore may have the largest diameter. Of course, where desired, the springs 48 can be selected with similar spring factors so that the load is distributed relatively evenly amongst the several springs, the catch springs can be selected with similar spring factors so that the load of dampening the carriage motion is distributed relatively evenly amongst the catch springs, or the spring factors can be otherwise selected.

Figure 6C:
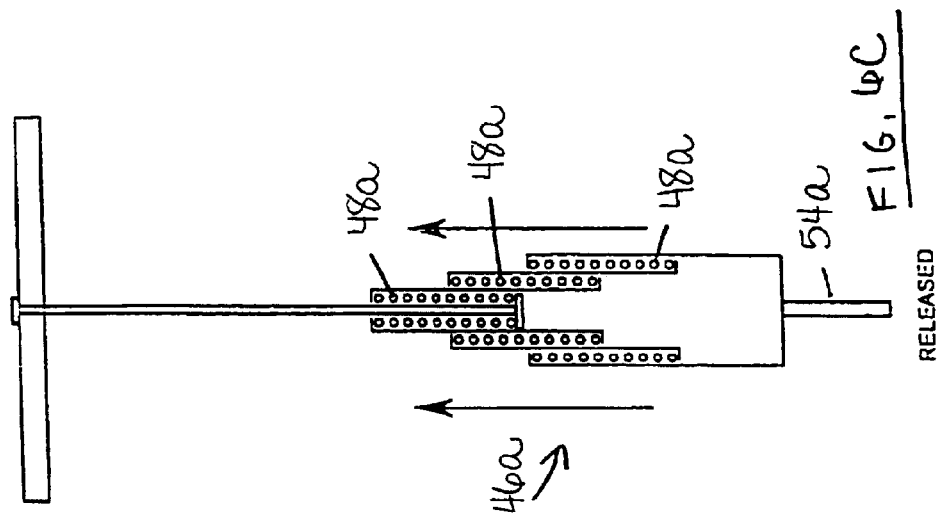
FIG. 6C is a side elevation view of the telescopic spring device of FIG. 6A in operation, showing the compressed coil springs discharging.
Figure 6B:
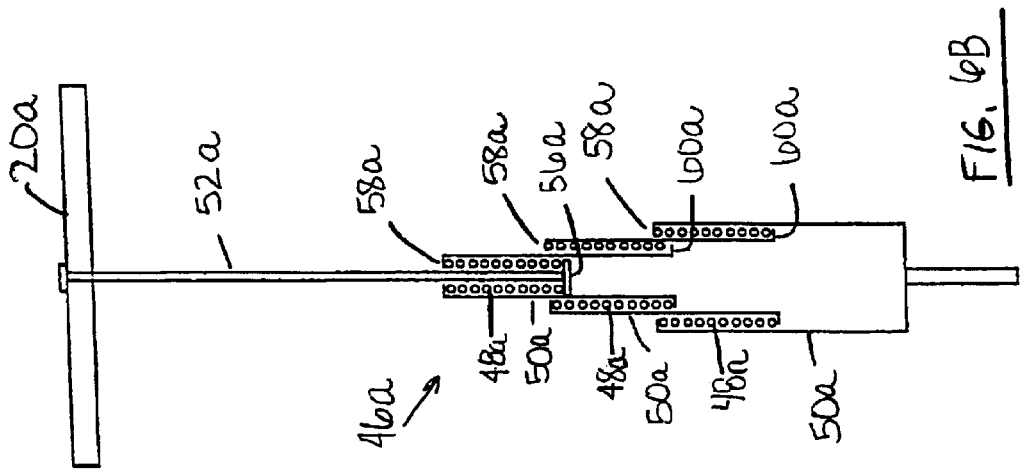
FIG. 6B is a side elevation view of the telescopic spring device of FIG. 6A in operation, showing the coil springs in a compressed, charged position.
Figure 6A:
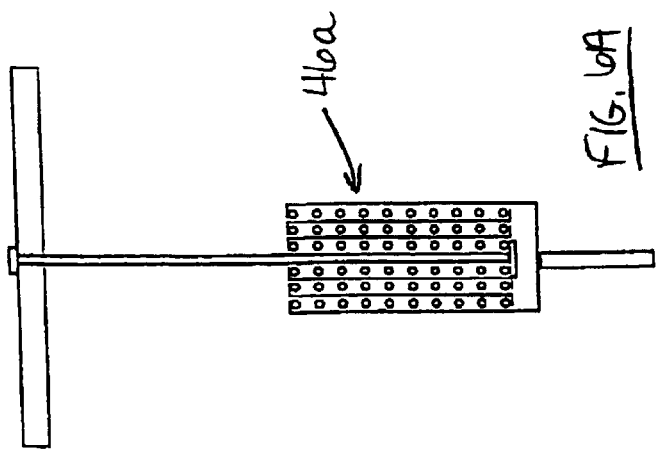
FIG. 6A is a side elevation view of a first alternative telescopic spring device, showing a shortened outer sleeve for compression-only charging and the coil springs in a neutral, uncharged position.

Referring now to FIGS. 6A, 6B, and 6C, there is shown a first alternative telescopic spring device 46a, with the outer sleeve 50a shortened and the ends of the springs 48a engaged by but not connected to the flanges 58a and 60a. In FIG. 6A, the telescopic spring device 46a is in a neutral, uncharged state. In FIG. 6B, when the actuators are operated to extend the first attachment member 20a, the coil springs 48a are compressed, thereby charging the springs. In FIG. 6C, when the drum 26 is released (for example, by releasing the brake 45), the springs 48a discharge thereby pulling the second connection member 54a and unwinding the tethers 30 from the axle 24. Accordingly, the drum 26 rotates and winds in the cable 28 at a very rapid rate. Because the ends of the springs 48a are not connected to the flanges 58a and 60a, after the springs 48a have been discharged from their compression state, the flanges do not extend the springs under tension.

FIGS. 7A, 7B, and 7C show a second alternative telescopic spring device 46b, with two sets of sleeves 50b and springs 48b instead of three. As shown in FIGS. 7B and 7C, in this arrangement, the vertical travel of the spring device 46b and the lateral space taken up thereby will be less than that of the embodiments 37a described above with three springs. As mentioned above, the telescopic spring devices can be provided with any number of springs selected based on the desired spring force and vertical and lateral space constraints. Where only one spring is used, the sleeve need not be provided, and the spring may be compressed and charged by the plunger of the connecting member that extends through the spring.

FIGS. 8A and 8B show a third alternative telescopic spring device 46c, with intermediate flanges 59c in addition to the flanges 58c and 60c. Each sleeve 50c holds two springs 48c stacked end-to-end, with the intermediate flanges 59c cooperating with the plunger flange 56c and the flanges 58c and 60c to compress the springs. In this arrangement, smaller springs may be used to deliver a more uniform force than larger springs.

FIGS. 9A and 9B show a fourth alternative telescopic spring device 46d, having two sleeves 50d with each one holding two springs 48d stacked end-to-end. The inner sleeve and the first connection member 52 may extend beyond the outward flanges 58d to assist in guiding the springs 48d. In this arrangement, only the lower springs are compressed and used for launching, and the upper springs are only used for dampening when the springs are discharging.

As mentioned above, the energy storage mechanism 18 may be provided with elastic devices 44 other than the telescopic spring devices 46. FIG. 10 shows a first alternative energy storage mechanism 18a with a first alternative elastic device 44a. The drum 26a, cable 28a, base 12a, and axle 24a may be similar to those of the previous embodiments. In this form, the elastic device 44a is provided by a torsion spring that is concentrically mounted on the axle 24a and connected between the axle 24 and the base 12a. In this way, the torsion spring 44a is charged and discharged as the axle 24a is rotated, so that the tethers are not needed. Of course, a plurality of torsion springs 44a can be mounted spaced apart on a longer axle, between concentric axles, on parallel axles and interconnected, in a series, parallel, staged, or other configuration, or otherwise. Also, in this form, the end of the torsion spring 44a not connected to the axle 24a can be connected to any stationary structure, so the "base" in this embodiment is intended to mean any such stationary structure and not just the base 12a supporting the axle 24a.

FIGS. 11A and 11B show a second alternative energy storage mechanism 18b with a second alternative elastic device 44b provided by flat spiral, power, clock, or main springs mounted onto the axle 24b. Such springs are known in the art, and can be obtained from the Peninsula Spring Corp. of Gilroy, Calif. Furthermore, a series of the springs 44b may be mounted onto the axle 24b and secured to a lateral section of the base 12b or elsewhere.

Figure 12A:
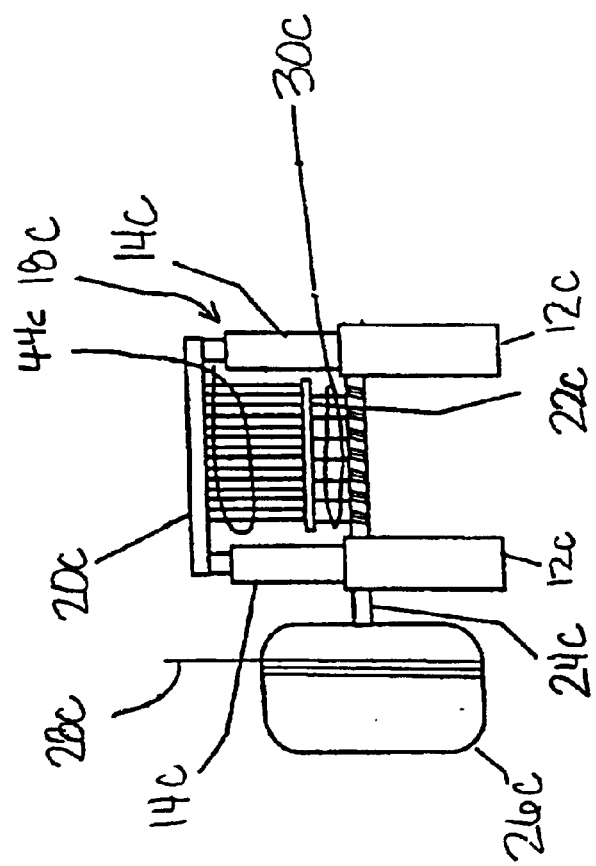
FIG. 12A is a side elevation view of a third alternative energy storage mechanism, showing the elastic devices provided by extension springs or bungee cords.
Figure 12B:
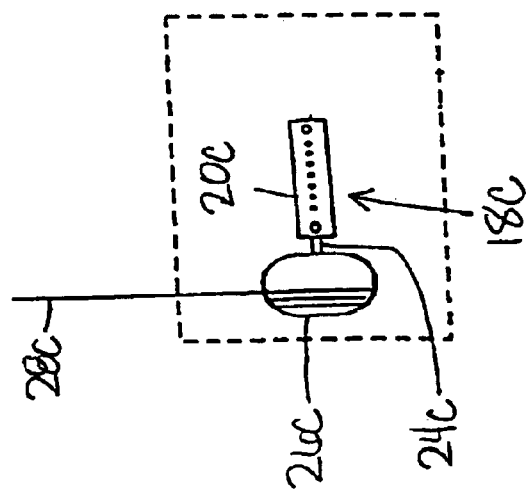
FIG. 12B is a plan view of the energy storage mechanism of FIG. 12A.

FIGS. 12A and 12B show a third alternative energy storage mechanism 18c with a series of elastic devices 44c provided by coil springs, bungee cords, or a combination thereof. The drum 26c, cable 28c, base 12c, axle 24c, and actuators 14c may be similar to those of the previous embodiments. The elastic devices 44c may be attached to the first and second attachment members 20 and 22 without the need for the connection members described above. It will be understood that, alternatively, the elastic devices can be provided by other members having an elasticity, as are known in the art.

Figure 13:
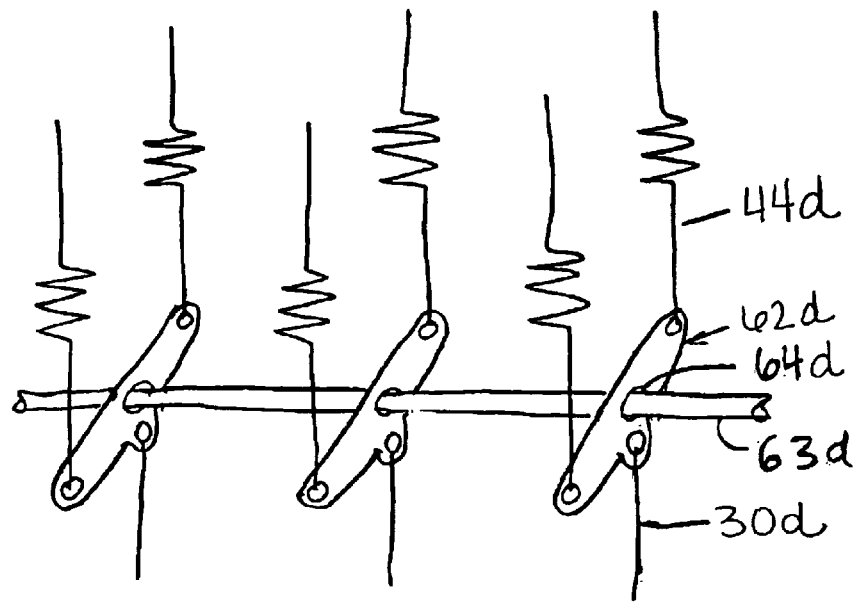
FIG. 13 is a perspective view of a fourth alternative energy storage mechanism, showing alternative attachment members with a safety cable.
Figure 14:
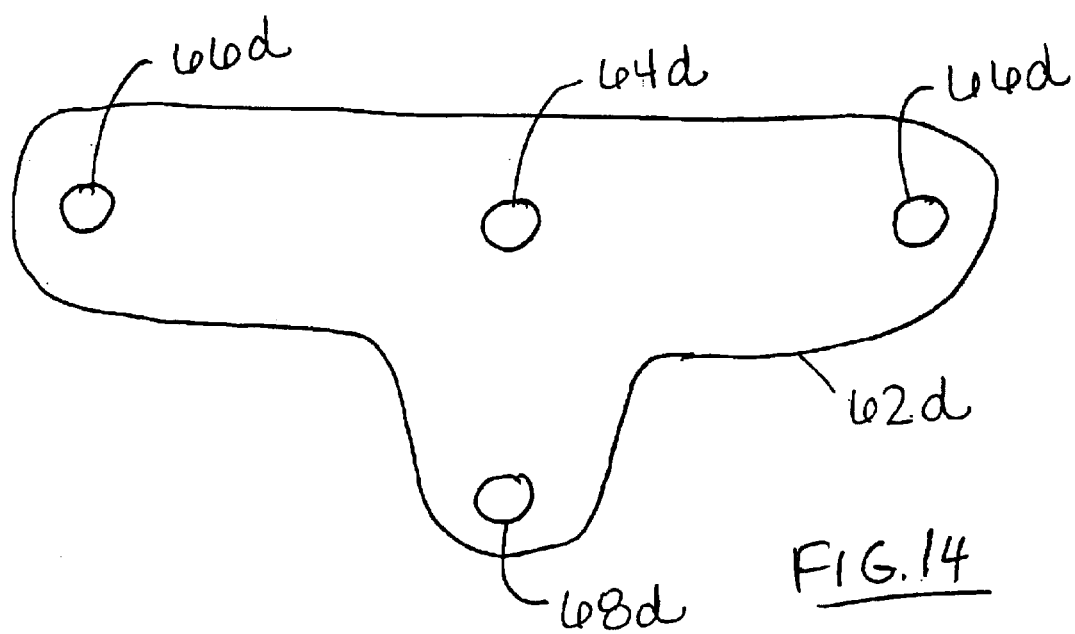
FIG. 14 is a side view of one of the attachment members of FIG. 13, for connecting two elastic devices to one tether.

FIGS. 13 and 14 show a fourth alternative energy storage mechanism 18d with the elastic devices 44d and the tethers 30d coupled together by attachment members 62 in the form of plates, bars, blocks, pipes, or the like. Each attachment member 62 has an opening 64 in it for receiving a safety member 63. The safety members 63 may be provided by a flexible steel cable, although a bar, rod, pipe, or other structure made another material can be suitably employed. The ends of the safety cable 63 may be connected to the base or elsewhere, with plenty of slack in the cable or with a movable connection such as being extended through a slot.

Accordingly, the safety member 63 can move up and down with the tethers 30d. If one of the elastic devices 44d were to somehow break, the safety member 63 will hold the attachment plate 62 in place relative to the other plates, and thereby prevent the tether 30d from being uncontrollably wound in about the axle 24d and the elastic device from rapidly recoiling. Therefore, the main cable 28d will be prevented from being uncontrollably unwound from the drum 26d even if one of the elastic devices or tethers should fail. This provides for enhanced safety of the riders. Of course, the elastic devices can be connected to the base or first attachment member in a similar fashion, as may be desired.

Although the opening 64 is shown as a hole, alternatively, it could be provided by a notch, groove, catch surface on an extension arm, slot, or by another opening. Also, the elastic devices 44d and tethers 30d may be connected to the attachment plates 62 in a conventional manner. For example, the attachment plates 62 can have openings 68 and 70 for connection of cable thimbles on the ends of the elastic members 44d and the tethers 30d, respectively. The openings 66, 68, and 70 can be drilled, pressed, or otherwise formed in the attachment plates 62, and sized to receive the safety member 63. For example, the safety member 63 can be provided by a ¾ inch cable, with the holes sized accordingly.

Figure 15:
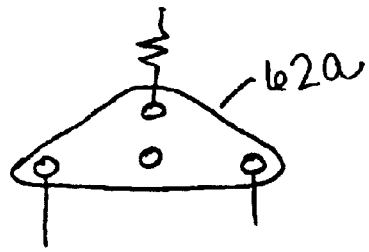
FIG. 15 is a side view of an alternative attachment member for connecting one elastic member to two tethers.
Figure 16:
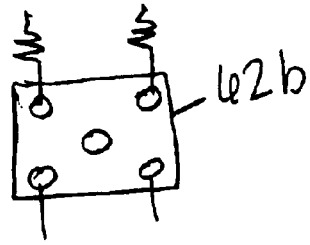
FIG. 16 is a side view of an alternative attachment member for connecting two elastic members to two tethers.
Figure 17:
FIG. 17 is a side view of an alternative attachment member for connecting one elastic member to one tether.
Figure 18:
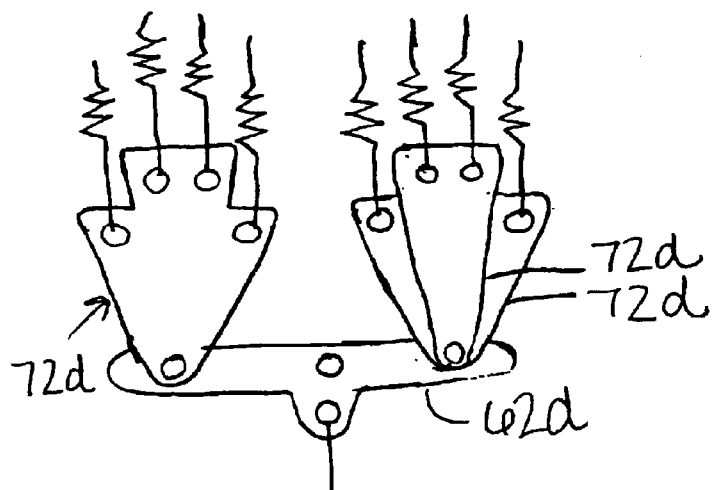
FIG. 18 is a side view of an alternative attachment member for connecting multiple elastic members to one tether.

The attachment plates 62 are made of steel or another material, and can be provided in various shapes, sizes, and hole configurations, depending on the application. Thus, the plate 62 can be generally T-shaped, triangular, or rectangular, or have another regular or irregular shape. The plates 62d can be configured with openings 68 and 70 for connecting two elastic devices 44d to one tether 30d (see FIGS. 13 and 14), one elastic device to two tethers (see plate 62a in FIG. 15), two elastic devices to two tethers (see plate 62b in FIG. 16), one elastic device to one tether (see plate 62c in FIG. 17), or with other configurations. More than one elastic member 44d may be connected to one (or more) tether 30d by providing additional openings, or by providing junction plates 72d (see FIG. 18) for connection to the plate 62d. Such junction plates 72d may be made of one piece or formed by two pieces, and can be made of steel or another material.

It will be understood that the energy storage mechanism 18 may be provided with the elastic devices 44 arranged in a variety of different orientations. For example, two elastic devices 44 may be arranged in line with the axle 24 disposed between them. Alternatively, four elastic devices 44 may be arranged in a T-shaped configuration, with the axle 24 centrally disposed between them. And any number of these sets of elastic devices 44 may be coupled to the same axle 24, as may be desired in a given application.

Figure 19:
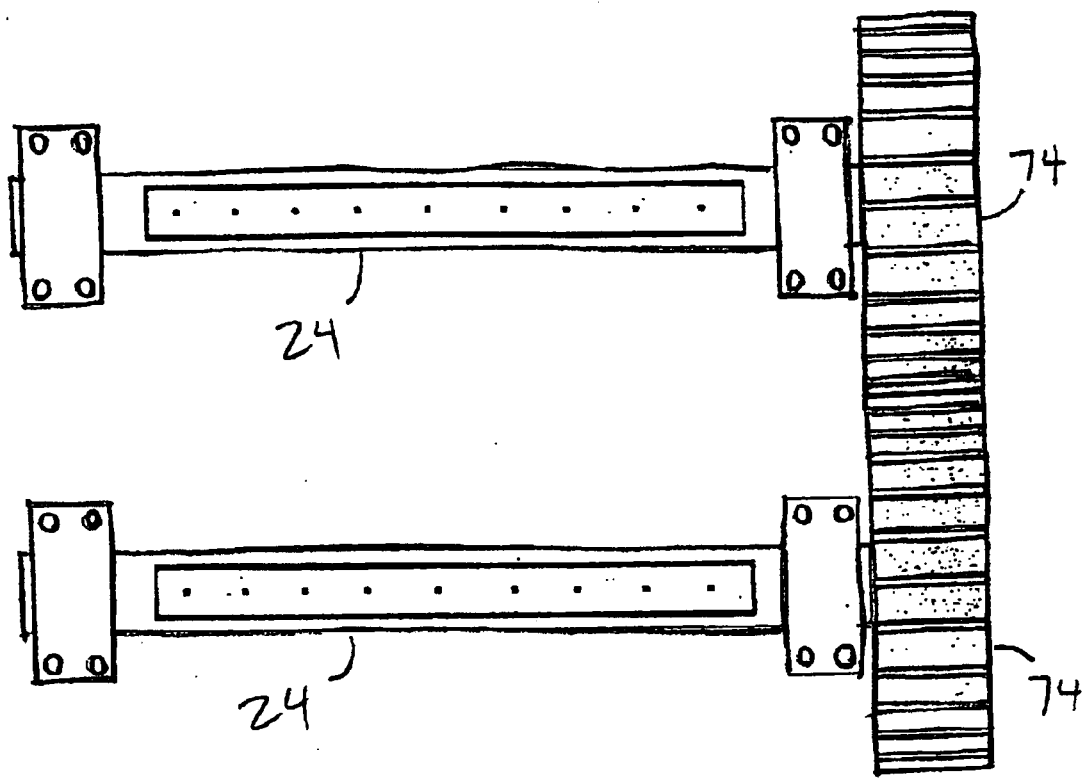
FIG. 19 is a plan view of two axles of the winch of FIG. 1, showing two meshing gears for using two axles with one drum.

Turning now to alternatives for the winding mechanism 16, as shown in FIG. 19, it may be provided with multiple axles 24 that cooperate to rotate the drum 26. For example, two axles 24 may be provided with meshing gears 74 and with the drum 26 coupled to one of the axles 24 (see also FIG. 1). Alternatively, the drum 26 may have a gear that meshes with the axle gears 74, with the drum gear selected to provide a gear reduction to increase the rotation rate of the drum at a given rotation rate of the axles.

Figure 20B:
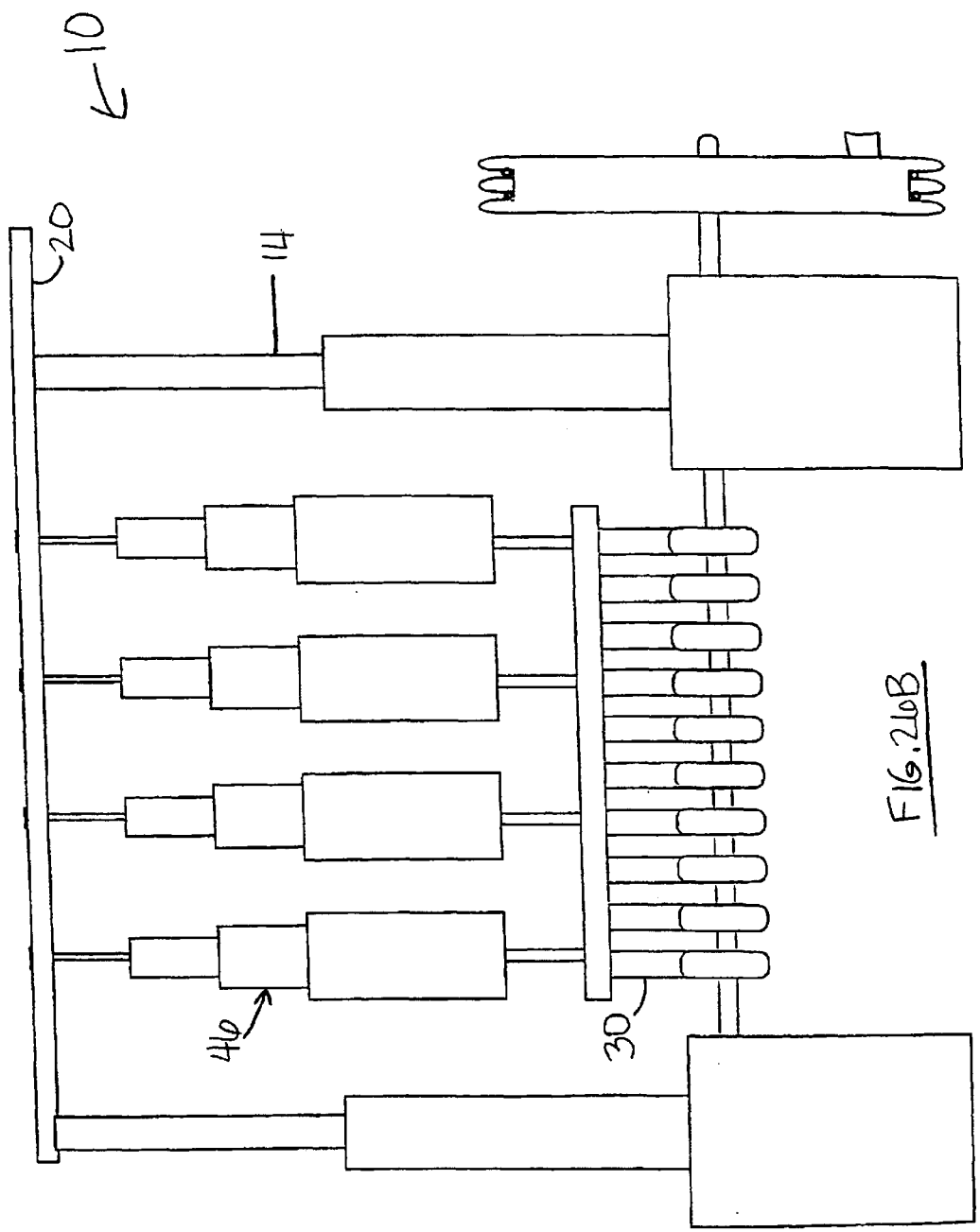
FIG. 20B is a side view of the axles of FIG. 20A, without the gears.

Any number of axles 24, tethers 30, and gears 74 may be provided, and they can be arranged in a variety of different ways. For example, the number of axles 24, tethers 30, and gears 74 may be two (see FIGS. 20A and 20B), three (see FIGS. 22A and 22B), or four (see FIGS. 21A and 21B). Also, some of the axles may be geared together to drive one drum and some may be geared together to drive another drum (see FIGS. 21A and 21B). To show the tethers 30 wound about the axles 24, FIGS. 20B, 21B, and 22B do not include the gears.

Figure 23:
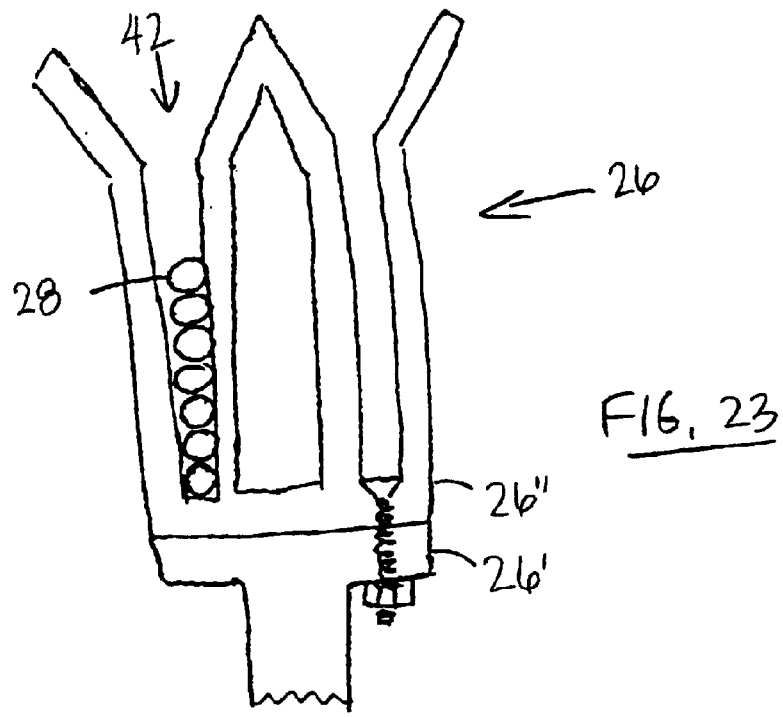
FIG. 23 is a front elevation view of a portion of the drum of FIG. 3, showing the cable wound in one of the grooves.
Figure 24:
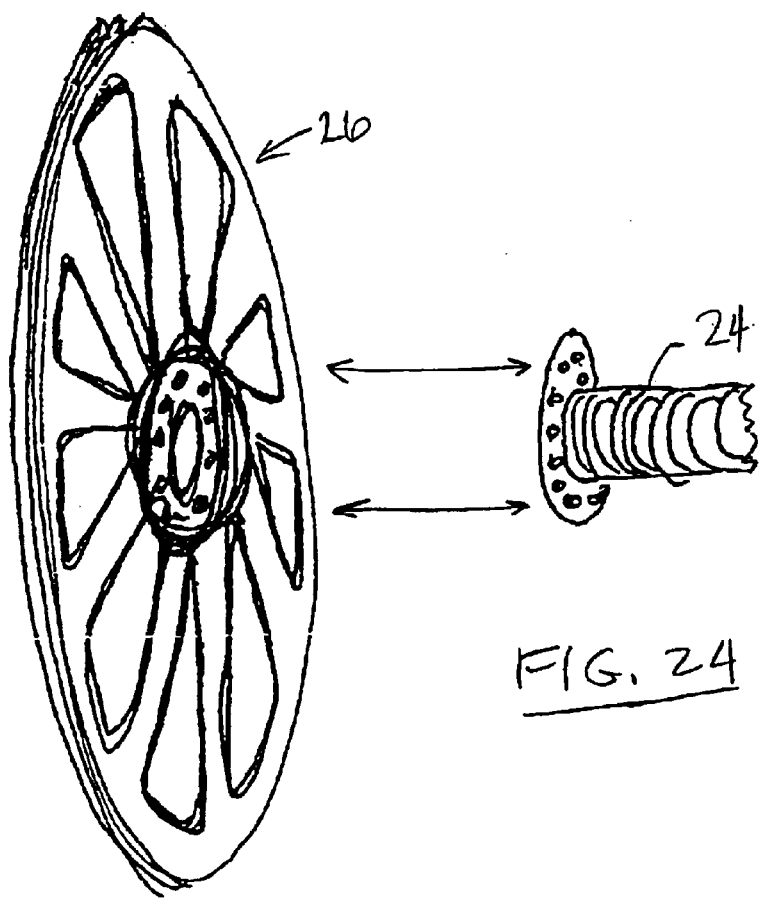
FIG. 24 is a perspective view of the drum of FIG. 3, showing the drum including spokes and its connection to the axle.

Additionally, referring to FIG. 23, the drum 26 can be provided with two (or another number of) the grooves 42 formed therein for receiving the cable 28 in a spiral, layered, configuration. Also, instead of being provided as integral unit, the drum 26 can be provided with an inner portion 26' and an outer portion 26". The drum portions 26' and 26" can be connected together by bolts and nuts (as shown in the figure), or by welding, clamps, screws, or other fasteners. In this arrangement, the inner drum portion 56' can be made of aluminum for high strength and low weight, and the outer drum portion 56" can be made of steel for high strength. Of course, other materials can be used, as may be desired. Also, as shown in FIG. 24, the drum 26 can be provided in a spoked arrangement, with the axle 24 bolted or otherwise connected thereto.

Figure 25:
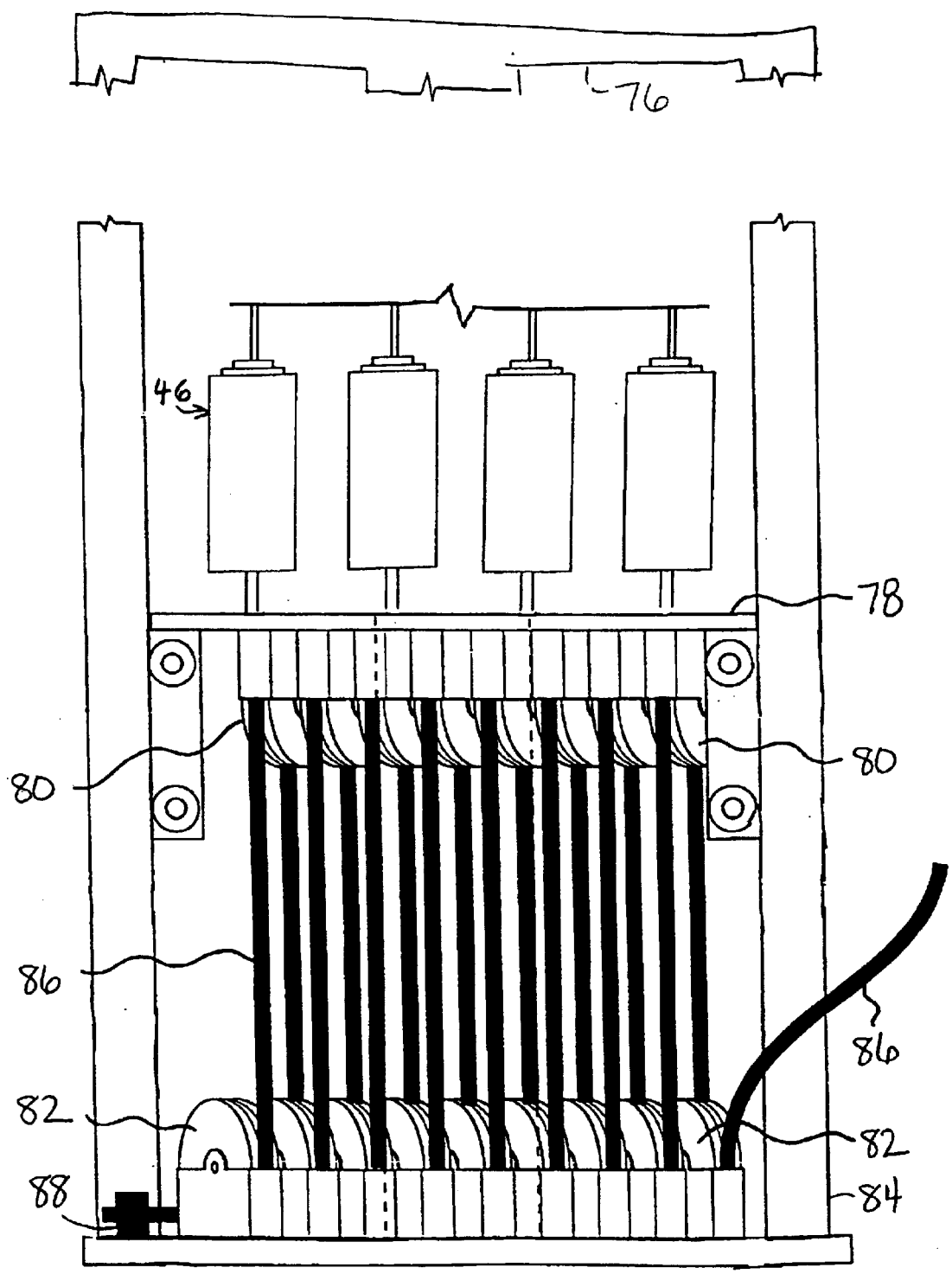
FIG. 25 is a front elevation view of a prior art winding mechanism having pulleys in use with the energy storage mechanism having telescopic spring devices.

Also, the winding mechanism 18 may be provided by a known pulley system and used with the unique energy storage mechanism 16 described herein. For example, referring to FIG. 25, one type of prior art amusement ride power plant includes a top structure 76 and a lower movable structure 78, and includes a winding mechanism 18a provided by pulley wheels arranged as a first bank of pulley wheels 80 connected to the lower movable structure 78 (which is similar to the second attachment member) and a second bank of pulley wheels 82 connected to a base structure 84, with the cable 86 routed around the pulleys and anchored at 88 to the first or second attachment member. Such a pulley mechanism is disclosed by U.S. Pat. No. 6,319,140 issued Nov. 20, 2001 to Mirfin et al., which is hereby incorporated by reference in its entirety and from which FIG. 25 was reproduced in part. Instead of using extensions springs as is done in the prior art, however, one or more of the telescopic spring devices 46 are provided, each mounted between the top structure 76 and the lower movable structure 78. In this way, the telescopic spring devices 46 eliminate the hazards of extension springs, and produce a reliable, simple, and cost-effective mechanism.

Additionally or alternatively, the winding mechanism may be provided by a gearbox operably coupled to the axle, with or without an automatic transmission that changes the gearing depending on the rotational speed of the axle. Alternatively, the winding mechanism may be provided by a cable connected to a falling object, a rapid-winding motor, or another mechanism known in the art.

Figure 26A:
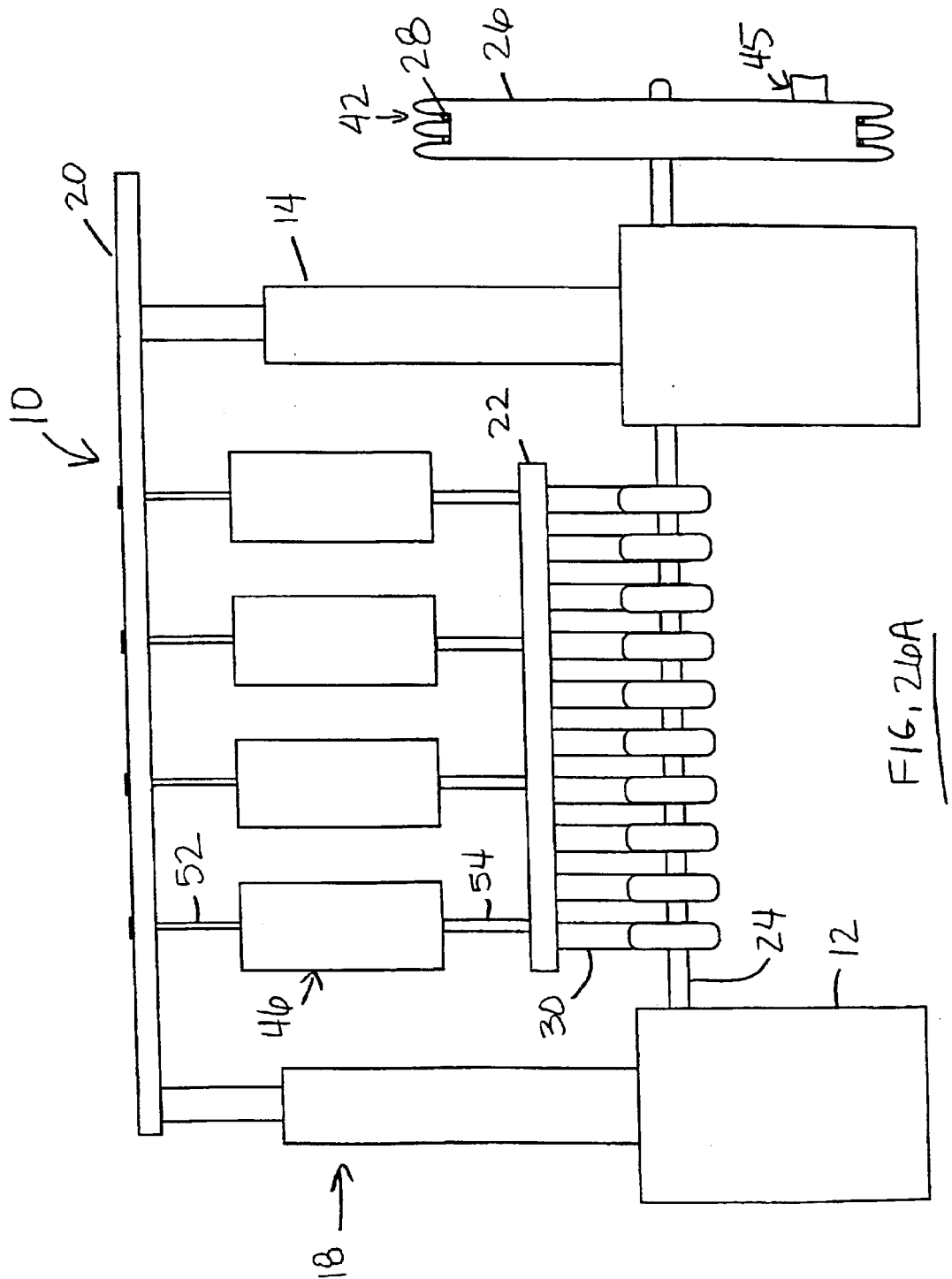
FIG. 26A is a block diagram of a winch similar to that of FIG. 1, showing the energy storage mechanism having telescopic spring devices in a neutral, uncharged state.
Figure 26C:
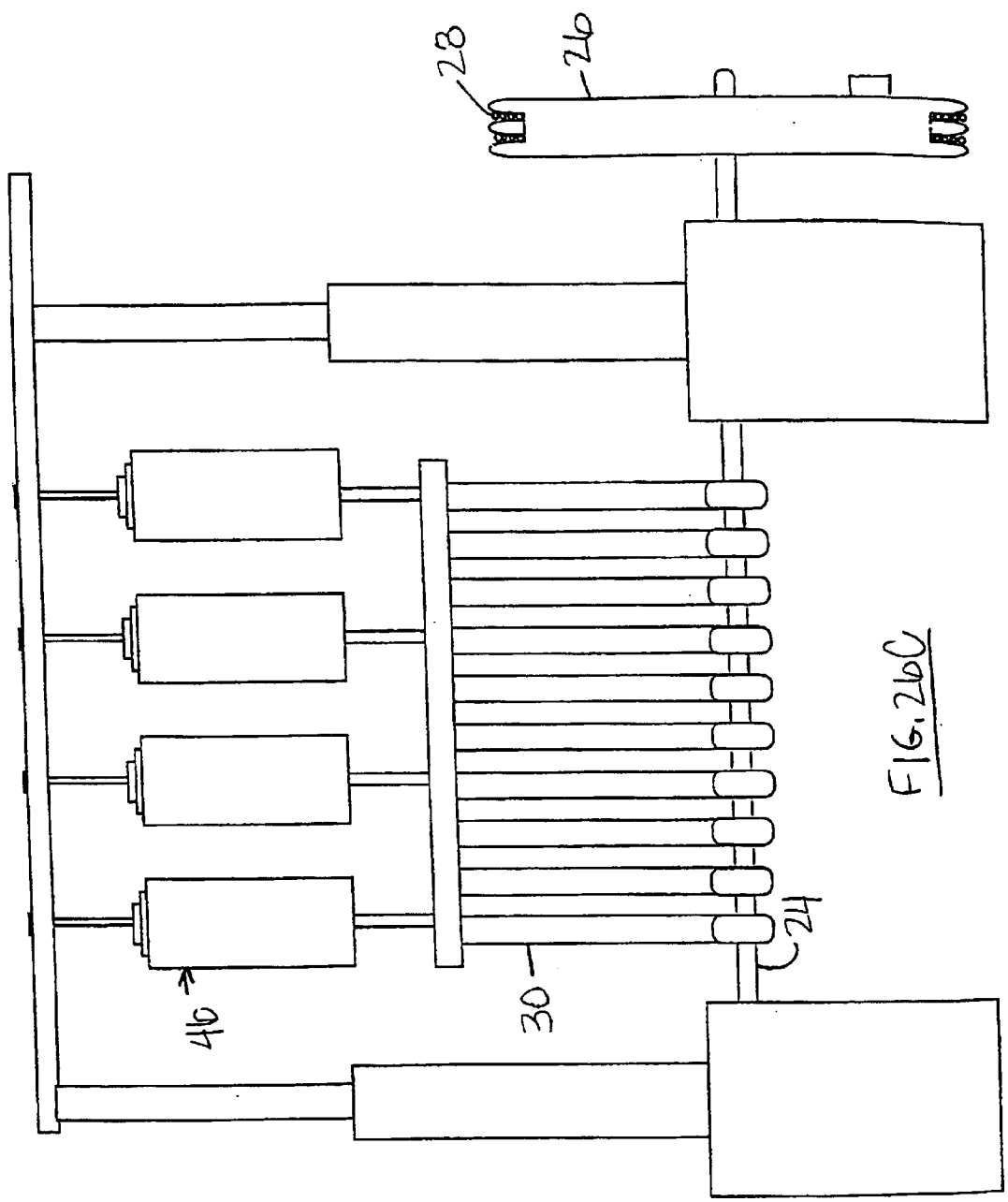
FIG. 26C is a side elevation view of the winch of FIG. 26A in operation, showing the telescopic spring devices being discharged to wind out the tethers and wind in the cable.

The general operation of the winch 10 will now be described. FIG. 26A is a block diagram of the winch 10, which as shown is similar to the winch in FIG. 1 but with four telescopic spring devices 46 coupled to ten tethers 30 and with the drum 26 beside the spring devices instead of between them. In FIG. 26A, the telescopic spring devices 46 are in a neutral, uncharged state (see FIG. 5A). In FIG. 26B, the actuators 14 are operated to move the first attachment member 20 away from the axle 24 while the tethers 30 are prevented from unwinding (for example, by engaging the brake 45), thereby charging the spring devices 46 (see FIG. 5B). In FIG. 26C, the drum 26 is released to rotate (for example, by releasing the brake 45), and the telescopic spring devices 46 discharge so as to very rapidly unwind the tethers 30 from the axle 24 (see FIG. 5C). Accordingly, the rotating axle 24 rotates the drum 26 and winds in the cable 28 at an extremely rapid rate.

Referring now to FIG. 27, there is shown a winch 110 according to a second exemplary embodiment of the present invention. In this embodiment, the winch 110 has a base 112, a winding mechanism 116 with an axle 124, a drum 126, and tethers 130, and an energy storage mechanism 118 with elastic devices 144 coupled to the first attachment member 120, the base 112, support members 115, or to another structure, similar to the first exemplary embodiment and its alternatives described above. But in this embodiment, the winch 110 is provided without an actuator for charging the energy storage mechanism 118. Thus, the winch 110 is well-suited for providing a dampening/braking effect on the carriage when it is already in motion, without the cost and operation requirements of the actuator.

Having described the winch and many of its alternatives, some of the amusement rides that it may be used with will now be described. The winch may be used with a wide variety of amusement rides, including vertical accelerator rides, staged loop roller coasters, conventional roller coasters, other roller coasters, bungee jumps and free fall rides, parachute and elevator drops, dragster rides, merry-go-rounds, and so forth. It will be understood that the winch may be used with amusement rides other than those described herein, and the amusement rides may be used with other power plants than the winch described herein.

Figure 28A:
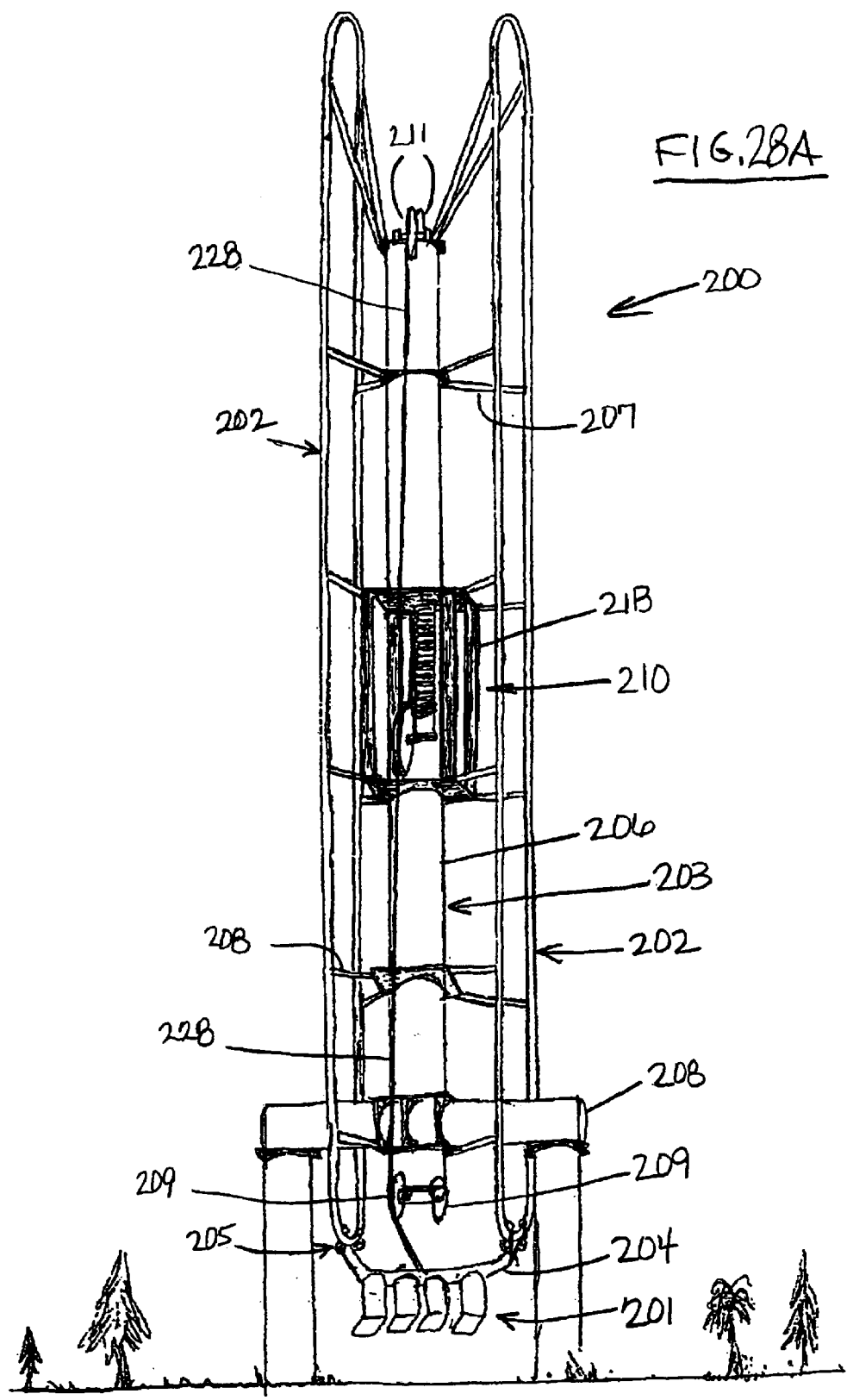
FIG. 28A is a front perspective view of a first exemplary amusement ride in the form of a looped roller coaster with an exemplary winch of the present invention.
Figure 28B:
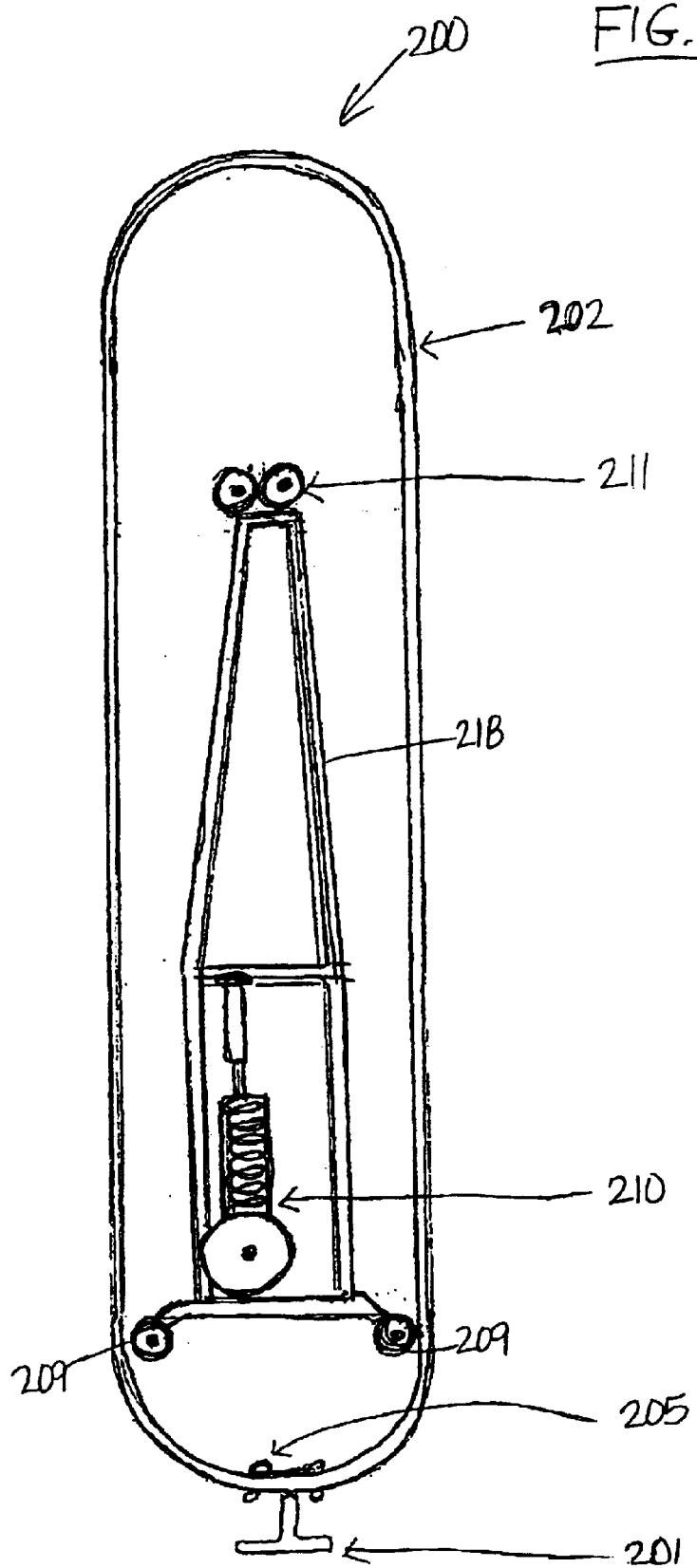
FIG. 28B is a side elevation view of the winch and the ride of FIG. 28A, without the support structure.

FIGS. 28A and 28B show the winch 10 in use with a staged roller coaster 200 according to a first exemplary amusement ride of the present invention. One winch 210 is shown used with the ride 200, but two or another number of the winches 210 can be used in conjunction with the same or another type of amusement ride such as a vertical accelerator ride, parachute drop, elevator drop, bungee jump, free fall ride, merry-go-round, dragster ride, and so forth.

The ride 200 includes a carriage 201 for one or more passengers, a track 202 on which the carriage rides, a cable 228 connected between the winch 10 and the carriage, and a support structure 203 for the track. The carriage 201 is provided by back-to-back chairs, benches, or rows of seats, typically with harnesses, a safety bar, and/or a pivotal safety frame. Alternatively, the carriage 201 can be provided by a capsule, car, cage, or frame, a train or cluster of these, or by another conventional passenger carriage. The carriage 201 can be fixedly, pivotally, rotationally, or otherwise mounted to an arm 204, with one or more roller assemblies 205 coupled to the arm for riding on the track 201. Alternatively, the carriage 201 can be directly coupled to the roller assemblies 205. The roller assemblies 205 can include, for example, two opposing wheels, or sets of wheels, positioned on opposite sides of the track 202 for holding the carriage 201 to the track as the carriage goes around the track. Alternatively, the roller assemblies 205 can have one wheel, or one set of wheels, that ride in a slot in the track or between two rails of the track. The wheels can be provided by conventional roller coaster-type wheels such as those available from Sunray, Inc. of Rutherford, N.C. Alternatively, the wheels can be provided by automotive wheels or by other wheels, rollers, bearings, or structures for permitting motion.

The track 202 can be provided by conventional roller coaster track made of steel, iron, a composite, or another suitably strong material. Thus, the track can be provided by two spaced apart steel tubes, I-beams, train rails, or the like, or by one or another number of these. Such track can be obtained from Fabriweld Corp. of Clearfield, Utah. The track 16 can be generally oval-shaped in the closed loop configuration shown, though many other shapes and configurations can be suitably employed, several of which are described below.

The cables 228 may be provided by wire rope, lifting cable, or the like, made of a material such as steel, as is commonly used in the crane industry. The size, shape, and material of the cables 228 are selected for safely handling the loads applied to the cable. For example, the cables can be provided by non-rotating $5/16$ inch steel cable. Such cable can be obtained from the West Florida Wire and Rope company.

The support structure 203 can be of monopole, lattice, or another construction, made of iron, steel, concrete, a composite, or another material, and permanently or temporarily supported by the ground. For example, the support structure 203 can include a tower 206 with a height of about 100 feet (or more or less, as may be desired), a plurality of support arms 207 extending between the tower 206 and the track 202 for securing the track in place, and a base 208 supporting the tower. Such a support structure can be obtained from Keeler Ironworks of Memphis, Tenn. Furthermore, the support structure 203 includes two lower pulleys 209a and two upper pulleys 211b around which the cable 228 may be routed, depending on the position of the carriage 201 and the cable 228. The pulleys 209a and 211b can be mounted to a support frame 211 or otherwise mounted to the support structure 203. The support frame 211 can also be used for mounting thereto and supporting the winch 10.

Referring to FIGS. 29, 29A–9F, 30, 30F–10J, 31, and 32, there is illustrated the operation of the winch 210 in launching and catching the carriage 201 through four stages of the tracked loop amusement ride 200. The letter suffixes A–F of figure numbers 29A–9F correspond to the letters in FIG. 29 indicating approximate positions of the carriage 201. Similarly, the letter suffixes F–J of figure numbers 30F–10J correspond to the lettered carriage positions in FIG. 30.

Figure 29:
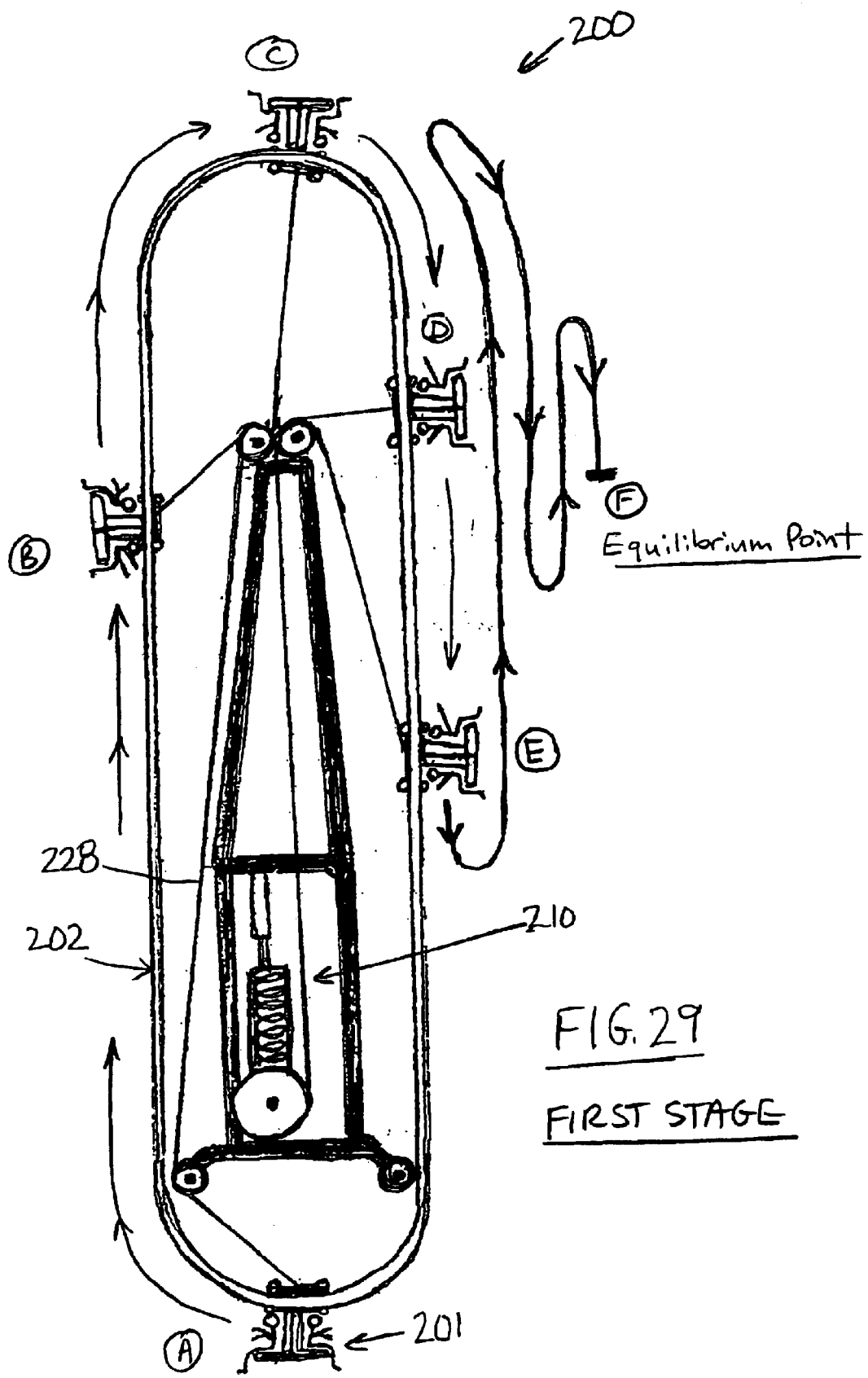
FIG. 29 is a schematic diagram of the ride of FIG. 28A, showing the positions of the carriage during the first stage of the ride.

The first stage of the ride begins with the carriage 201 at rest in start position A and the winch 210 at equilibrium, as shown in FIGS. 29 and 29A left side. The brake is operated to prevent the drum from rotating to reel in the cable 228. If desired, a secondary brake can be provided such as a hook, magnet, or other mechanism for securing the carriage 201 in place. The passengers are then boarded onto the carriage. The actuators 214 are operated to raise the attachment member 220 thereby charging the spring devices 246 with stored energy, as shown in FIG. 29B right side. For reference, note that the uncharged winch on the left side of FIG. 29A corresponds to the winch in FIG. 26A, and the charged winch on the right side of FIG. 29A corresponds to the winch in FIG. 26B.

Then the brake is operated to release the drum 226, and the winch 210 operates to rapidly wind in the cable 228, as shown in FIGS. 29 and 29B. The carriage 201 is launched with great force through position B, shooting the passengers straight up at breakneck speed. Because the diameter of the drum 226 is greater than the diameter of the axle 224, a mechanical advantage is achieved which causes the carriage to be launched with such great acceleration. The majority of the launch force can be provided by a relatively stiff launch spring, with relatively soft catch springs useful in dampening the motion of the carriage at latter points in the ride, as will now be described.

The carriage 201 continues along the track 202 through position C, where the passengers are hurled upside down around the top of the track, to position D, as shown in FIGS. 29, 29C, and 29D. The carriage 201 is then decelerated by the first catch spring until it reaches position E, and thereafter the carriage will oscillate up and down with the relatively soft first (and/or second) catch spring being recharged and discharged to dampen the motion of the carriage until it reaches first equilibrium position F, as shown in FIGS. 29, 29E, and 29F. Additionally, the brake can be operated to hasten the slowing of the carriage. The passengers can be there suspended high up in the air facing straight down for a moment or two to enhance the thrill of the ride. For reference, note that the winch in FIG. 29F corresponds to the winch in FIG. 26C. Of course, although the winch is shown in the neutral, uncharged state, there will be some spring deformation on the first catch spring due to the weight of the passengers, carriage, and cable.

Figure 30:
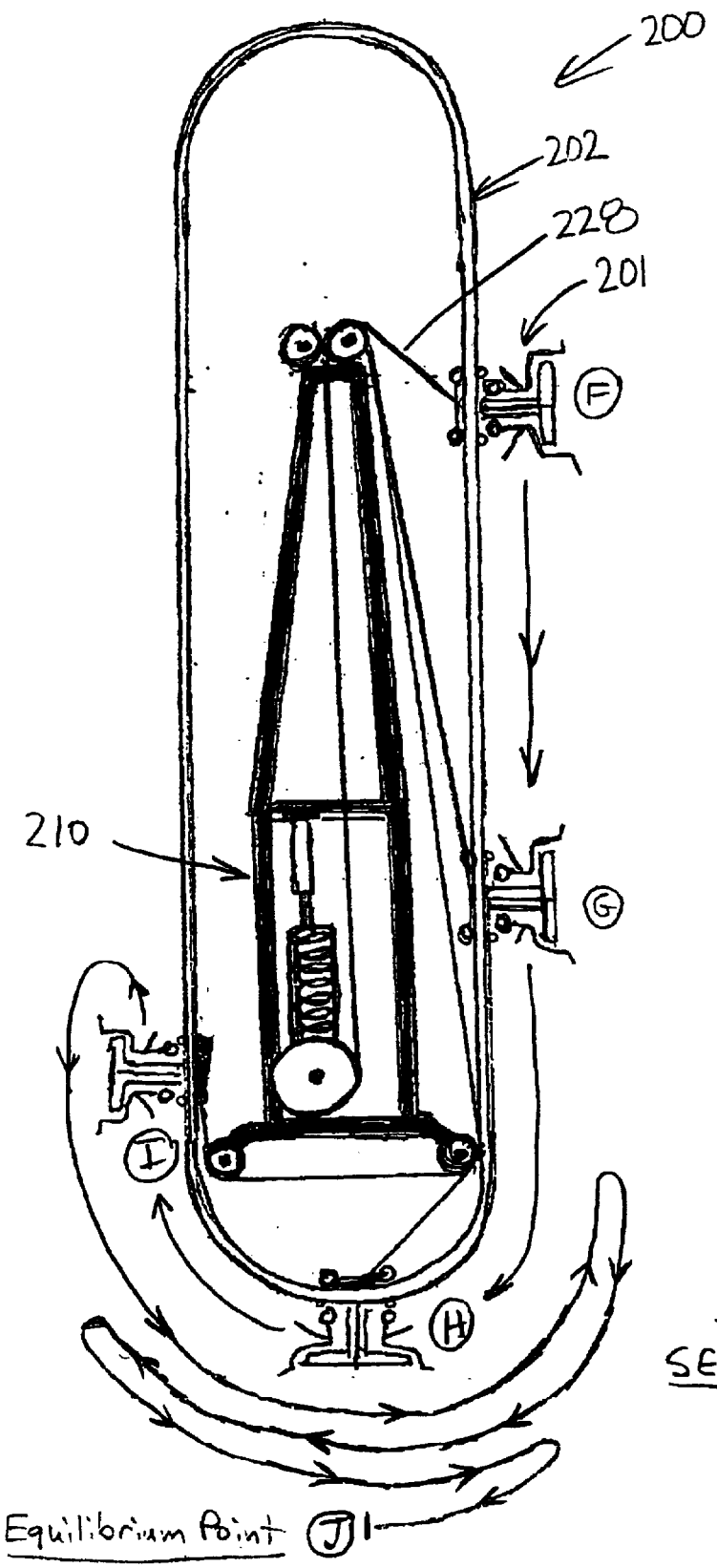
FIG. 30 is a schematic diagram of the ride of FIG. 28A, showing the positions of the carriage during the second stage of the ride.

The second stage of the ride begins with the carriage 201 at rest in position F and the winch 210 at equilibrium, as shown in FIGS. 30 and 30F. Then the actuators 214 can be operated to rapidly lower the spring devices 246, permitting the tethers 230 to be wound in, the cable 228 to be wound out, and the carriage 201 to free fall due to the weight of the carriage on the cable. For example, a gate or bleeder valve on a hydraulic ram-type actuator can be opened to rapidly lower the spring devices 246. Alternatively, the brake can be operated to prevent the drum 226 from rotating to reel out the cable 228 thereby holding the carriage in position F, and the actuators operated to lower the spring devices 246 and create lengths of slack tethers 230 drooping down below the axles. Then the brake can be released to permit the carriage to free-fall down the track.

In either event, the carriage 201 free falls through position G to position H, providing the passengers the abject thrill of dropping face down from up high and into a turn that generates several G's of force on their bodies, as shown in FIGS. 30, 30G, and 30H. The carriage 201 is then decelerated by the first and second catch springs until the carriage reaches position I, and thereafter the carriage will oscillate back and forth with the relatively soft first and second catch springs dampening the motion of the carriage until it reaches second equilibrium position J, as shown in FIGS. 30, 30I, and 30J.

Figure 32:
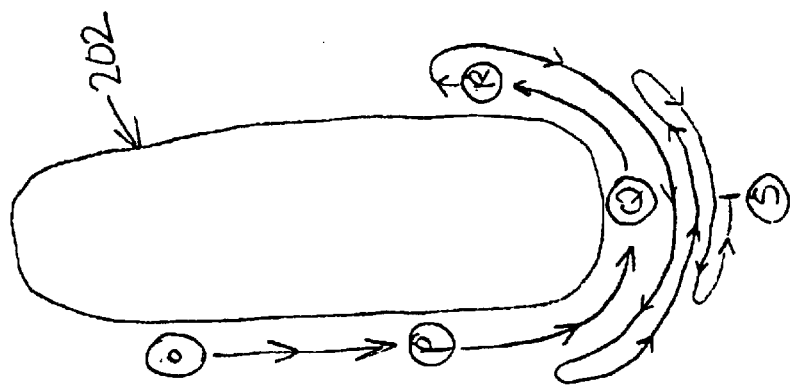
FIG. 32 is a schematic diagram of the ride of FIG. 28A, showing the positions of the carriage during the fourth stage of the ride.
Figure 31:
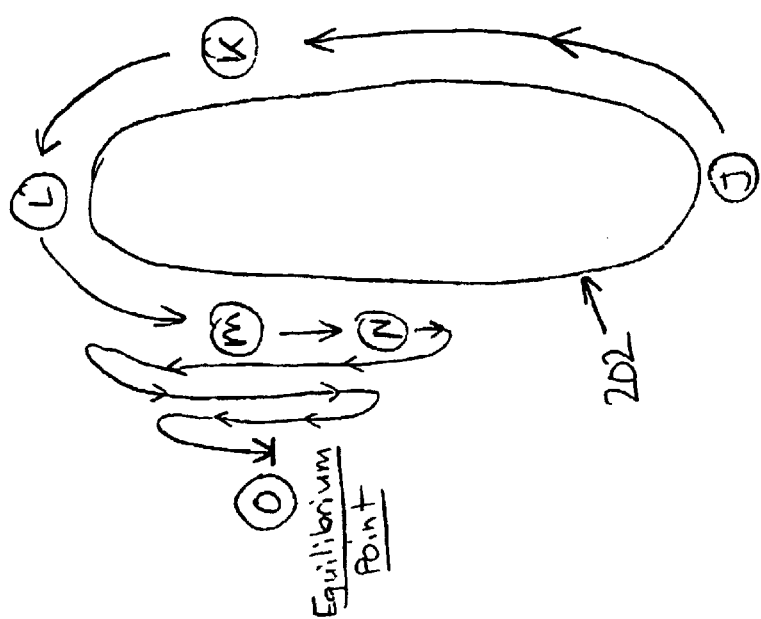
FIG. 31 is a schematic diagram of the ride of FIG. 28A, showing the positions of the carriage during the third stage of the ride.

The third and fourth stages, as shown in FIGS. 31 and 32, respectively, are similar to the first and second stages, except the direction of the carriage travel is reversed. Thus, the operation of the winch to move the carriage from second equilibrium position J to third equilibrium position O of FIG. 31 and from position O to fourth equilibrium position S of FIG. 32 is similar to the operation of the winch to move the carriage from positions A to F of FIG. 29 and from positions F to J of FIG. 30, respectively. At the conclusion of the fourth stage, the process can be repeated, if so desired.

It will be understood that the above-described operation of the winch and position of the carriage is illustrative only, and that the invention can be suitably provided with other track configurations, spring configurations and strengths, and operational sequences. For example, the spring devices can have extension springs instead of compression springs, if so desired. Also, the winch can be operated to provide a ride with only two of the stages, with eight of the stages, or otherwise.

As another example, the springs of the telescopic spring devices can be selected so that the first catch spring is charged by the weight of the carriage with a typical load of passengers. In this arrangement, during the first stage of the ride the first catch spring will remain substantially charged at positions B, D, and F of FIG. 29 (compare FIGS. 29B, 29D, and 29F), and the second catch spring will be charged and discharged between positions C and E of FIG. 29 (compare FIGS. 29C and 29E) to dampen and slow the carriage to a stop at the first equilibrium position F. Then during the second stage of the ride, the brake is operated to hold the carriage in position F of FIG. 30, the actuators operated to lower the spring devices and allow the first catch spring to discharge, and the brake is released to drop the carriage. The first catch spring will be charged and discharged between positions H and I of FIG. 30 (compare FIGS. 30H and 30I) to dampen and slow the carriage to a stop at the second equilibrium position J. The third and fourth stages are then operated with the same differences in the catch springs' performance. In this way, the first catch spring retains a charge at the equilibrium positions F, J, O, and S, so that there is no slack or play in the system during the operation of the ride, thereby providing a smoother operation with less stress on the ride components.

In addition to being used in the four-staged ride described above, the winch is well suited for use in a ride with one or two stages. For example, each telescopic spring device can have one launch spring selected with a relatively stiff spring factor for launching the carriage and one catch spring selected with a relatively soft spring factor for dampening and stopping the carriage. In this arrangement, the launch spring is used to launch the carriage and, while the carriage is in motion with the launch spring discharged (for example, at about position C of FIG. 29), the actuators are operated to lower the spring devices back to their start position. Then the carriage will not oscillate to a stop at the first equilibrium position F, but will simply fall down the track going from position E of FIG. 29 directly to position G of FIG. 30 and continuing until the catch spring is engaged to dampen the carriage motion as it oscillates to a stop at position J of FIG. 29. Effectively, the first and second stages are combined into a single stage. The winch can then be operated, with the same differences in the catch springs' performance, to launch the carriage back to the start position such that the third and fourth stages are combined into a single stage.

For some other rides, the winch can be provided with the energy storage mechanism but without the cable winding mechanism. Thus, the cable will be coupled directly to the elastic devices or to the first attachment member (which is connected to the elastic members). In this way, the launch forces will not be as great because of the absence of the mechanical advantage normally provided by the winding mechanism, which may be desired for kiddie roller coaster or other rides. Of course, the energy storage mechanism can be provided with the telescopic spring devices or in other forms having other elastic devices.

Figure 33:
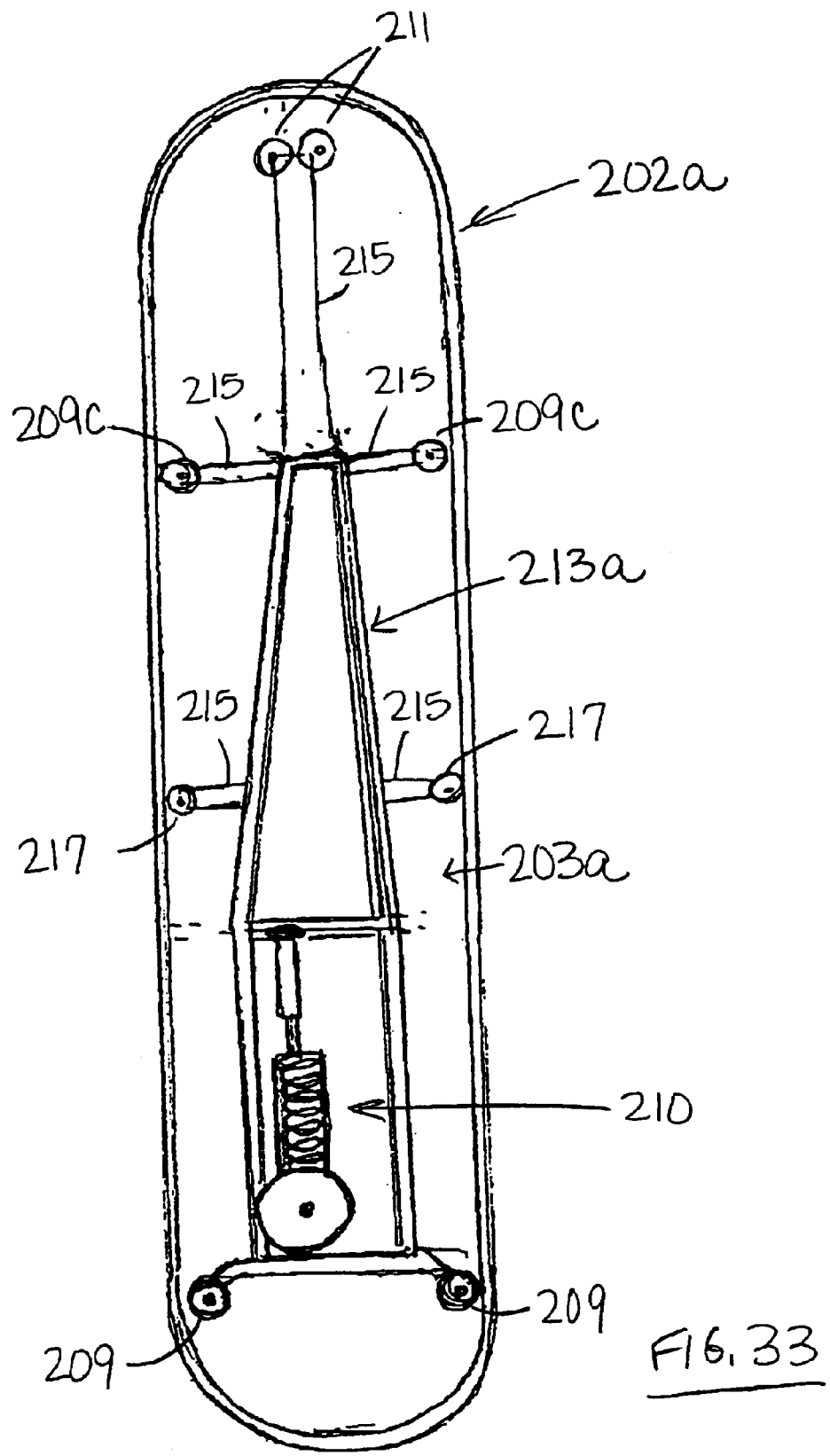
FIG. 33 is a side elevation view of a first alternative support structure of the ride of FIG. 28A, showing a modified pulley arrangement.

Having described the structure and operation of the first exemplary ride 200, alternative forms of the support structure 203 will now be described. FIG. 33 shows a first alternative support structure 203*a*, with intermediate pulleys 217*a* on intermediate support arms 215*a* extending from the frame 213*a*, in addition to the lower and upper pulleys 209 and 211. This arrangement provides additional locations for supporting and routing the cable.

Figure 34:
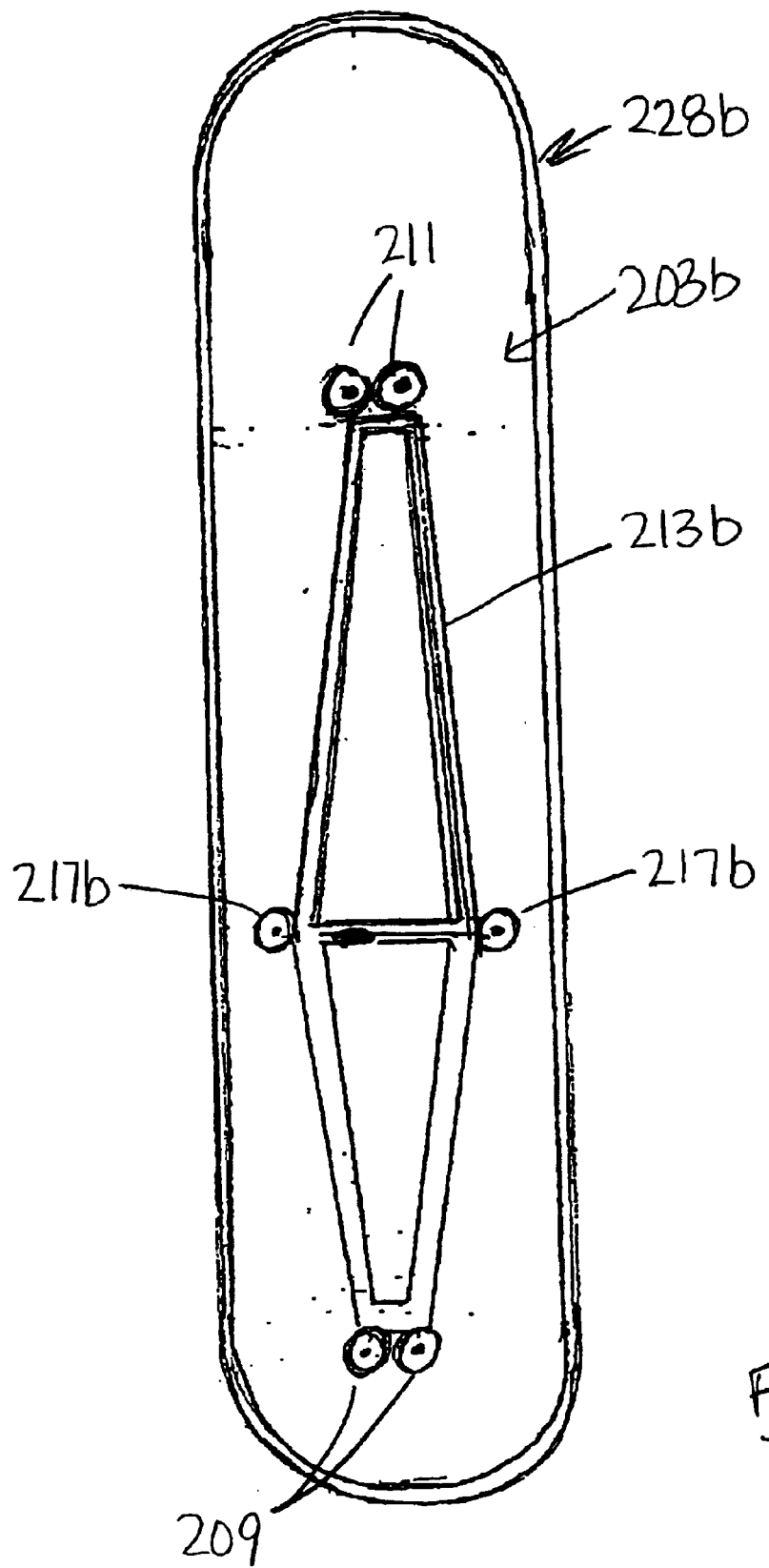
FIG. 34 is a side elevation view of a second alternative support structure, showing another modified pulley arrangement.

FIG. 34 shows a second alternative support structure 203*b*, with intermediate pulleys 217*b* on the frame 213*b*. This arrangement of pulleys permits the cable to be routed around the lower pulleys 209 at a smaller angle to reduce stresses on the cable.

Figure 35:
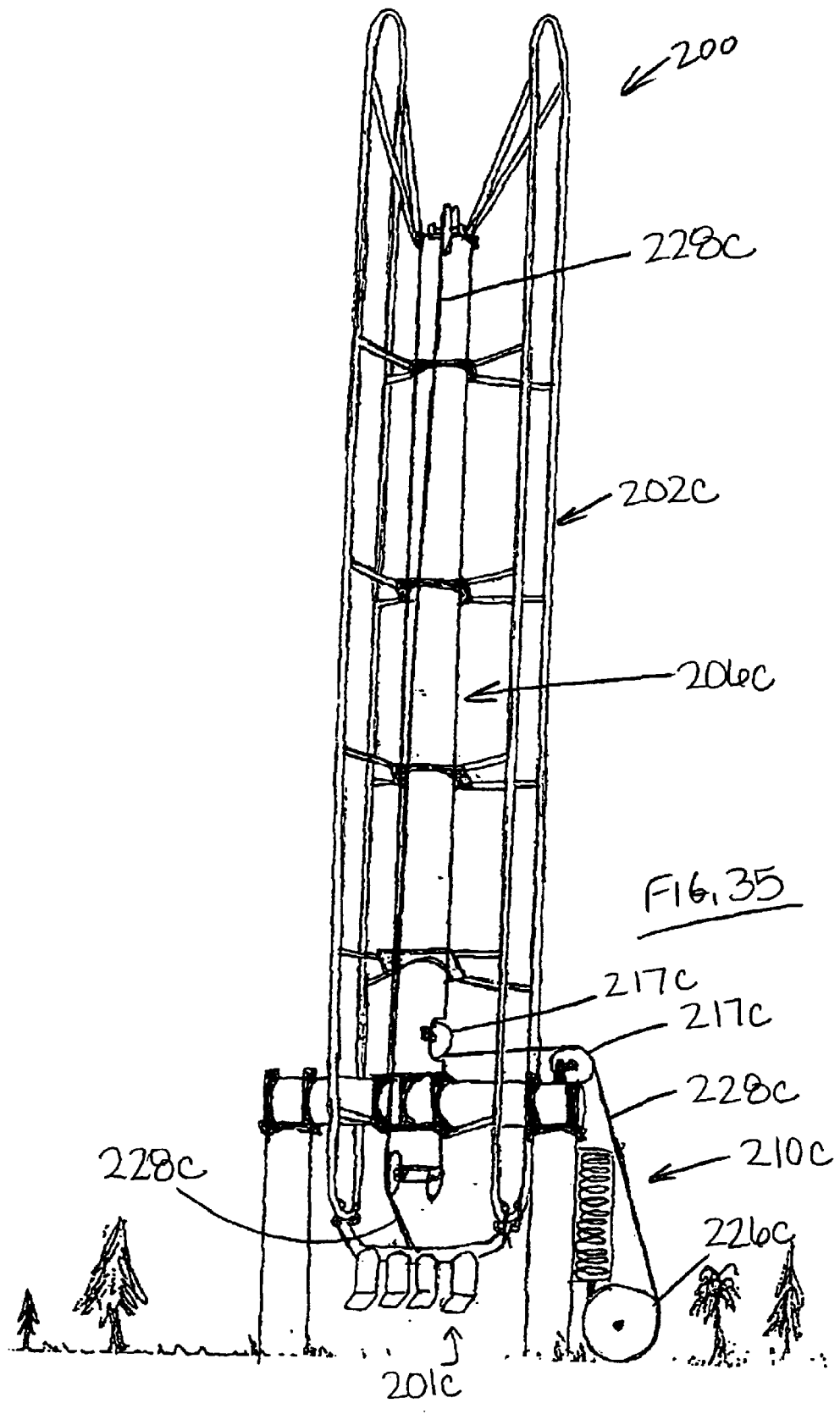
FIG. 35 is a side elevation view of a third alternative support structure, showing another modified pulley arrangement and a modified winch location.

FIG. 35 shows a third alternative support structure 203*c*, with the winch 210*c* mounted at about ground level instead of up on the support structure 203*c*. In this embodiment, there are provided intermediate pulleys 217*c* for routing the cable 228*c* from between the tracks 202*c* to the drum 226*c* of the winch 210.

Figure 36:
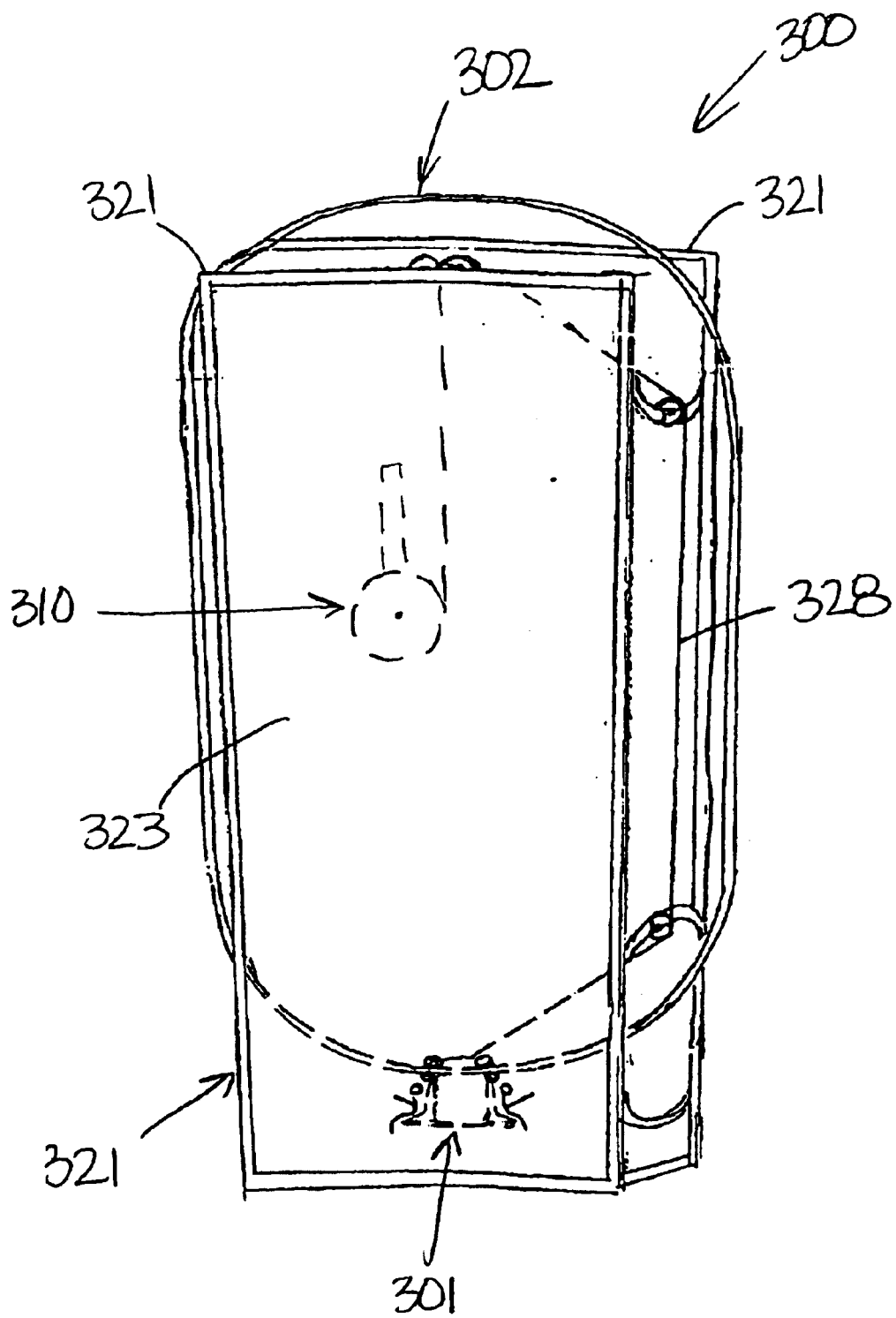
FIG. 36 is a perspective view of a second exemplary amusement ride, showing a support structure with panels.

Referring now to FIG. 36, there is illustrated a second exemplary amusement ride 300 incorporating the winch 310. The ride 300 has a closed looped track 302, cable 328, carriage 301, and pulleys that are similar to those of the first exemplary ride 200. However, the ride 300 in this embodiment includes a support structure 303 having two connected frames 321 between which the track 302 is positioned. Additionally, the frames 321 can have side panels 323 each with at least a portion that is opaque. Alternatively, translucent, lattice, or other type panels can be provided as may be desired.

Figure 37A:
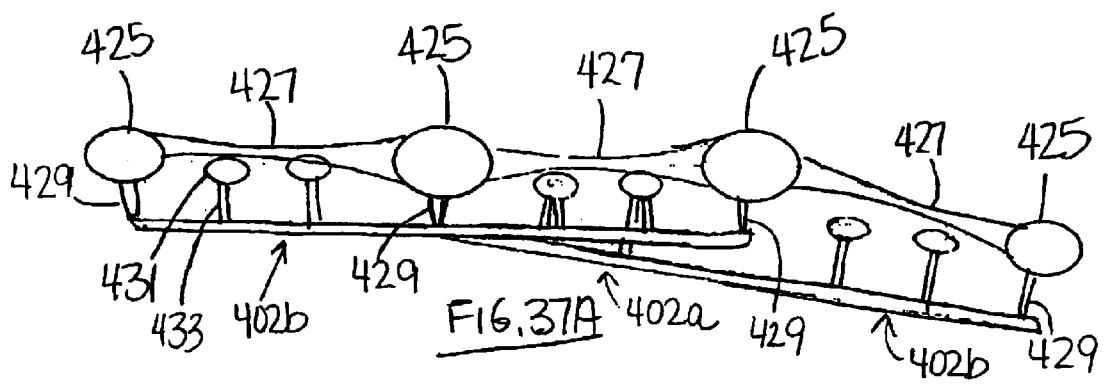
FIG. 37A is a plan view of the ride of FIG. 37, showing the track supported by the support structure having four towers.

Referring to FIGS. 37 and 37A, there is illustrated a third exemplary amusement ride 400 incorporating the winch 410. The ride 100 has a carriage 401, cable 428, and pulleys 409, 411 and 417 that are similar to those described above. However, the ride 400 in this embodiment includes an open looped track 402 that has a generally elongated oval center section 402*a* (when viewed from the side), with two curved deceleration ramp sections 402*b* extending from the center section. It will be understood that when the carriage 401 is launched upward it decelerates as it goes around the top of the track 402, but when the carriage is falling it accelerates as it goes around the bottom of the track thereby exerting greater gravitational forces on the passengers. Therefore, this track configuration provides the curved deceleration ramp sections 402*b* with a larger radius than the center section 402*a* or the bottom section of the oval tracks of the previous embodiments. This produces lesser (more bearable) gravitational forces on the passengers in the second and fourth stages of the ride.

Additionally, the support structure 403 has four towers 425, connecting members 427 extending between the towers, and support arms 429 extending between the towers and the track 402. In this arrangement, the track 402 is offset from the support towers 425 to provide for ease of construction and maintenance of the track and support structure. Also, shorter secondary support towers 431 and arms 433 made of metal or another material can be provided for supporting the deceleration ramp sections 402*b*. Preferably, the towers and connecting members are made of reinforced concrete and the support arms are made of steel, though other materials can be used.

In one form of this embodiment, the two center towers are about 200 feet tall and the two outer towers are about 90 feet tall. During the operation of the ride 400, the carriage is launched from its start position up the track, over the top at about 200 feet, back down the track, and through an oscillatory motion to its first equilibrium position at about 90 feet up. Then the carriage is dropped down the track which guides it around the bottom and back up the deceleration ramp to a position about 90 feet up, and through an oscillatory motion until the carriage stops at its second equilibrium position at about the bottom of the ramp. The process is then reversed through the third and fourth equilibrium positions.

Figure 37B:
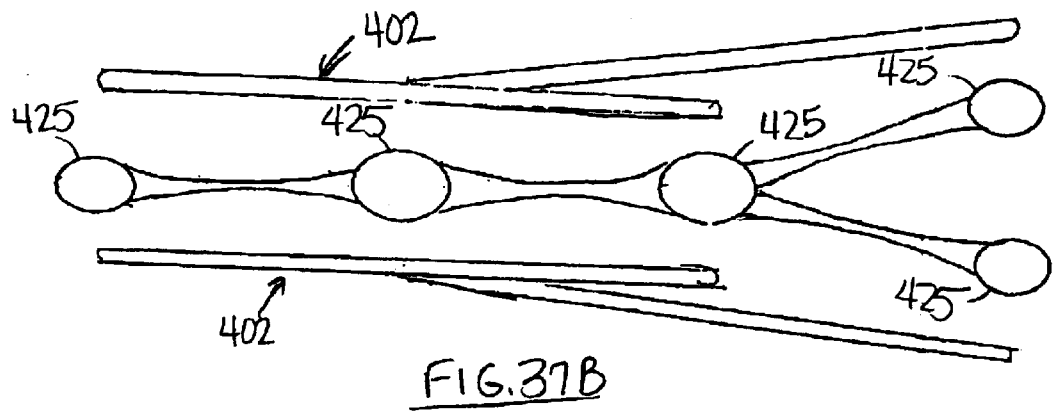
FIG. 37B is a plan view of an alternative support structure of the ride of FIG. 37, showing two tracks supported by a support structure having five towers.
Figure 37C:
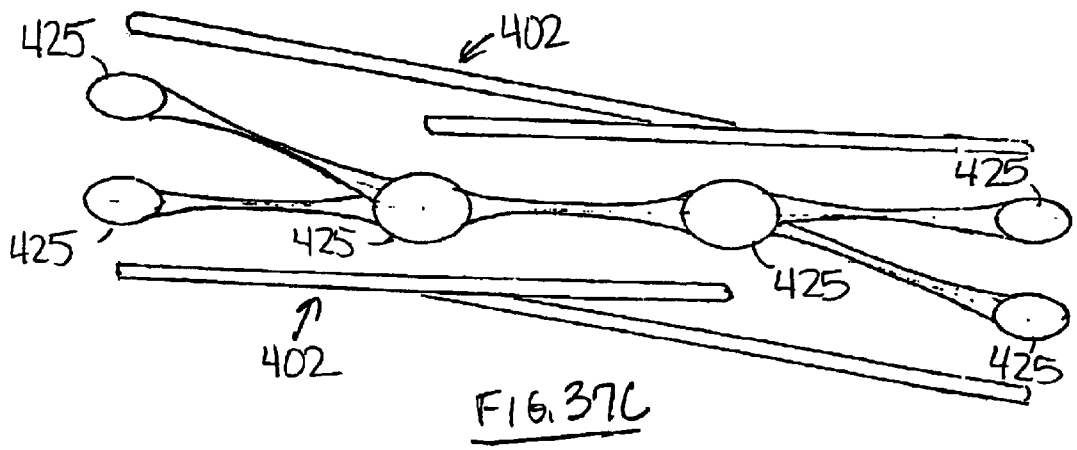
FIG. 37C is a plan view of another alternative support structure, showing two tracks supported by a support structure having six towers.

Of course, other numbers and shapes of tracks and towers or other support structures can be suitably provided. For example, FIG. 37B shows an alternative ride with two tracks 402 supported by and on both sides of a support structure having five towers 425. FIG. 37C shows another alternative ride with two tracks 402 supported by and on both sides of a support structure having six towers 425.

Referring now to FIG. 38A, the roller assemblies 405 ride on and guide the carriage 401 along the track 402. The cable 428 is shown coupled to one of the roller assemblies 405, although it could be coupled to another component of the carriage 401 if so desired.

Figure 38B:
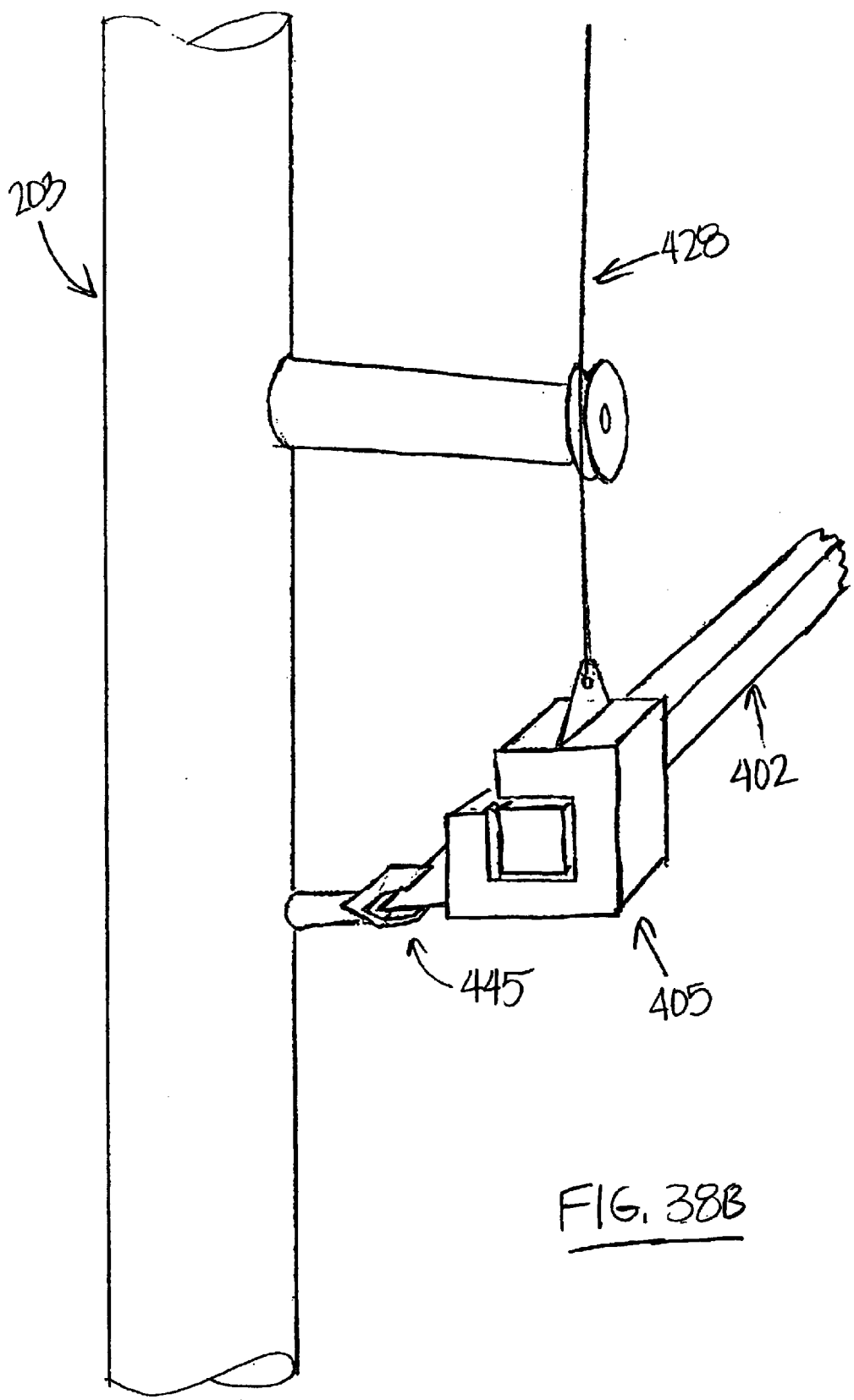
FIG. 38B is a perspective view of the roller assembly and track of FIG. 38A, showing the brake and the cable connection.
Figure 38C:
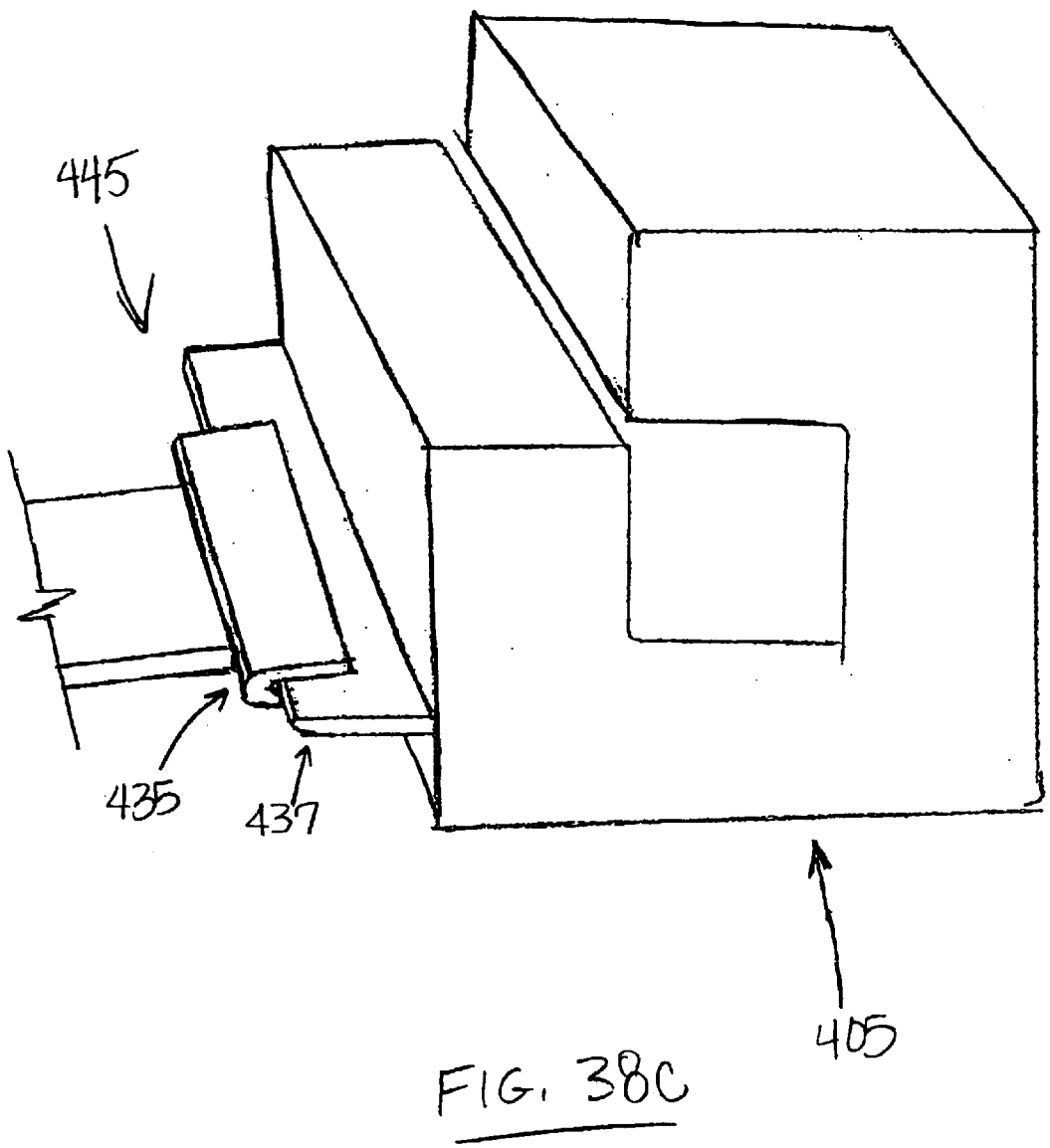
FIG. 38C is a perspective view of the brake of FIG. 38B, showing the brake caliper and plate.

Referring to FIGS. 38B and 38C, in one possible form the brake 445 includes a caliper 435 coupled to the support structure 403, and a plate 437 made of steel (or another material) extending from the roller assembly 405 (or from another component of the carriage). A hydraulic, pneumatic, electric, or other conventional brake actuator (not shown) is operated to close the caliper 435 about the plate 437 to slow the carriage by frictional forces. This type of "grabbing brake" is commonly used on conventional roller coasters. As mentioned above, alternative brake assemblies can be used, including conventional friction brakes on the drum or another component of the winch 410.

Referring to FIGS. 38D and 38E, in one possible form the roller assemblies 405 each include a wheel housing 439 with wheels 441 similar to those described above for riding on the track 402. The roller assemblies 405 can be configured with at least one wheel 441 on each side of the track 402 so that at least one wheel engages the track whether the carriage 401 is at the moment upright, sideways, or inverted. Thus, each roller assembly 405 can have four wheels 441 when used with a rectangular track 402. Of course, with circular cross-section tracks the roller assemblies can be provided with three wheels, and other wheel numbers and configurations can be suitably employed. Also, two roller assemblies can be coupled together by a linkage that permits them to cooperate when rounding curves in the track.

Figure 39:
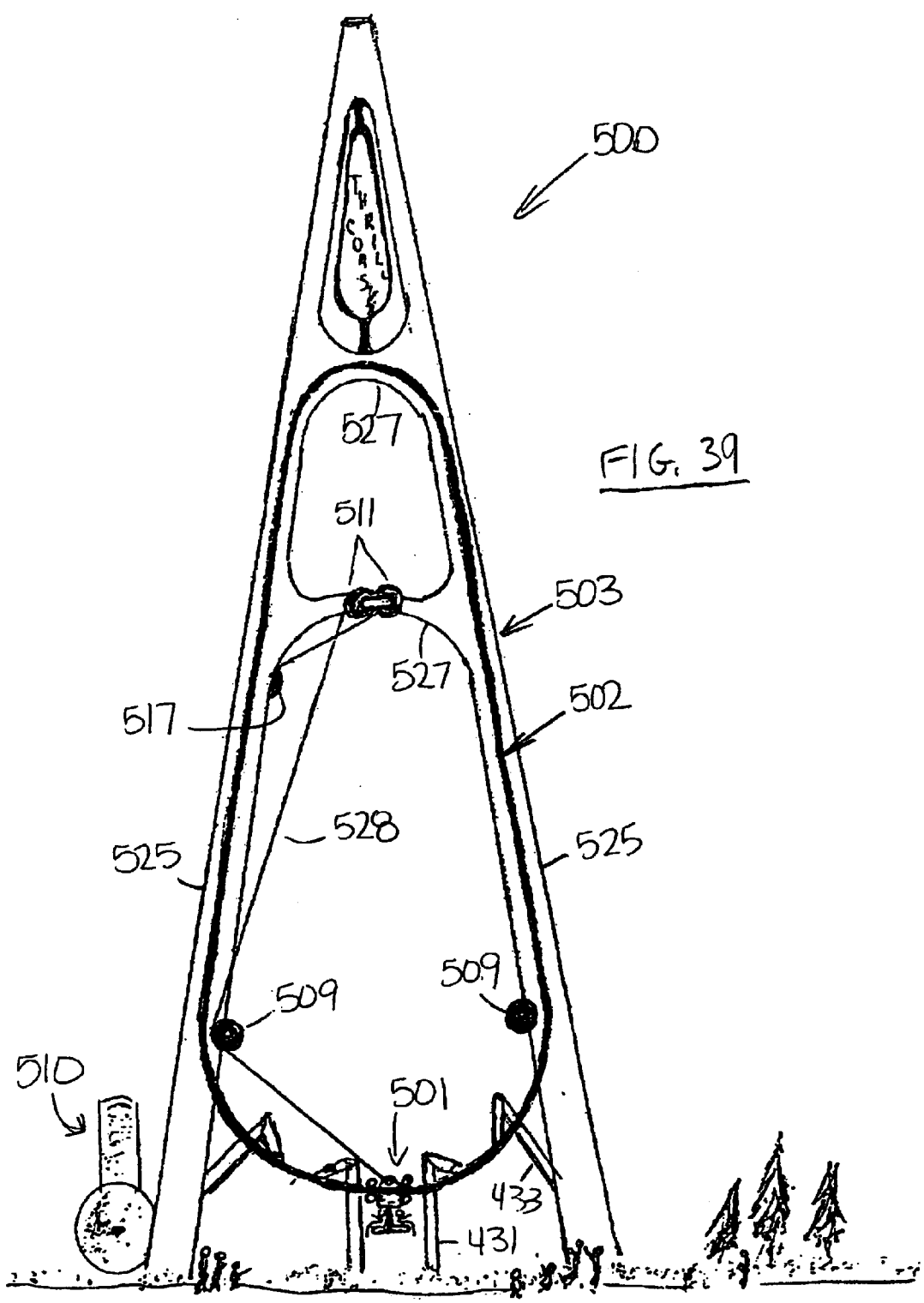
FIG. 39 is a side elevation view of a fourth exemplary amusement ride, showing a generally triangular support structure with a closed loop track wider at its bottom than its top.

Referring to FIG. 39, there is illustrated a fourth exemplary amusement ride 500 incorporating the winch 510. The ride 500 has a carriage 501, track 502, cable 528, and pulleys 509, 511, and 517 that are similar to those described above. However, the closed looped track 502 in this embodiment has a larger radius at the bottom than at the top, producing a somewhat triangular shape and exerting lesser gravitational forces on the passengers. Also, the ride 500 includes a generally triangular support structure 503. The support structure 503 can have, for example, two towers 525 with connecting members 527 extending between the towers, and secondary support towers 531 and arms 533. In this form, the support structure 503 could be made of steel-reinforced concrete.

Referring to FIG. 40, there is illustrated a fifth exemplary amusement ride 600 incorporating the winch 610. The ride 600 has a carriage 601, track 602, cable 628, generally triangular support structure 603, and pulleys 426, 427 and 470 that are similar to those of the fourth exemplary ride 312. However, the closed looped track 602 in this embodiment has an even larger radius at the bottom than at the top, producing a generally inverted heart shaped track and exerting even less gravitational forces on the passengers. This allows for higher carriage speeds without adversely impacting the safety of the ride. Accordingly, the support structure 603 is also wider at its bottom. In this form, the support structure 603 could be made of steel I-beam towers 625 mounted on concrete footers 643.

Figure 41B:
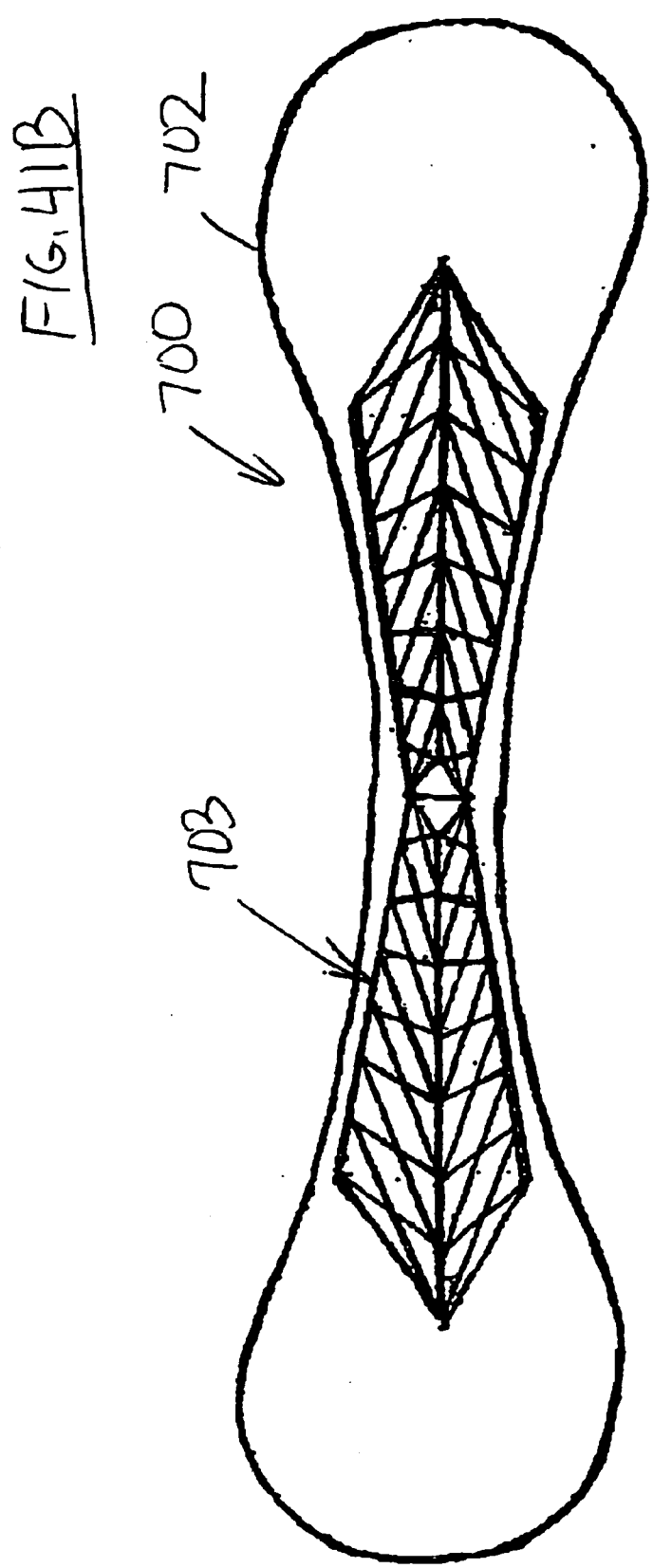
FIG. 41B is a plan view of the ride of FIG. 41A.

Referring to FIGS. 41A and 41B, there is illustrated a sixth exemplary amusement ride 700 incorporating the winch 710. The ride 700 has a carriage 701, cable 728, generally triangular support structure 703, and pulleys 711 and 717 that are similar to those described above. In this form, the support structure 703 could be made of steel lattice towers 725. The closed looped track 702 in this embodiment is disposed around the support structure 703 and extends up and is mounted to the towers 725 of the support structure. Again, this arrangement provides a larger radius at the bottom of the track than at the top, exerting thrilling but bearable gravitational forces on the passengers. If desired, the cable can be attached to a guide roller (not shown) or similar mechanism (instead of to the carriage) that rolls on the track for launching the carriage then disengaging therefrom, and for reengagement with the carriage for subsequent stage operation.

While several configurations of the track have been described above, many others can be suitably employed. For example, FIG. 42A shows an alternative diamond-shaped track 202a. FIG. 42B shows an alternative track 202b with a larger radius at the top than at the bottom, and with an angled midsection. FIG. 42C shows an alternative inverted triangle-shaped track 202c. FIG. 42D shows an alternative triangle-shaped track 202d standing on one of its corners. FIG. 42E shows an alternative asymmetrically twisting track 202e that produces lateral carriage motion as well as vertical carriage motion during the carriage launching. FIG. 42F shows an alternative horizontally-arranged track 202f. FIG. 42G shows an alternative circular-shaped track 202g, which can be used with a winch with telescopic spring devices having only one spring each or having multiple springs with the same strength. FIG. 42H shows an alternative track 202h with a larger radius at its top, a single intermediate section used when the carriage moves upward and downward, and a curved deceleration ramp. FIG. 42I shows an alternative track 202I with a single vertical track section for the carriage's ascent and descent, and a curved deceleration ramp.

Figure 42J:
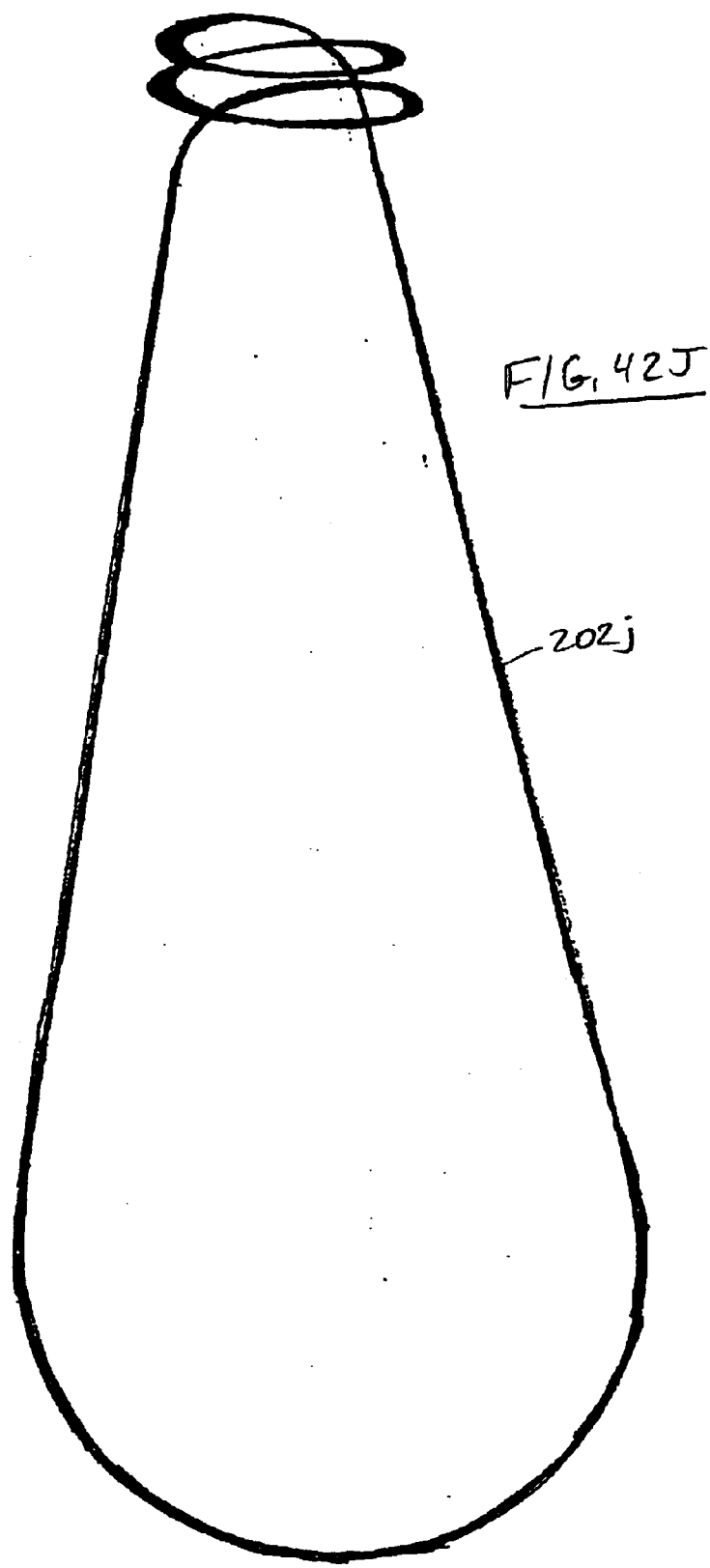
FIG. 42J is a schematic diagram of another alternative track arrangement, showing a track with a spiral upper section for providing a nice view from up high.
Figure 42K:
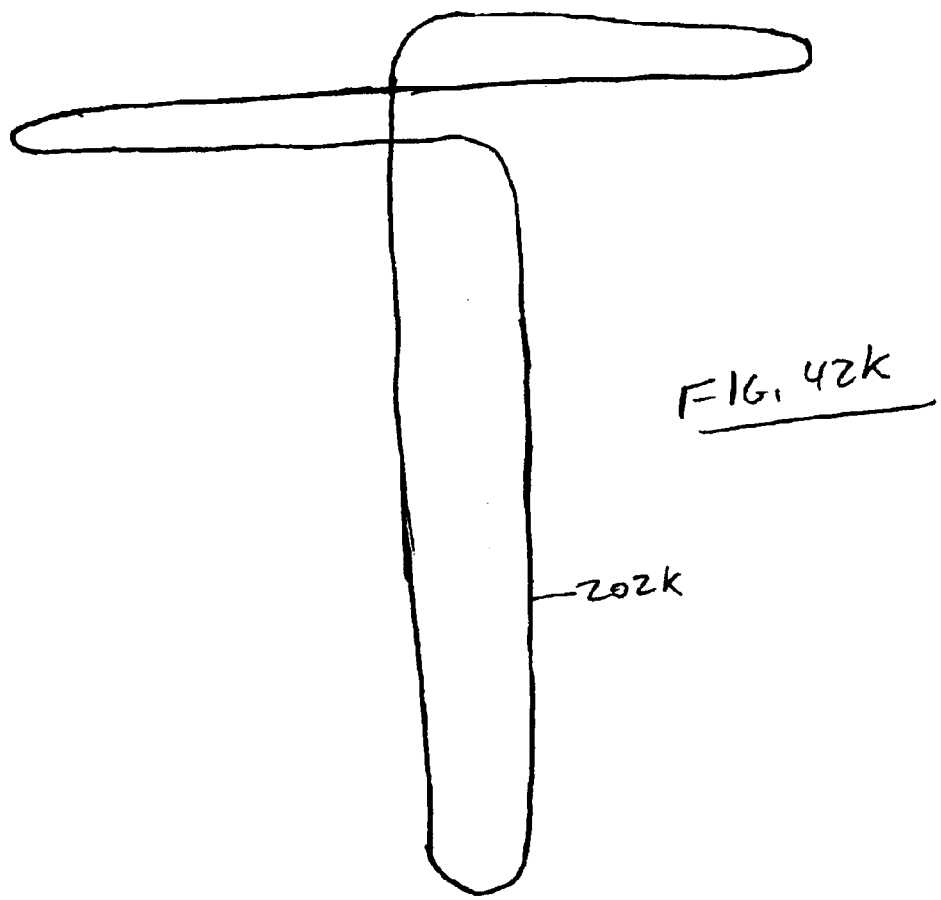
FIG. 42K is a schematic diagram of another alternative track arrangement, showing a track with a horizontal upper section wider than a lower section for minimizing ground space requirements.
Figure 42L:
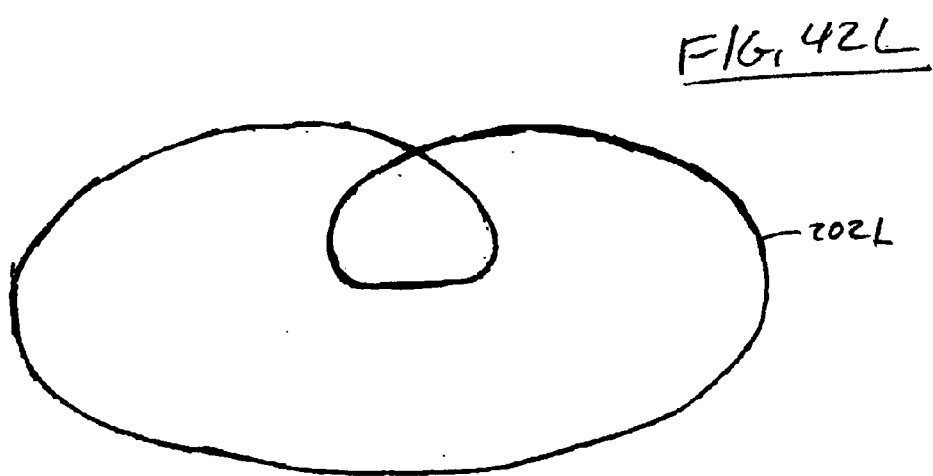
FIG. 42L is a plan view of the track arrangement of FIG. 42K.

FIG. 42J shows an alternative track 202j with a spiral track section at the top for the carriage to traverse to provide the passengers a nice view from a high elevation. FIGS. 42 and 42L show an alternative track 202k with a spiral track section at the top that is wider than the lower track section, for providing the passengers a nice view from a high elevation but minimizing the ground space occupied by the ride. Alternatively, the winch can be provided with two (or another number of) drums and used with two (or another number of) tracks and carriages simultaneously (for example, two intersecting closed loop tracks with the winch positioned at the intersection), the winch can be used with conventional roller coaster track configurations well known in the art, and/or other arrangements can be provided.

Figure 43A:
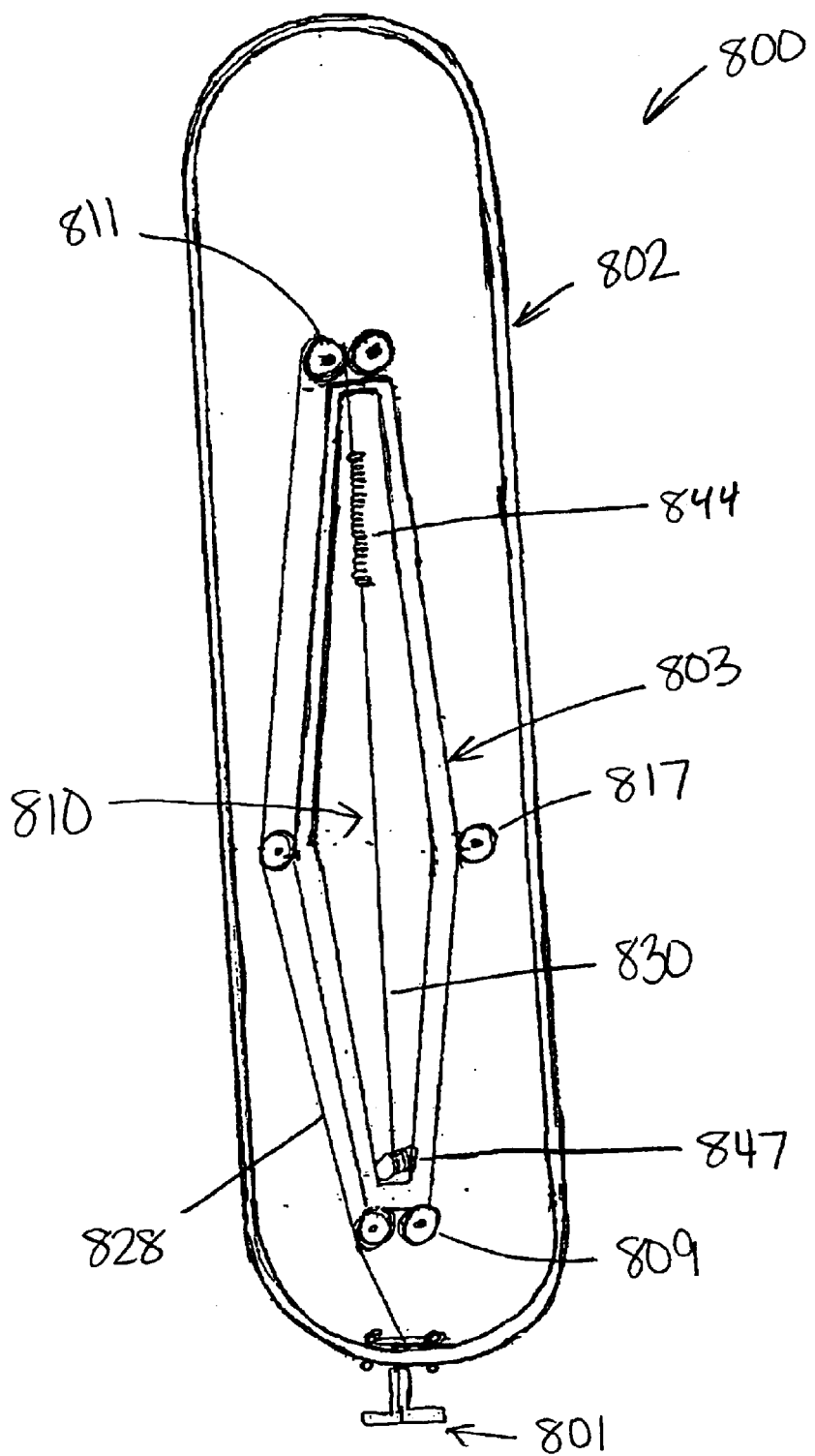
FIG. 43A is a side elevation view of a portion of a seventh exemplary amusement ride, showing the elastic device provided by a bungee cord.
Figure 43C:
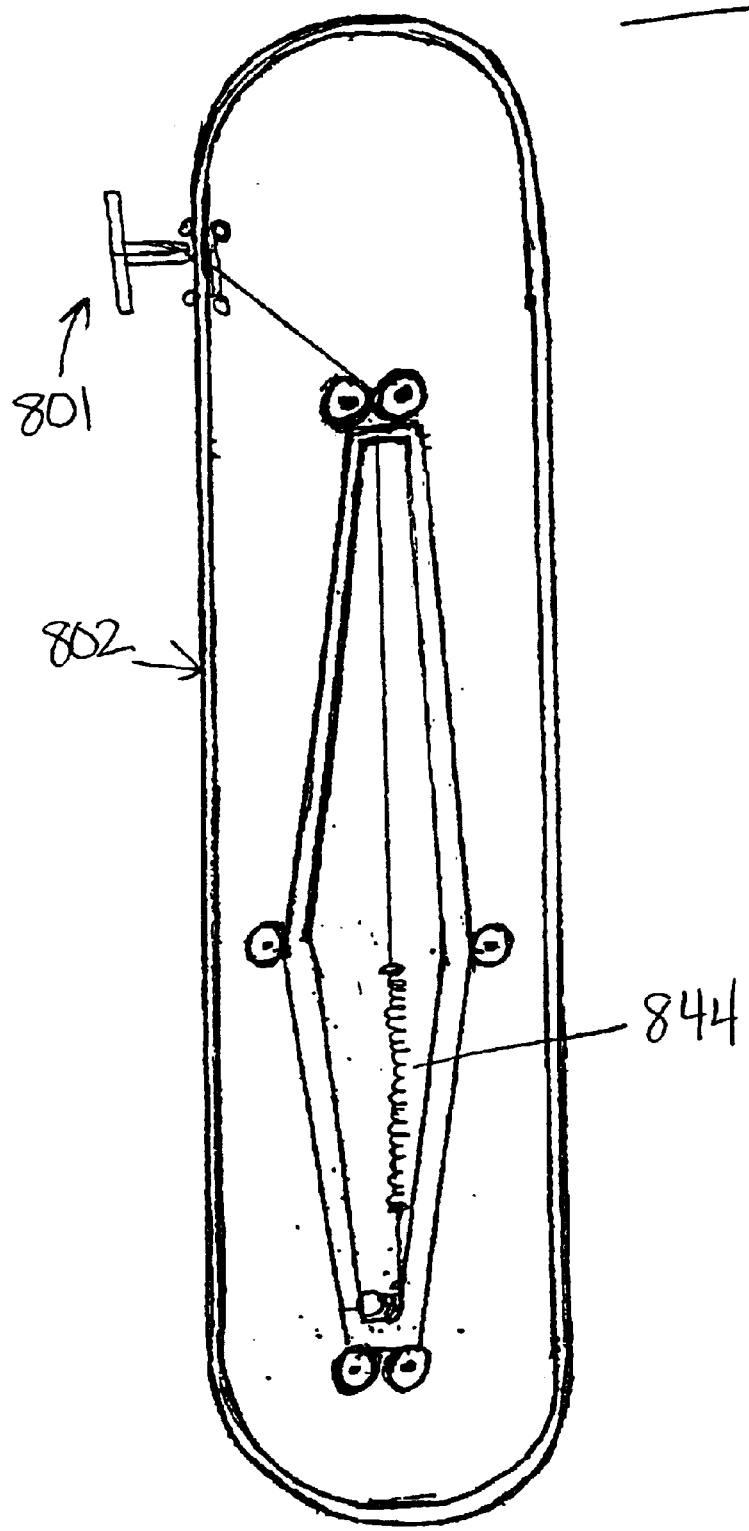
FIG. 43C is a side elevation view of the ride of FIG. 43A, showing the bungee cord discharging to launch the carriage.

Referring now to FIGS. 43A through 43C, there is illustrated a portion of a seventh exemplary amusement ride 800 incorporating the winch 810. The ride 800 has a carriage 801, cable 828, support structure (not shown), support frame 803, and pulleys 809, 811, and 817 that are similar to those described above. In this form, the winch 810 includes an elastic device 844 such as a bungee cord or extension spring that is connected to a tether 830 that is wound about a winding mechanism including a conventional motorized winch 847. FIG. 43A shows the carriage 801 and the elastic member 844 in the start position, FIG. 43B shows the elastic member 844 in the charged position with the carriage 801 held in the start position, and FIG. 43C shows the carriage 801 released from the start position and being launched up the track 802. It will be understood that the amusement ride can be provided with other alternative winches for launching and stopping the carriage.

In another aspect of the present invention, there is provided a method of launching and stopping an amusement ride carriage. Generally described, the method includes the steps of launching the carriage under the force of discharging elastic devices, and then charging and discharging the elastic devices to slow and/or stop the carriage. Additionally, the winch can be operated to allow the carriage to fall due to its weight, and then used to stop the carriage again. The process can then be repeated in the reverse direction.

Figure 44:
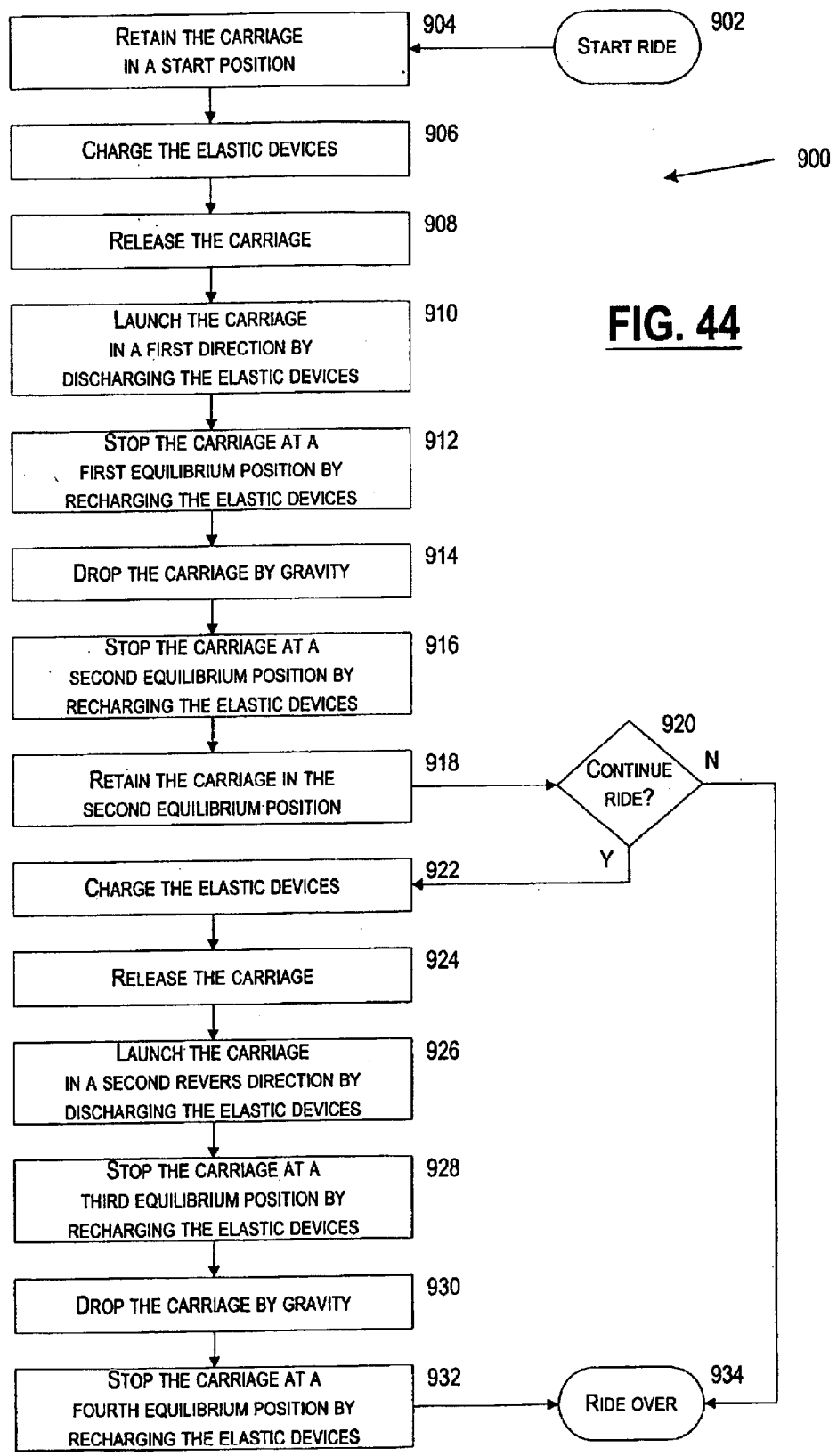
FIG. 44 is a flow diagram of a first exemplary method of propelling a carriage of an amusement ride.

Referring now to FIG. 44, there is illustrated a first exemplary method 900 of launching and stopping the carriage, beginning at step 902. The steps of this method 900 generally correspond to the operation of the amusement ride described above with reference to FIGS. 28–32. Accordingly, the method 900 includes providing one or more elastic devices that are directly or indirectly coupled to the carriage. For example, the elastic devices can be included in a rapid-winding winch of the type described above, with one or more tethers coupled to the elastic devices, an axle with the tethers windable thereabout, a drum coupled to and having a larger diameter than the axle, and a cable windable about the drum and coupled to the carriage. Also, the elastic devices can be provided by telescopic spring devices, extension springs, torsion springs, power or clock springs, bungee cords, and so forth. For example, telescopic spring devices can be provided each having a first catch spring, a second catch spring, and a launch spring, concentrically arranged, with the launch spring having a larger spring factor than the second catch spring which has a larger spring factor than the first catch spring.

At step 904, the carriage is retained in a start position, for example, by operation of a brake on the drum, axle, cable, or carriage. A secondary or auxiliary brake can be provided for redundancy, as may be desired for safety. The passengers are then loaded into or onto the carriage.

At step 906, the elastic devices are charged. For example, the elastic devices can be charged by compressing or extending the elastic devices. Using the winch described above, this can be accomplished by moving an attachment member attached to the elastic devices from a first position to a second position, with the attachment member so moved by the operation of an actuator. Then at step 908 the carriage is released so that it is free to move. Similar to step 904, the carriage can be released by operation of the brake.

At step 910, the carriage is launched in a first direction under the force of the discharging elastic devices. For example, the carriage can be launched under the force of the discharging the launch springs. Additionally, discharging the elastic devices can include winding out the tethers from the axle under the force of the charge stored in the elastic devices, and winding in the cable about the drum responsive to the winding out of the tethers about the axle. The carriage is thereby launched by the rapidly winding-in cable.

In this way, the carriage is launched along a track that guides and supports the carriage. The track can be provided in various configurations, including open and closed loops. Where a looped track is provided, the carriage is propelled by the winch upward and over the top of the track.

At step 912, the carriage is stopped at a first equilibrium position by at least partially recharging the discharged elastic devices. For example, when the carriage is traveling downward after passing the top of the looped track and after the elastic devices have been discharged, the weight of the carriage will pull and wind out the cable from the drum thereby recharging the elastic devices. In particular, this can store a charge in the softer first and/or second catch springs. The carriage will then oscillate, charging and discharging the first and/or second catch springs until the carriage comes to a rest at the first equilibrium position, thereby concluding the first stage of the ride.

At step 914, the carriage is dropped under the force of gravity along the track. For example, the carriage can be dropped by retaining the carriage in the first equilibrium position, moving the attachment member from the second position to the first position thereby creating slack in the tethers, and releasing the carriage so that it is free to fall.

At step 916, the carriage is stopped at a second equilibrium position, similarly to step 912. For example, when the carriage is traveling downward after passing the bottom of the looped track and after the elastic devices have been discharged, the momentum of the carriage will pull and wind out the cable from the drum thereby recharging the elastic devices. In particular, this can store a charge in the softer first and/or second catch springs. The carriage will then oscillate, charging and discharging the first and/or second catch springs until the carriage comes to a rest at the second equilibrium position, thereby concluding the second stage of the ride. For example, the carriage can be stopped at about the bottom of the looped track.

It will be understood that the catch springs can be selected so that only the first catch spring is used at step 912 and both the first and the second catch springs are used at step 916, both the first and the second catch springs are used at step 912 and only the first catch spring is used at step 916, or otherwise. Of course, a single catch spring can be used, if desired, and the launch spring can be selected to assist in dampening the motion of the carriage.

At step 918, the carriage is retained in the second equilibrium position, similarly to step 904. At this point, step 920, the ride can be concluded or it can be continued. If the ride is not continued, then the ride is concluded at step 934 when the passengers disembark and another load of passengers board the carriage for the next ride.

If the ride is continued, then at step 922 the elastic devices are charged and at step 924 the carriage is released, similarly to steps 906 and 908, respectively. At this point, step 926, the carriage is launched in a second reverse direction under the force of the discharging elastic members, similarly to step 910. The carriage is thus launched back up the track that it just came down, and back over the top of the track. At step 928, the carriage is stopped at a third equilibrium position by the recharging the elastic devices, similarly to step 912, thereby concluding the third stage of the ride.

Next, at step 930, the carriage is dropped under the force of gravity, similarly to step 914. Then at step 932, the carriage is stopped at a fourth equilibrium position, similarly to step 916, thereby concluding the fourth stage of the ride. For example, the carriage can be stopped at about the bottom of the looped track. At this point, step 934, the ride is concluded, the carriage is retained in place, the passengers disembark, and another load of passengers board the carriage for the next ride. Of course, the process can be repeated for the same load of passengers as many times as may be desired.

Figure 45:
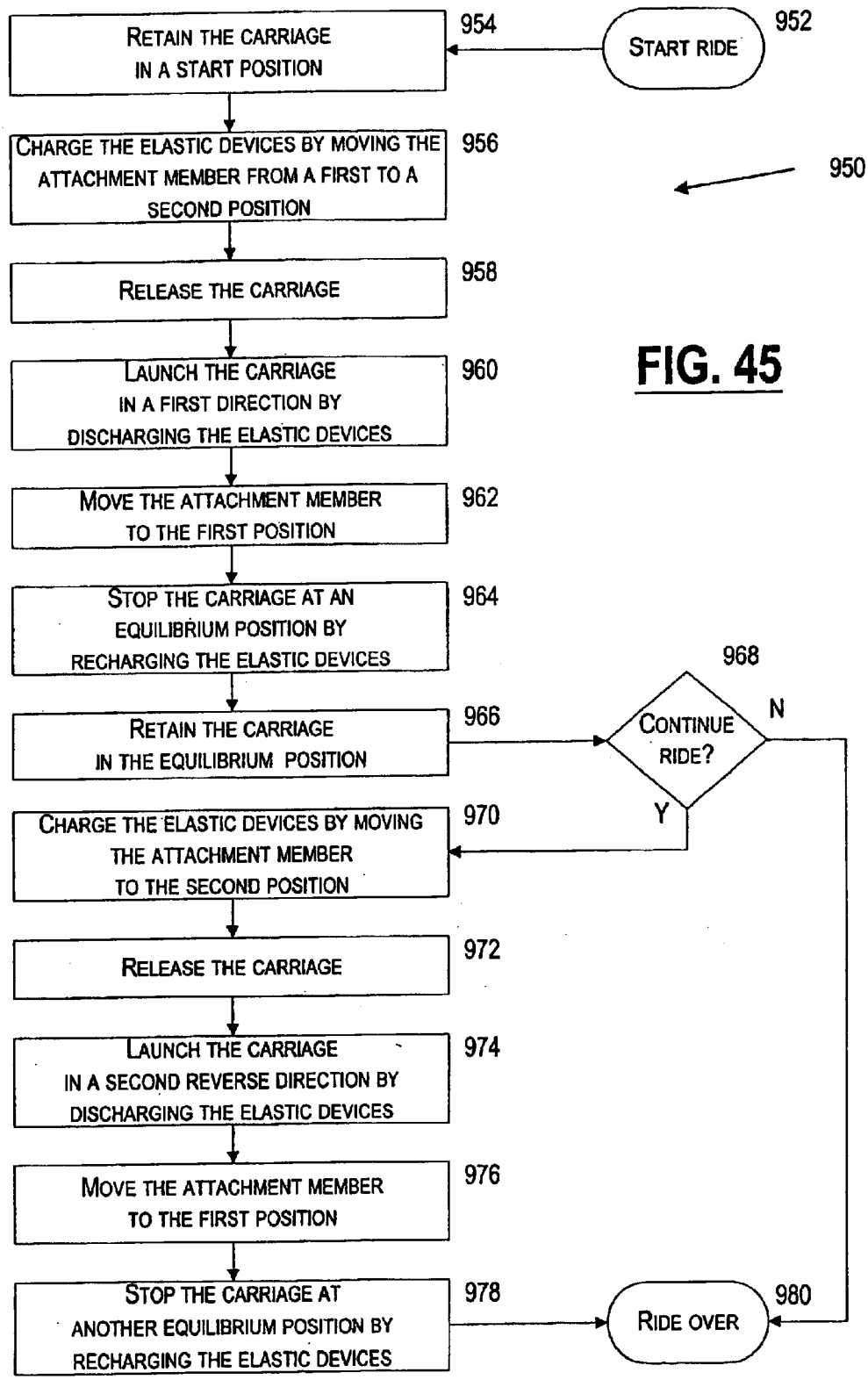
FIG. 45 is a flow diagram of a second exemplary method of propelling a carriage of an amusement ride.

Referring now to FIG. 45, there is illustrated a second exemplary method 950 of launching and stopping the carriage, beginning at step 952. At step 954 the carriage is retained in a start position, at step 956 the elastic members are charged, at step 958 the carriage is released, and at step 960 the carriage is launched, similarly to steps 904, 906, 908, and 910 above. The elastic devices can be provided by, for example, telescopic spring devices with two concentrically arranged coil springs. Differently from the first exemplary method 900, however, at step 962 the attachment member is moved from the second position back to the first position, for example by operation of the actuators, while the carriage is still in motion. Thus, the attachment member can be moved while the carriage is at about the top of the looped track so that the carriage will sail down the track without its motion being dampened by the winch. Alternatively, the attachment member can be moved after the carriage has begun to oscillate because of the recharging and discharging elastic devices. In this way, the carriage can oscillate for a cycle or two (or more) and, while the carriage is on the upswing, the attachment member can be moved so that when the carriage next oscillates downward it will proceed to free fall without the full braking effect of the winch.

At step 964 the carriage is stopped at an equilibrium position and at step 966 the carriage is retained in the equilibrium position, similarly to steps 916 and 918 above. At this point, step 968, the ride can be concluded at step 980. If the ride is continued, then at step 970 the elastic devices are charged, at step 972 the carriage is released, and at step 974 the carriage is launched in a second reverse direction, similarly to steps 922, 924, and 926, respectively.

Next, at step 976 the attachment member is returned to the first position, for example by operation of the actuators, while the carriage is still in motion, similarly to step 962. Then at step 978, the carriage is stopped at another equilibrium position, similarly to step 964, thereby concluding the ride at step 980.

Referring to FIGS. 46A–46C, there is shown an eighth exemplary amusement ride 1000 incorporating the winch 1010. This amusement ride 1000 is what is known as a vertical accelerator ride. The ride 1000 includes a passenger carriage 1001, two launch towers 1006a and 1006b (collectively, the "towers 1006"), and two launch cables 1028a and 1028b (collectively, the "cables 1028"). The cables 18 are connected directly to the carriage 1001 without intermediate sections of bungee cords, as is common in the prior art. Also, the carriage 1001 may be movably connected to and/or supported on a launch ramp 1051, as may be desired to provide an oscillating, looping, spiral, linear, or other motion of the carriage.

The towers 1006 can be of a lattice, monopole, or other construction, permanently mounted into the ground or provided by the boom of a crane or the like. Also, the number, height and position of the towers 1006 can be selected for producing a desired motion and stability of the carriage 1001. For example, two towers 1006 can be provided with the carriage 1001 positioned an equal distance between the towers 1006. Also, the towers 1006 can be provided with a height of about 150 feet, for launching the carriage 1001 to a height greater than that. Alternatively, three or another number of towers can be provided, shorter or taller towers can be provided, the carriage can be disposed closer to one of the towers, or other arrangements can be suitably employed. Furthermore, the carriage can be disposed between the sides of walls, in a canyon, or in a recessed area, the carriage can be suspended from a bridge or other structure, or other elevated members can be provided instead of towers.

The cables 1028 can be routed around upper support members such as upper pulleys 1011 and lower support members such as lower pulleys 1009, each coupled to one the towers 1006. Also, the cables 1028 can be routed between the upper support members and guide support members such as guide pulleys 1017, each coupled to one the towers 1006. The pulleys can be provided by high-speed pulleys made of hard plastic, nylon, metal, composite, or other materials selected for strength and durability. The upper and guide pulleys 1011 and 1017 cooperate to hold the cables 1028 between them when the carriage 1001 travels above the towers (see FIG. 47A). Also, the pulleys can be mounted to the towers so as to permit the pulleys to move from side to side during the oscillatory motion of the carriage. For example, the towers 1006 can have swivel couplings 1053 similar to those used on swiveling chairs or in the crane industry.

The carriage 1001 is secured in place by a brake such as a releaseable carriage lock system 1055 having a holding magnet as is used for lifting in junkyards. When the holding magnet is de-energized, the carriage is released and, under the force of the charged winch, launched into motion. Such a holding magnet can be obtained from the Jobmaster Magnets Company of Randallstown, Md. Alternatively or additionally, the brake/lock 1055 can be provided by a spring-loaded pin that is retracted by a hydraulic or pneumatic ram, a lever and fulcrum, an electronic cylinder, or by another mechanical or electronic device. Also, it will be understood that the brake/lock 1055 can be provided by a latch, pawl, pin, rod, finger, lifting or other magnet, or another mechanical linkage or mechanism, or a combination of any of the above-described locks, to provide redundant locks for safety considerations and requirements.

The brake/lock 1055 releasably couples the carriage 1001 to a platform or other portion of the winch 1010, to a freestanding platform independent of the winch, to an anchor, or to another structure. For example, an enclosure 1057 can be provided for housing some or all of the components of the winch, which has a top or other surface that doubles as a platform for loading passengers into the carriage. Alternatively, the brake/lock can releasably secure in place the cables, or a drum, axle, elastic member, tether, or second attachment member (as described below).

Upon releasing the carriage brake/lock 1055 while the winch 1010 is in a charged state (as described below), the carriage 1001 is launched along the launch ramp 1051. The length, shape, and position of the ramp 1051 can be selected to create a variety of rides. For example, as shown in FIG. 46C, the ramp 1051 can be provided with a curvature for launching the carriage 1001 into a looping or spiral trajectory such as that shown by the broken line. Also, the carriage 1001 can be movably mounted to the ramp 1051 by a race member such as a roller mechanism, a lubricated bearing, or the like, that is guided by a raised or recessed track 1059, so that the carriage 1001 is released from the ramp at a predetermined place or time to launch the carriage into a predetermined trajectory. Of course, other guide mechanisms known in the art can be suitably employed.

Figure 47A:
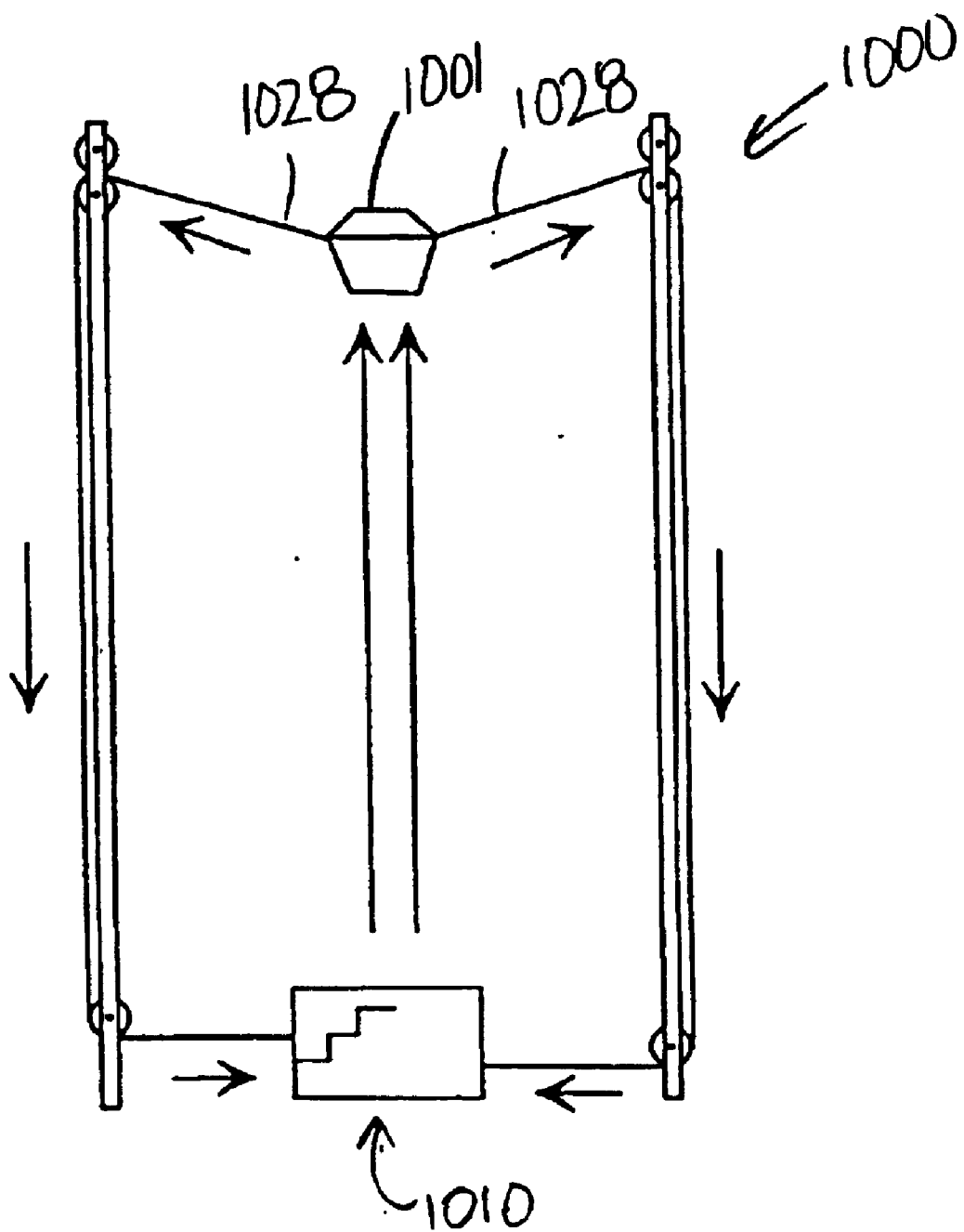
FIG. 47A is a front elevation view of the winch and vertical accelerator ride of FIG. 46A, showing the carriage after it has been launched.
Figure 47B:
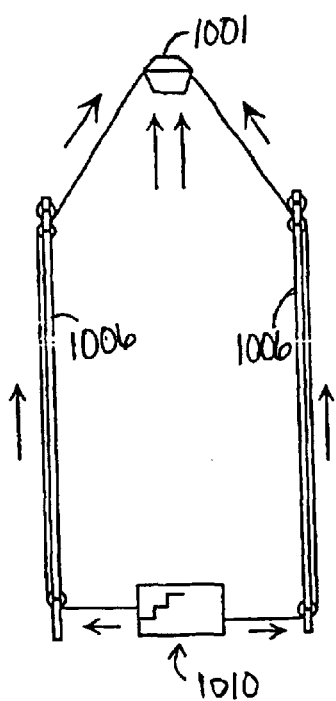
FIG. 47B is a front elevation view of the winch and ride of FIG. 46A, showing the carriage as it approaches the maximum altitude of its travel.

Referring now to FIGS. 47A–47E, there is illustrated the oscillatory motion of the carriage 1001 of the vertical accelerator ride 1000 when used with the winch 1010. Initially, the carriage 1001 is in the "loading" position and locked to a platform or other structure, as described above with reference to FIG. 46A. In FIG. 47A, the carriage 1001 has been released by the brake/lock and launched upward by the charged winch 1010 rapidly winding in the cables 1028. At this position, all or much of the length of the cables 1028 has been taken in by the winch 1010, and the winch is discharged or substantially discharged. In FIG. 47B, the carriage 1001 has traveled past the tops of the towers 1006, and is thereby unwinding the cables 1028 from and recharging the winch 1010. In this manner, recharging the winch 1010 causes the carriage 1001 to slow down, thereby acting as a braking and dampening mechanism for smoothening out the ride.

Figure 47C:
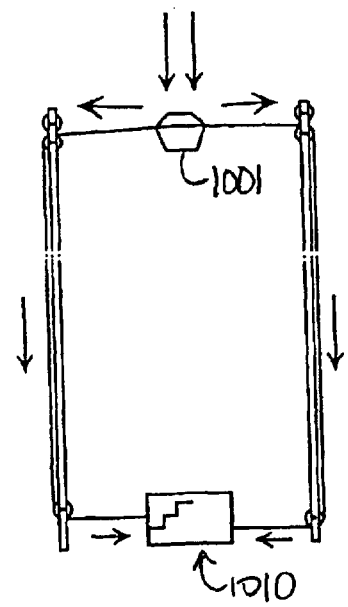
FIG. 47C is a front elevation view of the winch and ride of FIG. 46A, showing the carriage as it returns back down.
Figure 47D:
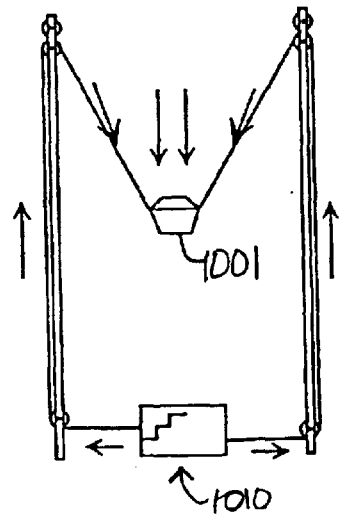
FIG. 47D is a front elevation view of the winch and ride of FIG. 46A, showing the carriage as it reaches the bottom of its oscillating path.
Figure 47E:
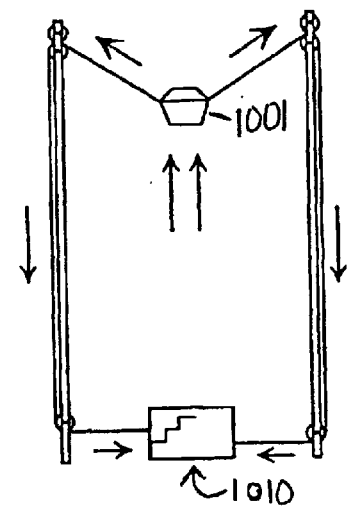
FIG. 47E is a front elevation view of the winch and ride of FIG. 46A, showing the carriage on its second trip upward of its oscillating path.

The carriage 1001 then reaches a maximum altitude and begins to fall back downward. In FIG. 47C, under the force of gravity and due to the discharging of the winch, the carriage has traveled back down to a position at about the tops of the towers. At this position, much of the length of the cables 1028 has been taken back in by the winch 1010, and the winch can be substantially discharged. In FIG. 47D, the carriage 1001 has continued downward, unwinding the cables and recharging the winch 1010 in the process. The carriage 1001 then reaches a lower end of its oscillating travel path, and begins to move back upward, as shown in FIG. 47E, continuing this cycle of motion until the winch is fully discharged. The carriage 1001 can then be lowered back down to the "load" position, unloaded of passengers, and reloaded for another turn.

Figure 48C:
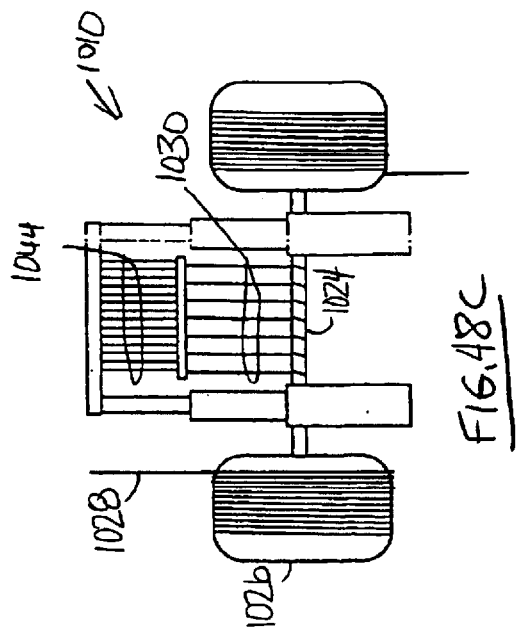
FIG. 48C is a side elevation view of the winch of FIG. 48A, showing the elastic devices discharged and the cables in a fully wound in position.
Figure 48D:
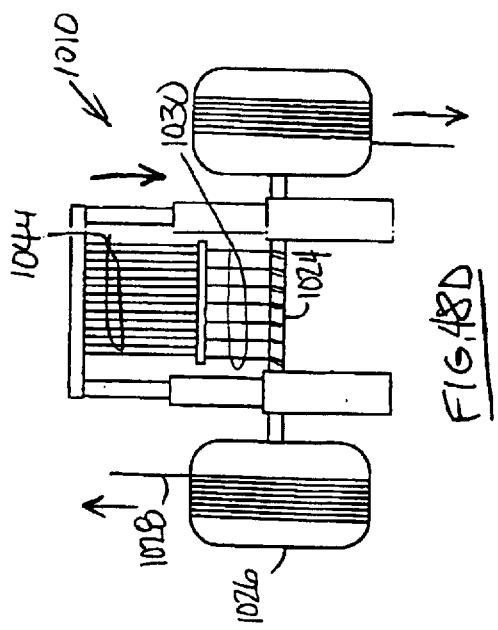
FIG. 48D is a side elevation view of the winch of FIG. 48A, showing the elastic devices being charged by the cables unwinding from the drums.
Figure 48A:
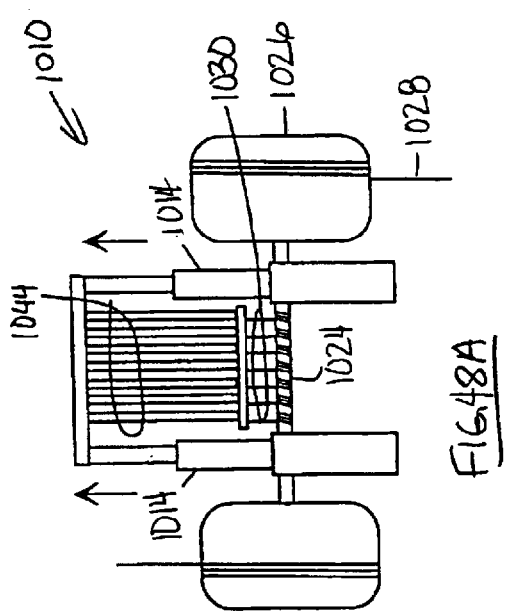
FIG. 48A is a side elevation view of a winch similar to that of FIG. 1A in operation with the ride of FIG. 47, showing the elastic devices being charged.

Referring to FIGS. 48A–48D, there is illustrated a block diagram showing the operation of the winch 1010 in launching and inducing an oscillatory motion of the carriage. In FIG. 48A, the actuators 1014 are extended, while the carriage is secured in a fixed position by the brake/lock, to extend (as shown by the arrows), charge and store energy in the elastic devices 1044. The winch in FIG. 48A corresponds to the carriage in FIG. 46A, after the passengers have been loaded into the carriage for the ride.

Figure 48B:
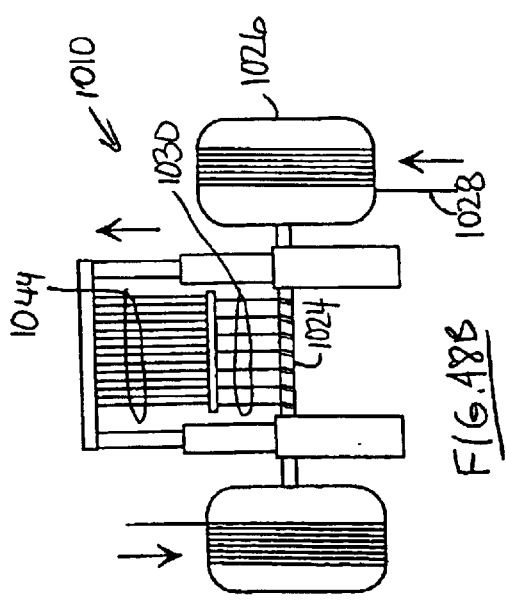
FIG. 48B is a side elevation view of the winch of FIG. 48A, showing the discharging elastic devices pulling the tethers to wind in the cables about the drums.

In FIG. 48B, the tethers 1030 rapidly wind out from the axle 1024 in response to the upward pull of the discharging elastic members 1044 (as shown by one arrow), when the carriage is released by unlocking the brake/lock. As the tethers 1030 unwind from the axle 1024, the axle and drums 1026 are caused to rotate, thereby winding in the cables 1028 about the drums (as shown by the other arrows) and launching the carriage. Because the diameter of the drums is greater than the diameter of the axle, a mechanical advantage is achieved which causes the carriage to be launched with great acceleration.

In FIG. 48C, the elastic devices 1044 have been returned to their normal unstretched state, and they are now substantially discharged. This discharge state preferably occurs before the carriage reaches the tops of the towers, or later where a clutch or other disengagement mechanism is provided. The winch in FIG. 48C corresponds to the carriage at about the position of FIG. 47A.

In FIG. 48D, the elastic devices 1044 are recharged as the cables 1028 are wound back out and, accordingly, the tethers 1030 are wound back in, as the carriage continues its upward trajectory after passing the tops of the towers. In this manner, the restretching of the elastic devices induces a braking and dampening effect on the carriage. The winch in FIG. 48D corresponds to the carriage in or just before the position of FIG. 47B. The winch continues to be recharged and discharged as the carriage oscillates up and down (see FIGS.

47C–6E), further braking and dampening the motion of the carriage until the carriage reaches an equilibrium state after fully expending the energy stored in the elastic members.

Figure 49:
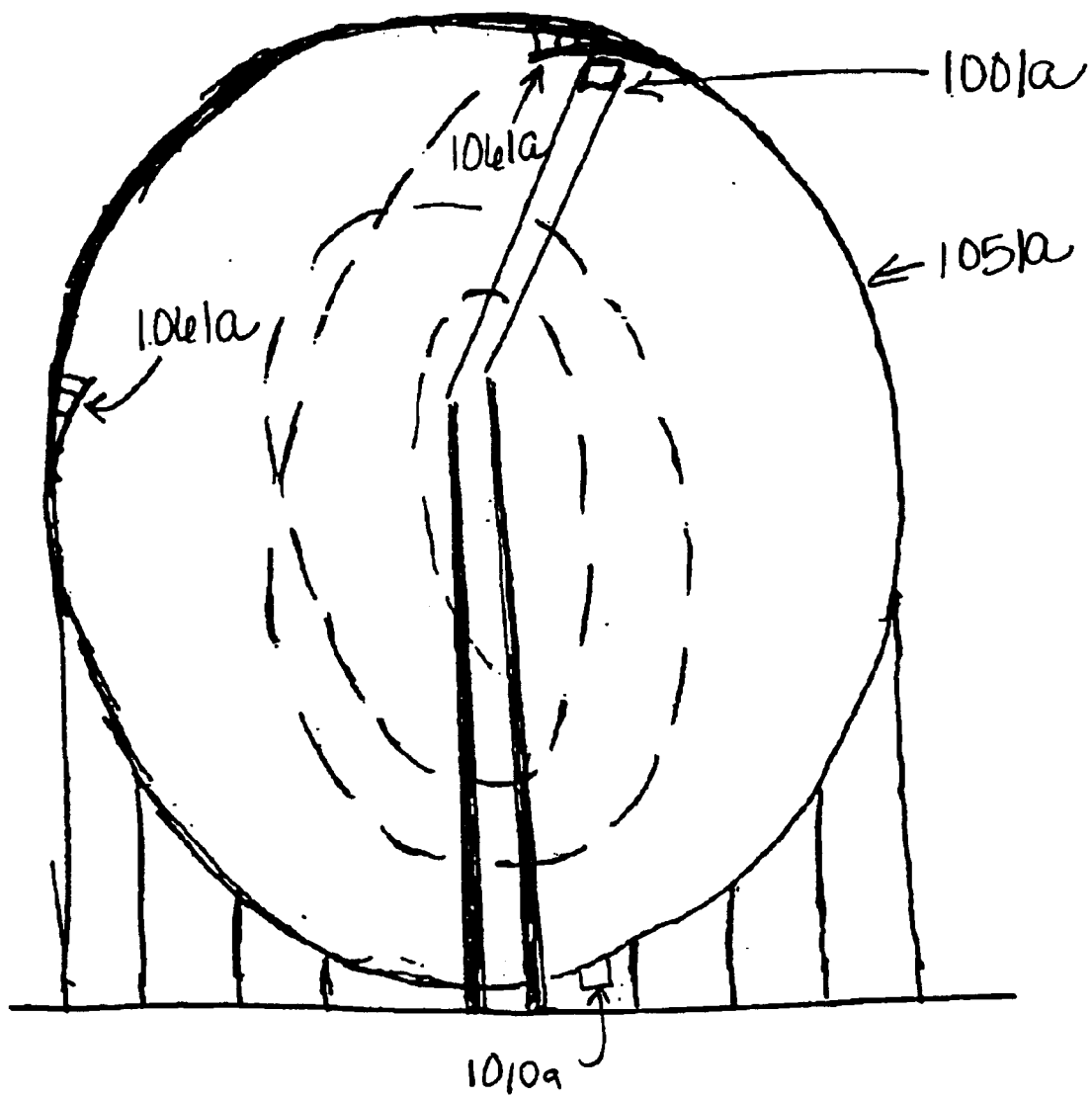
FIG. 49 is a side elevation view of a first alternative vertical accelerator ride similar to that of FIG. 46A, showing the path of the carriage.

Referring to FIG. 49, in a first alternative arrangement of the eighth exemplary ride 1000, the winch 1010a can be used with a ramp 1051a forming a closed loop such as a circle or oval, and supported by lower members and/or upper members (not shown). Additionally, the ramp 1051a can include two (or another number of) release ramps 1061a, at which the carriage 1001a is released from the ramp and follows the trajectory shown by the broken line.

Figure 50A:
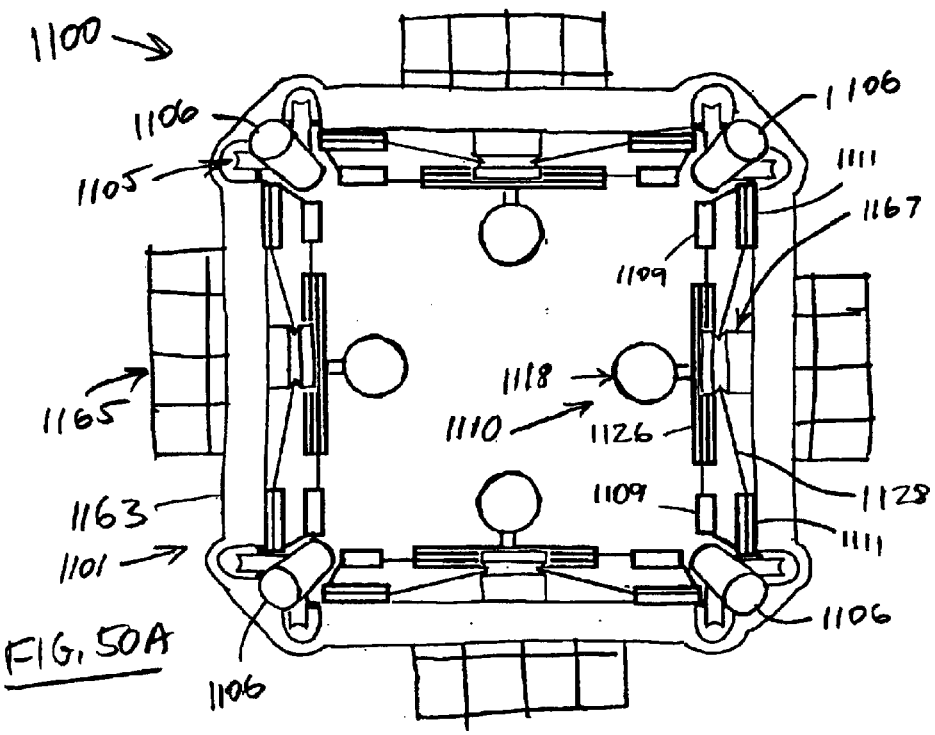
FIG. 50A is a top perspective view of a ninth exemplary amusement ride which is a vertical accelerator ride that rides on towers, showing the carriage about half-way up the towers.
Figure 50B:
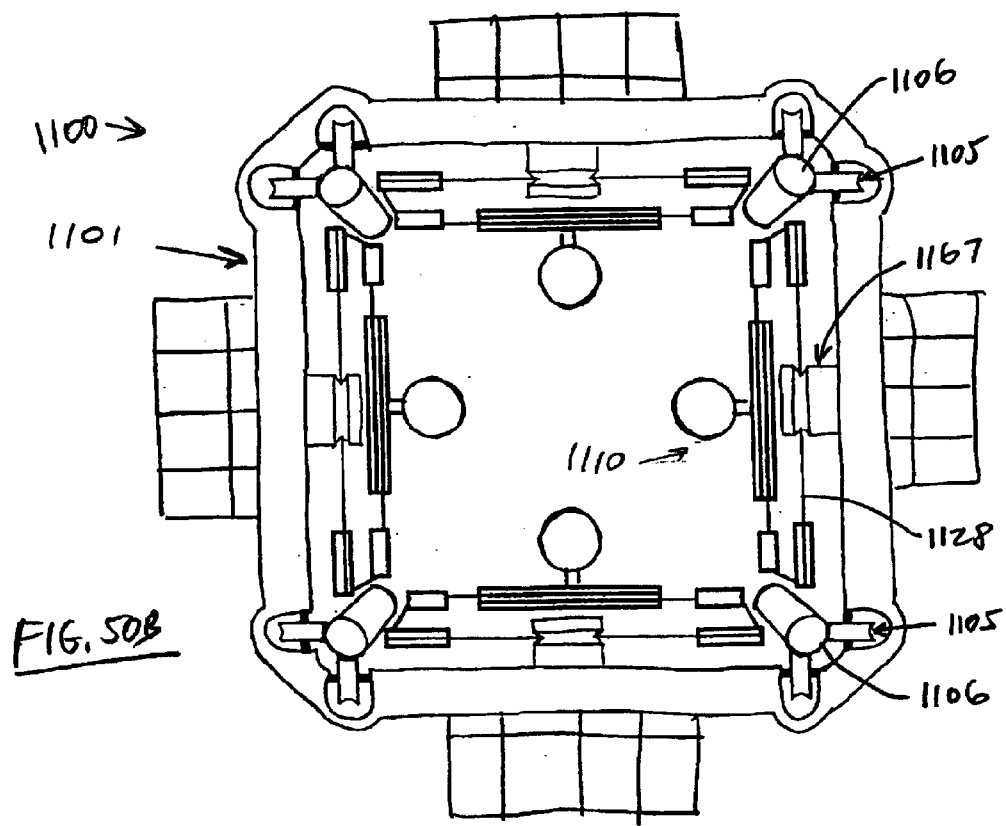
FIG. 50B is a top perspective view of the ride of a FIG. 50A, showing the carriage above the upper pulleys but below the top of the towers.

Referring to FIGS. 50A and 50B, there is illustrated a top perspective view of a ninth exemplary amusement ride 1100 incorporating four (or another number) of the winches 1110. FIG. 50A shows the ride with the carriage about half-way up the towers, and FIG. 50B shows the ride with the carriage above the upper pulleys but below the top of the towers.

In this vertical accelerator ride, there are four (or another number) of towers 1106 and a carriage 1101 provided by a frame 1163 with seats 1165 for the passengers, rollers 1105 that ride on the towers, and cable guides 1167 that engage the cable 1128 to charge the energy storage mechanism 1018 of the winch 1110. The frame 1163 may have a generally square annular shape and be made of steel or another material. The annular frame 1163 may positioned around the towers 1106 so that the towers 1106 stay within the frame 1163 as the carriage travels up and down the towers. The towers 1106 may be cylindrical poles made of steel or another material, and the rollers 1105 may by provided by grooved wheels that ride along the towers. Alternatively, the towers 1106 may have a track attached to it on which the rollers ride. Additionally, the rollers 1105 may be provided in sets of two or more arranged perpendicularly and positioned at the corners of the frame 1163, for providing a stable ride.

The cable guides 1167 may have a groove in them for receiving the cables 1128. Each cable 1128 is routed around lower and upper pulleys 1109 and 1111 with both ends coupled to the drum 1126 in a closed loop configuration. If desired, the cables 1128 may be connected to the cable guides 1167 for recharging the winch when the carriage travels up past the upper pulleys, thereby the providing a dampening action on the carriage.

FIGS. 51A–51D show the general operation of the ride 1100. In FIG. 51A, the energy storage mechanism 1118 has been charged and the brake released, so the carriage 1101 is being launched upward at a high velocity. In FIG. 51B, the carriage 1101 has shot up the towers, reached a peak height, and has begun to fall back down. If desired, the energy storage mechanism 1118 may be configured to be recharged as the carriage travels up past the upper pulleys, thereby dampening the motion of the carriage. The position of the carriage 1101 in FIG. 51B generally corresponds to that shown in FIG. 50B.

In FIG. 51C, the carriage 1101 has continued falling and the cable guides 1167 have engaged the cable 1128, thereby recharging the energy storage mechanism 1118. The carriage bottoms out, then is relaunched by the now recharged energy storage mechanism 1118, and the carriage continues to oscillate, as suggested by FIG. 51D. Accordingly, the ride 1100 provides a similar trajectory and thrill as the vertical accelerator ride 1000 described above, but in this ride 1100 the carriage at all times is in contact with the towers to provide enhanced safety.

Figure 52B:
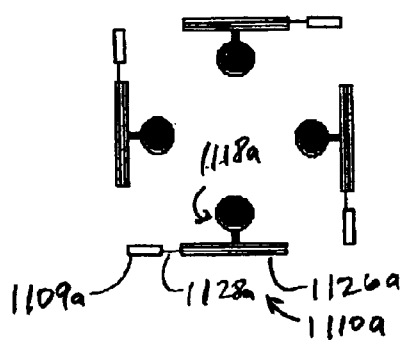
FIG. 52B is a plan cross-section view of the ride of FIG. 52A taken at line B—B, showing the arrangement of the four winches that are used to power the ride.
Figure 52A:
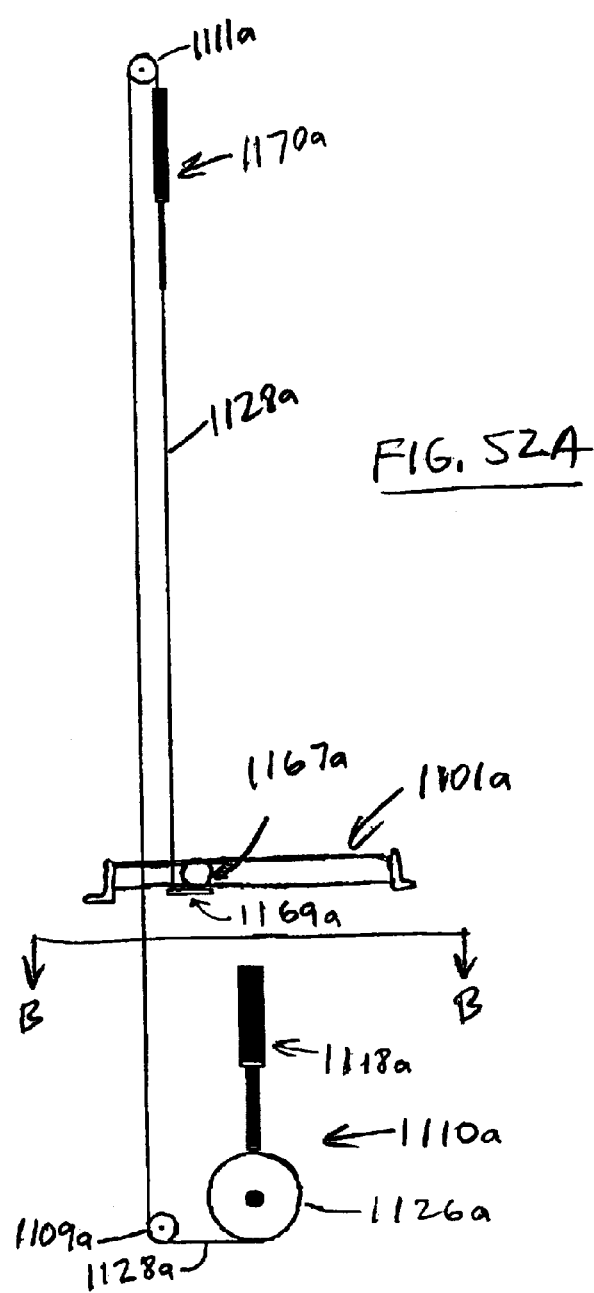
FIG. 52A is a schematic diagram of a portion of a first alternative of the ninth exemplary amusement ride, showing one of the cables in an open loop configuration.

Referring to FIGS. 52A and 52B, there is shown a first alternative ride of the ninth exemplary amusement ride 1100. In this ride, instead of the cable 1128a being in a closed loop configuration, one end of coupled to the drum 1126a and the other end has catch member 1169a coupled to it. The cable guide 1167a engages the catch member 1169a to charge the energy storage mechanism 1118a. The carriage 1101a, pulleys 1109a and 1111a, and other components may be similar to those of the vertical accelerator ride 1000. Also, an energy absorbing mechanism 1170a is provided adjacent the upper pulley 1111a for dampening or stopping the motion of the carriage 1101a.

Figure 53:
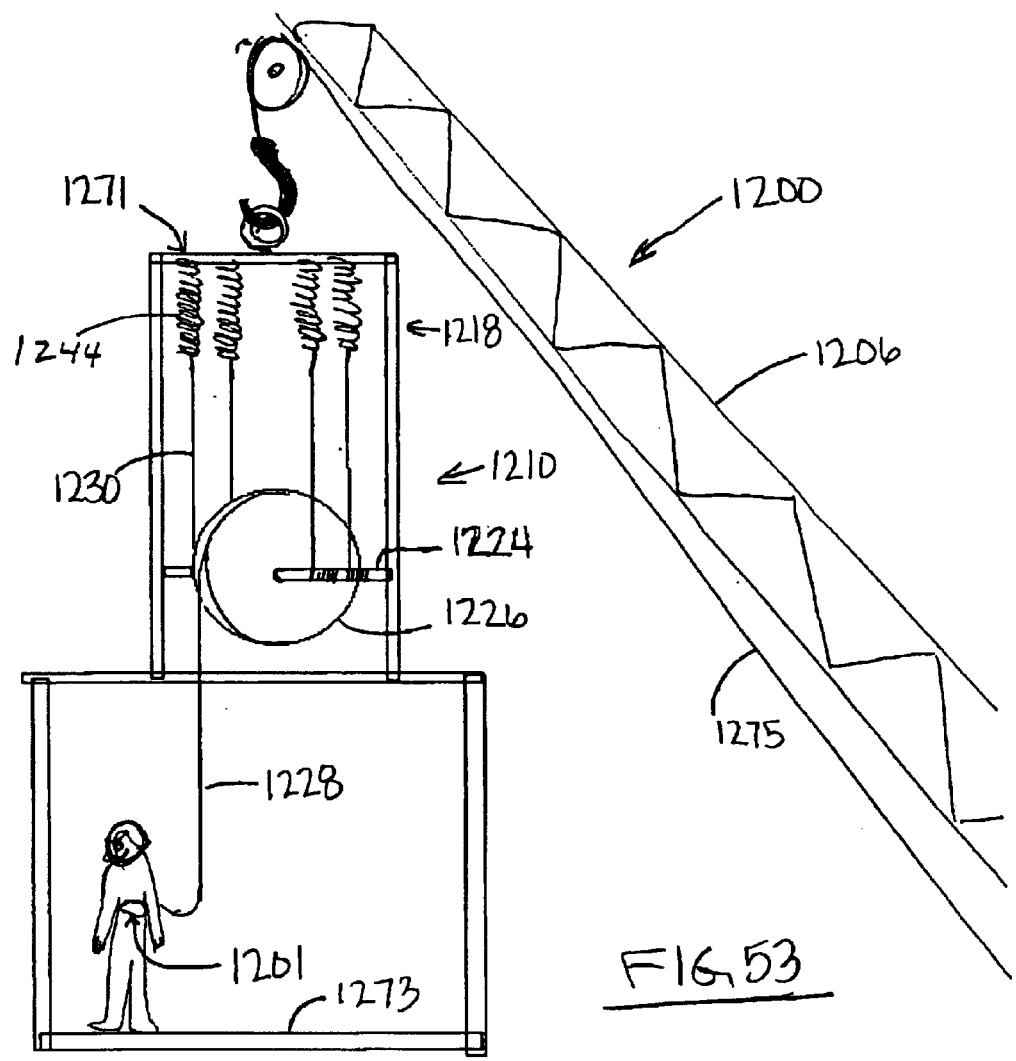
FIG. 53 is a side elevation view of a tenth exemplary amusement ride in the form of a free fall or bungee jump-type ride using a winch without actuators.

Referring to FIG. 53, there is shown a tenth exemplary amusement ride 1200 incorporating the winch 1210. In this embodiment of the invention, the amusement ride is a free fall or bungee jump-type ride. The carriage 1201 is provided by a passenger harness that the rider wears and that is connected to one or more of the cables 1228 (instead of bungee cords, as is the common practice), and the tower 1206 is provided by the boom arm of a crane. The ride 1200 includes a launch frame 1271 with a launch platform 1273 where a person may stand or sit and jump therefrom, with the launch frame coupled to an upper section of the tower 1206. For example, the launch frame 1271 may be coupled to the tower 1206 by a hoisting cable 1275 that permits the launch frame to be moved between a lowered position and an elevated position. The winch 1210 may be mounted to the launch frame as shown, mounted on the ground with the cable routed around a pulley or the like on the upper section of the tower, mounted on the crane with the cable routed around a pulley or the like on the upper section of the crane boom, or positioned elsewhere.

Similar to the embodiments described above, the winch 1210 includes an energy storage mechanism 1218 having one or more elastic devices 1244 (for example, connected to a first attachment member of the launch frame), one or more tethers 1230 connected to the elastic devices (directly, via a second attachment member, or otherwise), an axle 1224 that winds in and out the tethers 1230, and a drum 1226 connected to the axle and that winds in and out the cable 1228. More than one drum can be provided, as may be desired in a given application. In this embodiment, however, the winch is provided without the actuator, similar to the second exemplary embodiment shown in FIG. 27.

Figures 54A, 54B:
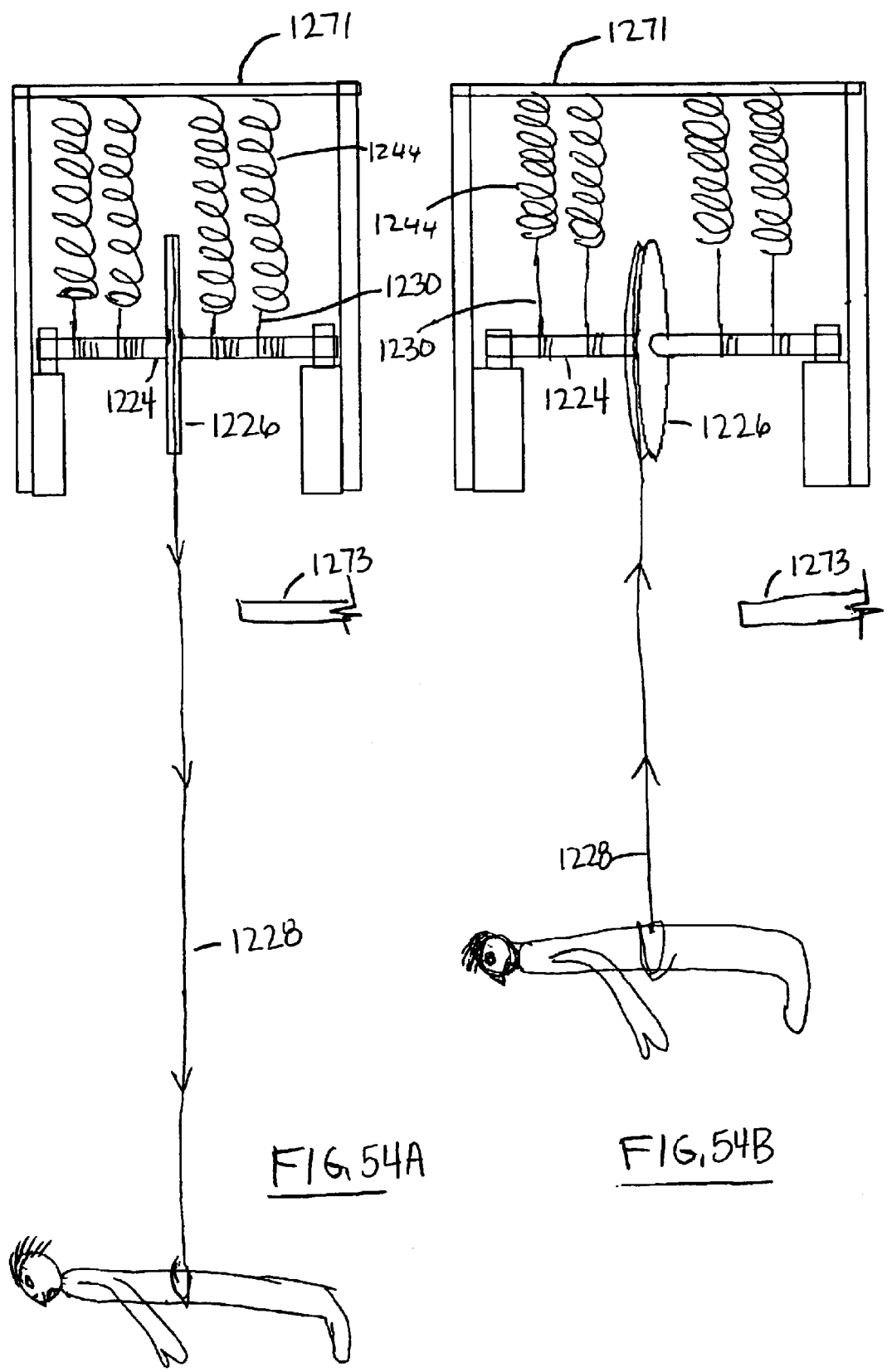
FIG. 54A is a side elevation view of the winch and ride of FIG. 53, showing a jumper unwinding the cable from the drum to wind in the tethers about the axle and stretch the elastic devices.
FIG. 54B is a side elevation view of the winch and ride of FIG. 53, showing the elastic devices contracting to wind out the tethers from the axle and wind the cable in about the drum.

FIGS. 54A and 54B show the operation of the winch 1210 in this form, which is somewhat different from the operation of the previously described embodiments. As shown in FIG. 54A, when a jumper leaps and falls downward from the platform 1273, his or her weight pulling on the cable 1228 causes the cable to unwind from the drum 1226, which causes the tethers 1230 to wind in about the axle 1224, which in turn stretches and charges the elastic devices 1244. After the elastic devices 244 reach their fully stretched length, the charged elastic devices pull the rider back upwardly. Thus, as shown in FIG. 54B, the charged elastic devices 1244 then contract to wind out the tethers 1230 from the axle 1224 and wind the cable 1228 in about the drum 1226, thereby discharging the elastic devices. This motion is repeated so that the rider falls and is pulled back up in an oscillatory motion until the rider comes to a stop.

In this manner, the winch 1210 provides a dampening effect on the oscillatory motion of the rider, but need not launch the rider into motion. It will be understood, then, that the weight of the falling rider is what charges the elastic devices 1244 of the energy storage mechanism 1218, so that neither an actuator nor a brake/lock is needed in this embodiment of the winch.

Referring to FIGS. 55A and 55B, there is shown an eleventh exemplary amusement ride 1300 in the form of a dragster ride. The ride 1300 uses an accelerator winch 1310 and a decelerator (dampening) winch 1311 for each track 1302 and dragster carriage 1301. Of course, the ride 1300 may be provided with only one or more than two winches per track and carriage, and only one or more than two tracks and carriages may be used. The accelerator winch 1310 and the decelerator winch 1311 may be identical structures, however, different names are used herein for clarity.

The dragster ride 1300 may include two dragster vehicles 1301 or other carriages for one or more passengers, two side-by-side track assemblies 1302 upon which the dragsters 1301 ride, two conventional winches or other retracting assemblies 1375 for forcing the dragsters 1301 back to a "start" position, starting light assemblies 1377 such as "Christmas tree" light assemblies, and sensors 1379 such as electric eyes for terminating operation of a timing mechanism, all similar to the corresponding structures in the dragster amusement ride described in U.S. Pat. No. 5,522,321, which is hereby incorporated by reference in its entirety. As the '321 patent is an issued U.S. patent that is incorporated by reference, all of the details of this device will not be repeated herein.

However, for clarity, it will be noted that the track assemblies 1302 have a "start" end 1381 in an acceleration zone A, a "finish" end 1383 in a deceleration zone C, and an intermediate cruising zone B, similar to the '321 patent. Also, the dragsters 1301 each have first and second catch members 1385 and 1387 configured so that the first catch members 1385 are engaged to launch the dragsters from the start end 1381 of the track through the acceleration zone A, and the second catch members 1387 are then engaged to stop them at the finish end 1383 in the deceleration zone C and return them to the start end. The catch members 1385 and 1387 are provided by the downwardly extending hooks of the '321 patent, though alternatively they can be provided by one or another number of plates, arms, blocks, bars, hooks, or other structures positioned at the front, middle, back, or other part of the dragster.

Additionally, the dragsters 1301 have retaining assemblies 1389 for securing the dragsters 1301 in a "start" position at the start end 1381 of the track, and foot pedals or other passenger controls (not shown) operatively coupled to the retaining assemblies 1381 for releasing the dragsters 1301 to be launched down the track. The retaining assemblies 1389 are provided by the latch assemblies of the '321 patent, though alternatively they can be provided by electromagnet assemblies, fluid cylinder extension and retraction assemblies, or other retaining assemblies. Furthermore, the retracting assemblies 1375 alternatively can be provided by fluid cylinder assemblies that push or pull on the dragsters, or by other mechanisms.

FIGS. 56A–56E show the operation of the accelerator and decelerator winches 1310 and 1311, in conjunction with accelerator and decelerator guide assemblies, to operate the dragster ride 1300. The accelerator and decelerator guide assemblies have elongate tubular housings or other guide members 1390 and 1391 and have guide followers 1392 and 1393 with outwardly projecting wings or other engagement members that slide in slots in the housings and are engaged by the catch members 1385 and 1387, all similar to the corresponding structures of the '321 patent. The guide followers 1392 and 1393 are provided by the outwardly projecting wings in the '321 patent, but alternatively they can be provided by one or another number of plates, arms, blocks, bars, hooks, or other structures for pushing or pulling the dragster carriage.

Additionally, the guide assemblies have pulleys 1394 and 1395 mounted to the track assemblies 1302 in a spaced apart relationship with the winches 1310 and 1311. The winches 1310 and 1311 include cables 1328 and 1329 that are routed around the pulleys 1394 and 1395 and connected to the guide followers 1392 and 1393. It will be understood that, while the guide followers 1392 and 1393 and the housings 1390 and 1391 are shown recessed in the track assemblies 1302, alternatively they can extend above the tracks, for example, in the middle of the tracks, as is known in the art.

Figure 56A:
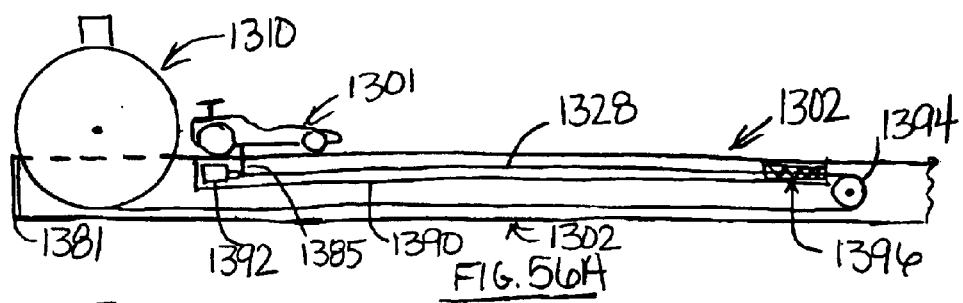
Figure 56B:
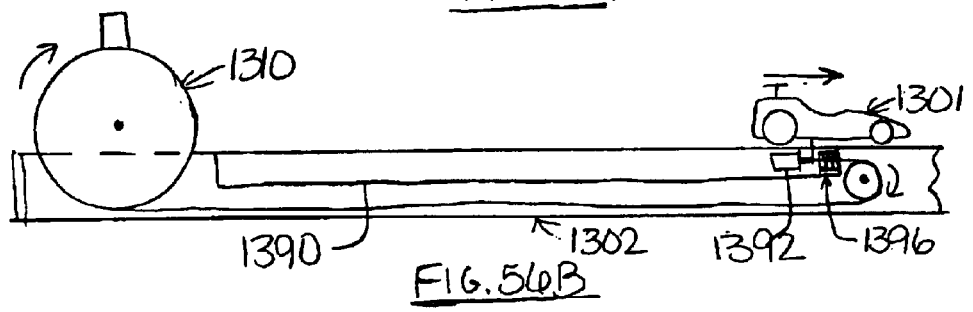

In FIG. 56A, one of the dragsters 1301 is in the start position at the start end 1381 of the track assembly 1302 and the accelerator winch 1310 is in a charged state. The dragster 1301 has been moved into this position by operation of the retracting assembly 1375, as is known in the art, after (or before) being loaded with a passenger. When the starting light assemblies 1377 are operated to indicate "go," the passengers depress the accelerator foot pedals in the dragsters to release the retaining assemblies 1389. Upon releasing the retaining assembly 1389, the dragster 1301 is launched along the tracks 1302 by the discharging operation of the accelerator winch 1310, as shown in FIG. 56B. In particular, as the accelerator winch 1310 is rapidly discharged, it quickly pulls in the cable 1328 with great force, thereby quickly pulling the guide follower 1392 and the dragster 1301 down the track 1302. The guide follower 1392 travels along the housing 1390 until it reaches the end of its range of motion as selected, for example, by the length of the slot in the housing.

Also, an accelerator energy absorbing mechanism 1396 can be positioned at the end of the housing away from the start end of the track, the energy absorbing mechanism having one or more elastic members such as compression springs that are engaged by the guide follower 1392 and compressed to slow the guide follower. After the guide follower 1392 travels to the end of its range of motion, the momentum of the dragster 1301 carries it forward (after the catch member 1385 disengages from the guide follower 1392) down the tracks 1302 from the acceleration zone to the cruising zone and past the sensors which determine the drag race winner.

Figure 56C:
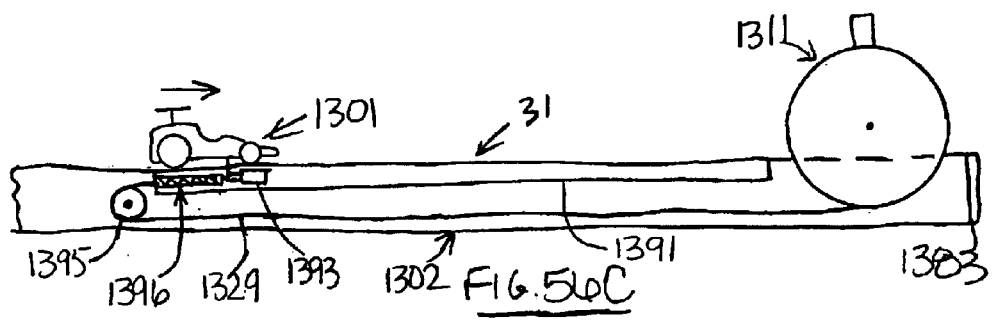
Figure 56D:
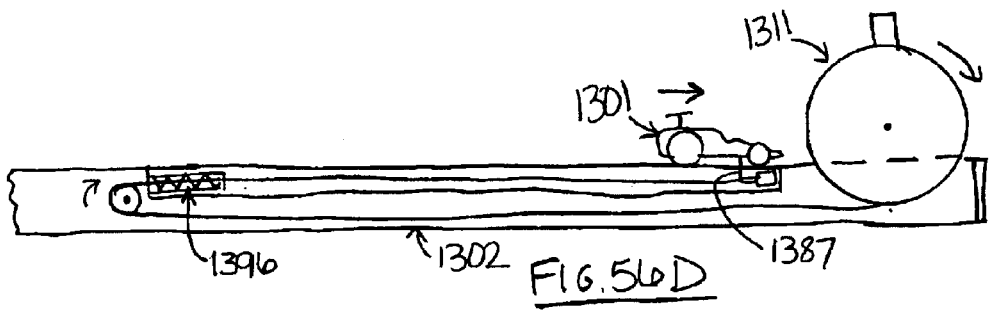

As shown in FIG. 56C, the dragster 1301 then enters the deceleration zone and approaches the finish end 1383 of the track and the discharged decelerator winch 1311. When the catch member 1387 comes into engagement with the guide follower 1393, the momentum of the dragster 1301 pushes the guide follower 1393 along the housing 1391. As the guide follower 1393 moves toward the winch 1311, it pulls out the cable 1329 from the winch thereby charging the winch and decelerating the dragster 1301 until the dragster comes to a stop, as shown in FIG. 56D. A bumper can be provided for reducing any impact force when the dragster stops at the finish end, if so desired.

Figure 56E:
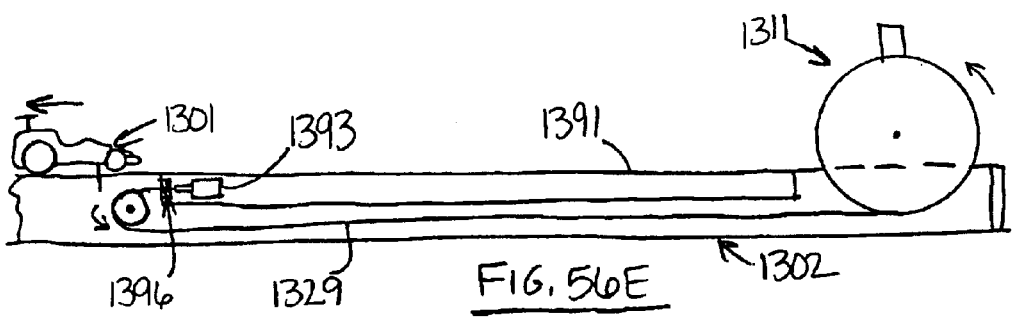

The dragster 1301 is typically not retained at the finish end 13836, though it could be if desired, so the charged winch 1311 will then begin to discharge and quickly pull in the cable 1329 thereby quickly pulling the guide follower 1393 and the dragster 1301 back down the track 1302 toward the start end, as shown in FIG. 56E. A decelerator energy absorbing mechanism 1396 may be provided for stopping the guide follower 1393, and another bumper can be provided for reducing any impact force when the dragster stops at the start end, if so desired. At that point the ride is completed, the passenger gets out of the dragster, and the process is repeated.

Those skilled in the art will recognize that the cables 1328 and 1329 may be provided by wire rope, lifting cable, or the like, and made of a material such as steel, as are commonly used in the crane industry. The cables 1328 and 1329 are connected between the guide followers 1392 and 1393 and the winches 1310 and 1311, respectively, so that there is no need for the bungee cords of the prior art. The pulleys 1395 and 1396 may be provided by high-speed pulleys made of hard plastic, nylon, metal, composite, or other materials selected for strength and durability. The dragster carriage 1301 can hold one or multiple passengers, with seats and seatbelts as are typically used for amusement rides. Also, the carriages are preferably secured to the track as they are being guided the track, as is known in the art.

In a first alternative dragster ride 1300a shown in FIG. 57, for each of the two tracks 1302a, the accelerator winch 1310a is located at the start end 1381a and the pulley 1394a is spaced apart from the winch. The cable 1328a is routed from the winch 1310a, around the pulley 1394a, and back to the winch in a closed loop, with the guide follower 1392a attached to the cable for launching the dragster carriage 1301a through the acceleration zone. In this closed loop arrangement, the housing assembly of the exemplary embodiment may be provided but is not needed. It will be understood that a similar decelerator winch (not shown) can be provided at the track finish end (not shown) for returning the dragster carriage 1301a to the start end. The guide follower 1385a can be returned to the start end 1381a by using a motor for operating the winch in reverse, or by other mechanisms known in the art.

In a second alternative dragster ride shown in FIG. 58, for each of the two tracks 1302b, the accelerator winch 1310b is located at the start end 1381b and the pulley 1394b at the finish end 1383b. The cable 1328b is routed from the winch 1310b, around the pulley 1394b, and back to the winch in a closed loop, with the dragster carriage 1301b attached to the cable along the full length of the track. Although additional lengths of cable 1328b are used, this arrangement eliminates the need for the decelerator winch of the exemplary embodiment. The dragster carriage 1301b can be returned to the start end 1381b by using a return winch, a conveyer, an inclinable track pivotal at the start end, a clutch for disengaging the winch and a motor for operating the winch in reverse, or by other mechanisms known in the art. Alternatively, a decelerator winch can be provided at the finish end 1383b for returning the dragster carriage 1301b to the start end 1381b.

It will be understood that the length, shape, and position of the track assemblies 1302 can be selected to create a variety of rides. For example, the track can have one or more linear, arcuate, sinusoidal, corkscrew, or other regular or irregular shaped sections, two or another number of ramps can be provided, or the deceleration zone of the track can be elevated or otherwise configured to brake or slow the carriage, as may be desired to cause a particular motion and path of the carriage.

FIGS. 59A–59F shown several such alternative embodiments. It will be understood that, while these embodiments are shown without the pulleys of the exemplary dragster ride embodiment, such pulleys nevertheless can be provided where it desired to locate the winch behind, below, above, or to the side of the carriage. Furthermore, while these embodiments are shown with only one track and carriage, they can be suitably provided with multiple sets of tracks and carriages if so desired. Accordingly, although the arrangement of two winches that propel a carriage back-and-forth along a track with a middle coasting section is described above with reference to the dragster ride, this same arrangement may be employed in roller coaster and other rides.

In a third alternative arrangement shown in FIGS. 59A and 59B, the winch 1310c can be used with a roller coaster ride having a carriage 1301c provided by conventional roller coaster cars coupled together that are launched along a track 1302c such as a conventional roller coaster track. The cable 1328c is connected to the winch 1310c, similarly to that described above. When the carriages 1301c are released with the winch charged, the carriages 1301c are launched up the track 1302c and around the closed circuit of track.

In a fourth alternative arrangement shown in FIG. 59C, the winch 1310d can be used with an amusement ride having a carriage 11301d that is launched along a track 1302d with a loop and an elevated distal end for stopping the carriage and allowing it to return. The track 1302d can be configured so that the carriage travels back-and-forth along the same section of the track (as shown), or configured as a closed circuit. A cable 1328d is connected to the winch 1310d, similarly to that described above. When the carriage 1301d is released with the winch charged, the carriage 1301d is launched along the track 1302d, through the looped section, up the elevated distal end until the carriage stops, back down the elevated distal end under the force of gravity, back through the looped section, and back to the start position.

In a fifth alternative arrangement shown in FIG. 59D, two winches 1310e and 1311e can be used with an amusement ride having a carriage 1301e that is launched along a track 1302e with a corkscrew section. The track 1302e can be configured so that the carriage travels back-and-forth along the same section of the ramp as shown (as shown), or configured as a closed circuit. The cable 1328e is connected to the winch 1310e, similarly to that described above. When the carriage 1301e is released with the first winch 1310e charged, the carriage 1301e is launched along the track 1302e, through the corkscrew section, and into engagement with the second winch 1311e disposed at the second end of the track. The second winch 1311e then functions to dampen and stop the motion of the carriage 1301e, thereby charging and storing energy in the winch. The charged second winch 1311e can then be used to launch the carriage back through the corkscrew section into engagement with the first winch, and the cycle repeated as desired.

A sixth alternative arrangement shown in FIG. 59E is similar to the fifth alternative arrangement, except that an elevated intermediate section is provided instead of the corkscrew section. The carriage 1301f is launched by the winch 1310f up the elevated intermediate section of the track 1302f, slowing but not stopping the carriage, and then down the intermediate section into engagement with the winch 1311f.

A seventh alternative arrangement shown in FIG. 59F is similar to the fifth alternative arrangement, with winches 1310g and 1311g, except that the track 1302g is provided by a generally linear elevated cable. The sixth and seventh alternative arrangements are well suited for use in transporting persons or objects over distances, similar to conventional elevated cable systems used in amusement parks and on ski mountains.

FIGS. 60A–60F show several alternative cable layouts for using one or more of the winches in one or more of the dragster or other amusement rides. In an eighth alternative arrangement shown in 60A, the cable 1228h is coupled to the winch 1310h and to the guide follower 1392h. The guide follower 1392h launches the carriage towards the winch 1310h. Also, an energy absorbing mechanism 1370h is provided in-line with the cable or positioned adjacent the cable where it may be impacted by the guide follower to dampen its motion. This spreads over time the deceleration of the guide follower 1392h and reduces its deceleration rate, thereby reducing the stresses on the winch and other components of the ride.

In a ninth alternative arrangement shown in FIG. 60B, the cable 1228i is routed around a pulley 1394i in an open loop configuration, so that the guide follower 1392i launches the carriage away from the winch 1310i. An energy absorbing mechanism 1370i is positioned adjacent the pulley 1394i to dampen the motion of the guide follower 1392i.

In a tenth alternative arrangement shown in FIG. 60C, the cable 1228j is routed around two pulleys 1394j and between two winches 1310j in a closed loop configuration. The pulleys 1394j are spaced apart to provide a dampening affect.

In a eleventh alternative arrangement shown in FIG. 60D, the cable 1228k is routed around two pulleys 1394k and between two winches 1310k in a closed loop configuration. As one of the winches 1310k is discharged, the cable 1228k travels in one direction being wound in to that winch and wound out from the another winch. Then when the other winch 1310k is discharged, the cable 1228k travels in the other direction being wound in to the other winch and wound out from the first winch. Accordingly, this arrangement can pull the cable back-and-forth, in both directions, and is well suited for use with slingshot and crossbow rides.

In a twelfth alternative arrangement shown in FIG. 60E, the cable 1228l is routed around two pulleys 1394l and coupled to one winch 1310l with one drum 1326l with two grooves (or one winch with two drums each with a groove) in a closed loop configuration. As the winch 1310l is discharged, the cable 1228l winds out from one groove and is wound in onto another groove in one direction. A clutch or other disengagement mechanism between the drum and the axle may be operated so that the tethers can be wound back in around the axle by a motor or other drive mechanism, then the winch can be operated again to launch another carriage in the same direction.

In a thirteenth alternative arrangement shown in FIG. 60F, the cable 1228m is routed around pulleys and is routed all the way around (at least one revolution) the drum 1226m of the winch 1310m. This provides increased traction and reduced slippage of the cable 1228m on the drum 1226m.

Turning now to FIGS. 61A–61C, there is shown a winch 1400 according to a third exemplary embodiment of the invention. Any of the winch alternatives described above may be incorporated into the winch 1400, which may be used with any of the amusements rides described above as well as others not described herein. The winch 1400 has one (or more) drum 1426 each with two (or more) grooves that each receive the ends of a cable in a closed loop configuration. The drum 1426 is mounted on an axle 1424 about which are windable two (or another number of) tethers 1430a and 1430b.

The winch 1400 includes a launch spring device 46a and a dampening spring device 46b, with the launch spring device having a stiffer spring capable of overpowering the dampening spring device. Also, the launch spring device 46a and the dampening spring device 46b may each include two (or another number of) coil springs with different spring factors. The launch spring device 46a is charged by the operation of two (or another number of) actuators 1414. But the dampening spring device 46b is provided without an operable connection to an actuator, and as such is used for dampening but not for launching.

In FIG. 61A, the launch spring device 46a is in the neutral, uncharged state. In the dampening spring device 46b, the weaker (upper) catch spring is compressed and the stronger (lower) catch spring is in the neutral, uncharged state. Then in FIG. 61B, the actuators 1414 are operated to charge the launch spring device 46a with the brake on and the dampening spring device 46b unaffected. Then in FIG. 61C, the brake has been released permitting the launch spring device 46a to discharge and wind out the launch tether 1430a from the axle 1424 thereby rapidly rotating the drum 1426 to wind in the cable. Because the dampening tether 1430b is also coupled to the axle 1424, when the axle rotates from the discharging launch spring device 1446a it also winds in the dampening tether 1430b, thereby charging the dampening spring device 1446b to provide a dampening action. This smoothes out the high stresses and strains resulting from the high speeds produced by the rapid winding winch 1400.

Turning now to FIGS. 62A–62D, there is shown an alternative arrangement of two of the winches of FIG. 1A cooperating to function similarly to the winch of FIG. 61A. FIG. 62A shows a launch winch 10a with a stiffer elastic device 44a and a dampening winch 11a with a less stiff elastic device 44b. The elastic device 44a of the launch winch 10a has been charged by operation of the actuator with the brake engaged.

Then in FIG. 62B, the brake is released permitting the launch winch 10a to discharge. Because of its stiffer elastic device 44a, the launch winch 10a overpowers the dampening winch 11a, winds in the cable 28a, and launches the guide follower 92a and/or one or more carriages (as shown by the horizontal arrow). As the launch winch 10a discharges and winds in the cable, the cable is also wound out from the dampening winch 11a, thereby charging it and providing a dampening action. In FIG. 62C, the launch winch 10a has fully discharged and the dampening winch 11a has been charged. To repeat the process, as shown in FIG. 62D, the winches 10a and 11a may be returned to the positions of FIG. 62A by operating the actuator to lower the elastic device of the launch winch 10a and permit the dampening winch 11a to reel the cable back in.

In another aspect of the present invention, there is provided a third exemplary method of propelling an amusement ride carriage. This method may comprise locking the carriage in a fixed position, charging and storing energy in one or more elastic devices, and unlocking the carriage so that it is free to move. The method further comprises winding out one or more tethers about a surface of an axle, wherein the tethers are coupled to the elastic devices and are wound out under the force of the energy stored in the elastic devices; winding in one or more cables about a surface of one or more drums connected to the axle, wherein the cables are wound in responsive to the winding out of the tethers about the axle, the drum surfaces diameter being greater than the axle surface diameter to provide a mechanical advantage; and propelling the carriage in response to the winding in of the cables about the drums, wherein the cables are connected to the carriage.

Additionally, the step of charging and storing energy in the elastic devices can be accomplished by extending a hydraulic lift or other actuator that is connected directly or indirectly to the elastic devices. Also, the step of winding in the cables can include winding the cables into grooves defined in the drums. Furthermore, the step of propelling the carriage can be include movably coupling the carriage to a ramp, launching the carriage along the ramp, and releasing the carriage from the ramp. Moreover, the method can include the step of winding out the cable from the drums to store a charge in the elastic devices, and returning the carriage to a locked position so that it is ready for the next ride.

In other aspects of the invention, multiple winches may be provided for launching a single carriage of a single amusement ride, a single winch provided for launching multiple carriages of a single amusement ride, multiple winches provided for launching multiple carriages of a single or multiple amusement rides, or other combinations of winches and carriages may be provided. Also, the drum or drums may be disposed on the axle beside the elastic devices or interposed between them, or multiple axles each with one or more drums may be coupled to the energy storage mechanism. Additionally, the winch and variations thereof may be used with hand-held or fixed mechanisms for launching projectiles such as arrows, darts, BB's, bullets, balls, model airplanes, and so forth, or for operating gates, shutters, valves, and so forth. The winch and variations thereof also can be used with other amusement rides for inducing abject fear in willing participants, or with other devices that launch an animate or inanimate object. Additionally, a clutch or other disengagement mechanism can be coupled to the drums, the axle, or another component of the winch, so that the drums can reverse direction between winding in and winding out of the cables or so that the axle can reverse direction between winding in and winding out of the tethers.

In view of the foregoing, it will be appreciated that present invention provides a winch that may be used with an amusement ride (or other device) to launch and accelerate a passenger carriage (or other structure) to a very high velocity in a very short period of time, thereby producing the thrills expected by amusement ride passengers. Additionally, the energy storage mechanism may be used to provide an automatic dampening/braking action on the carriage, with the appropriate amount of braking applied depending on the position of the carriage due to the pre-selected elastic device strengths. Also, the energy storage mechanism may then be used to then relaunch the carriage back toward the starting position, in a staged operation. Furthermore, the various amusement rides and track configurations disclosed herein are well suited to utilize the benefits of such an energy storage mechanism. Moreover, a ride including the energy storage mechanism is safe, reliable, and cost-effective to make and use. Such a ride does not rely on bungee cords or other components that requirement frequent replacement to maintain the safety of the ride, or that carry the stigma of being unsafe.

In the embodiments described above and the following claims, the words "a," "an," and "one" are not intended to mean "only one" but can also mean any number greater than one, unless specified otherwise herein. Additionally, the methods are not intended to be limited to only the specific sequence of steps described, unless specified otherwise herein.

It should be understood that the foregoing description relates only to the exemplary embodiments of the present invention, and that numerous changes may be made therein without departing from the spirit and scope of the invention as defined by the following claims.

The invention claimed is:

1. An amusement ride having a rapid-winding winch and a cable coupled to the rapid-winding winch and a passenger carriage, the rapid-winding winch comprising:
   a) an energy storage mechanism comprising one or more elastic devices;
   b) one or more tethers coupled directly or indirectly to the elastic devices;
   c) an axle having a winding surface with a diameter, wherein the tethers are windable and unwindable about the winding surface of the axle; and
   d) a winding mechanism comprising at least one drum coupled directly or indirectly to the axle and having a winding surface with a diameter, wherein the cable is windable and unwindable about the winding surface of the drum, the drum winding surface diameter being greater than the axle winding surface diameter to provide a mechanical advantage when winding and unwinding the cable.

2. The amusement ride of claim 1, wherein the energy storage mechanism comprises at least one telescopic spring device having a series-coupled sleeve and spring configuration of two or more concentric sleeves, two or more coil springs concentrically arranged within the sleeves, and a plunger extending through the springs, wherein the springs are compressed by the sleeves and the plunger when the sleeves are extended telescopically.

3. The amusement ride of claim 2, wherein the telescopic spring device has at least one launch spring and one or more catch springs, wherein the launch spring has a spring factor selected to launch the carriage at a high velocity and the catch springs have a spring factor selected to be less than the launch spring launch to dampen the carriage motion.

4. The amusement ride of claim 2, wherein the sleeves have flanges and the plunger has a flange, wherein the springs are compressed upon engagement by the sleeve flanges and the plunger flange.

5. The amusement ride of claim 2, wherein at least one of the springs has a different spring factor than another one of the springs.

6. The amusement ride of claim 2, wherein each telescopic spring device includes at least one set of two or more coil springs stacked end-to-end.

7. The amusement ride of claim 6, wherein in each set of springs, at least one of the springs has a different spring factor than another one of the springs.

8. The amusement ride of claim 1, wherein the energy storage mechanism comprises at least one spring device having a coil spring and a plunger extending through the spring, wherein the spring is compressed by the plunger when the plunger is moved.

9. The amusement ride of claim 1, wherein the energy storage mechanism comprises at least one extension spring, compression spring, torsion spring, flat spiral spring, power spring, clock spring, main spring, or bungee cord.

10. The amusement ride of claim 9, wherein the energy storage mechanism includes two or more of elastic devices, with at least one of the elastic devices coupled directly or indirectly to at least one of the actuators and with at least one other of the elastic devices not coupled to any of the actuators.

11. The amusement ride of claim 1, further comprising one or more actuators coupled to the energy storage mechanism and operable to charge the energy storage mechanism.

12. The amusement ride of claim 1, further comprising one or more brake or lock mechanisms operably coupled to the winding mechanism, the energy storage mechanism, the carriage, or the cable for releasably securing the carriage in place.

13. The amusement ride of claim 1, further comprising an attachment member coupled between the energy storage mechanism and the tethers, and a safety member extending through an opening defined in the attachment member.

14. The amusement ride of claim 1, wherein the passenger carriage is operably engaged by the cable and the winding mechanism winds and unwinds the cable to move the carriage.

15. The amusement ride of claim 14, wherein the cable is coupled to the carriage or the cable is coupled to a guide assembly that releasably engages the carriage.

16. The amusement ride of claim 14, further comprising a track that guides the carriage.

17. The amusement ride of claim 16, further comprising at least one roller assembly coupled to the carriage and supported by the track.

18. The amusement ride of claim 16, wherein the track is configured in an open or closed loop.

19. The amusement ride of claim 16, wherein the track has at least one section that is linear, curved, looped, sinusoidal, corkscrewed, elevated and intermediate, elevated and distal, or suspended above ground.

20. The amusement ride of claim 16, wherein the track comprises a looped segment and two deceleration ramps extending from the looped segment.

21. The amusement ride of claim 16, wherein the track is configured so that the carriage travels back-and-forth along the same section of the track.

22. The amusement ride of claim 16, further comprising a support structure having one or more towers with the track mounted thereto.

23. The amusement ride of claim 16, further comprising a launch frame having a launch platform where a person may stand or sit, wherein the energy storage mechanism and the winding mechanism are coupled to the launch frame, and the launch frame is coupled to a tower so that the launch frame can be hoisted to an elevated position.

24. The amusement ride of claim 16, further comprising one or more towers, wherein the carriage includes a frame with rollers that ride on the towers as the frame travels vertically up and down the towers.

25. The amusement ride of claim 16, further comprising one or more pulleys with the cable routed around the pulleys.

26. The amusement ride of claim 25, wherein the cable is routed between the pulleys and the energy storage mechanism in a closed loop.

27. The amusement ride of claim 16, wherein the track includes an acceleration section, a deceleration section, and a coasting section disposed therebetween, and the amusement ride includes a first rapid-winding winch disposed adjacent the acceleration section and a second rapid-winding winch disposed adjacent the deceleration section of the track.

28. The amusement ride of claim 16, further comprising an energy absorbing mechanism disposed adjacent the track for engaging and dampening the motion of the cable.

29. The amusement ride of claim 16, further comprising a retracting assembly for moving the carriage charge the energy storage mechanism.

* * * * *